(12) United States Patent
Falk et al.

(10) Patent No.: US 7,962,385 B2
(45) Date of Patent: Jun. 14, 2011

(54) SYSTEM AND PROCESS FOR ELECTRONIC SUBROGATION, INTER-ORGANIZATION WORKFLOW MANAGEMENT, INTER-ORGANIZATION TRANSACTION PROCESSING AND OPTIMIZED WEB-BASED USER INTERACTION

(75) Inventors: Robert J. Falk, Arlington Heights, IL (US); Richard J. Radi, Wilmette, IL (US)

(73) Assignee: Arbitration Forums, Inc., Tampa, FL (US)

( * ) Notice: Subject to any disclaimer, the term of this patent is extended or adjusted under 35 U.S.C. 154(b) by 1291 days.

(21) Appl. No.: 10/903,630

(22) Filed: Jul. 30, 2004

(65) Prior Publication Data

US 2005/0010454 A1    Jan. 13, 2005

Related U.S. Application Data

(63) Continuation of application No. 10/704,460, filed on Nov. 7, 2003, now abandoned.

(60) Provisional application No. 60/425,058, filed on Nov. 8, 2002, provisional application No. 60/425,670, filed on Nov. 12, 2002.

(51) Int. Cl.
*G06Q 40/10* (2006.01)

(52) U.S. Cl. ............................................. 705/35; 705/4

(58) Field of Classification Search ................. 705/4, 35
See application file for complete search history.

(56) References Cited

U.S. PATENT DOCUMENTS

| | | | |
|---|---|---|---|
| 5,734,837 A | 3/1998 | Flores | |
| 5,768,510 A | 6/1998 | Gish | |
| 5,799,297 A | 8/1998 | Goodridge | |
| 5,848,246 A | 12/1998 | Gish | |
| 5,918,226 A | 6/1999 | Tarumi | |
| 5,956,687 A * | 9/1999 | Wamsley et al. | 705/1 |
| 5,987,245 A | 11/1999 | Gish | |
| 5,991,733 A | 11/1999 | Aleia | |
| 5,999,972 A | 12/1999 | Gish | |
| 6,038,537 A | 3/2000 | Matsuoka | |
| 6,052,684 A | 4/2000 | Du | |
| 6,058,413 A | 5/2000 | Flores | |
| 6,078,982 A | 6/2000 | Du | |
| 6,134,583 A | 10/2000 | Herriot | |
| 6,311,192 B1 | 10/2001 | Rosenthal | |
| 6,330,551 B1 * | 12/2001 | Burchetta et al. | 705/80 |

(Continued)

FOREIGN PATENT DOCUMENTS

CA    2317193 A1    3/2001

OTHER PUBLICATIONS

Grimes, Structure, Models and Meaning, Is "unstructured" data merely unmodeled?, Mar. 1, 2005, Intelligent Enterprise, http://www.intelligententerprise.com/showArticle.jhtml?articleID=5930153.*

(Continued)

*Primary Examiner* — Kirsten S Apple
*Assistant Examiner* — Abdul Basit
(74) *Attorney, Agent, or Firm* — Steptoe & Johnson LLP

(57) ABSTRACT

An intelligent electronic subrogation network ("ESN") automates intra-organization workflow, inter-organization workflow and collaboration for insurance subrogation. This ESN is facilitated by a novel system architecture and process that includes an inter-organizational workflow management system, an inter-organizational transaction processing system, and a unique mechanism for optimizing and enriching web-based user interaction within any such system.

42 Claims, 21 Drawing Sheets

U.S. PATENT DOCUMENTS

| | | |
|---|---|---|
| 6,341,265 B1 | 1/2002 | Provost |
| 6,343,271 B1 | 1/2002 | Peterson |
| 6,349,238 B1 | 2/2002 | Gabbita |
| 6,377,948 B2 | 4/2002 | Kikuchi |
| 6,438,575 B1 | 8/2002 | Khan |
| 6,460,038 B1 | 10/2002 | Khan |
| 6,578,006 B1 | 6/2003 | Saito |
| 6,615,181 B1 | 9/2003 | Segal |
| 2001/0037204 A1 | 11/2001 | Horn |
| 2002/0019797 A1 | 2/2002 | Stewart |
| 2002/0019881 A1 | 2/2002 | Bokhari |
| 2002/0035501 A1 | 3/2002 | Handel |
| 2002/0035528 A1 | 3/2002 | Simpson |
| 2002/0038351 A1 | 3/2002 | Khan |
| 2002/0038384 A1 | 3/2002 | Khan |
| 2002/0046254 A1 | 4/2002 | Khan |
| 2002/0065701 A1 | 5/2002 | Kim |
| 2002/0065798 A1 | 5/2002 | Bostleman |
| 2002/0091559 A1 | 7/2002 | Beniyama |
| 2002/0107792 A1 | 8/2002 | Anderson |
| 2002/0107957 A1 | 8/2002 | Zargham |
| 2002/0116205 A1 | 8/2002 | Ankireddipally |
| 2002/0128883 A1 | 9/2002 | Harris |
| 2002/0128946 A1 | 9/2002 | Chehade et al. |
| 2002/0138321 A1 | 9/2002 | Yuan |
| 2002/0156688 A1 | 10/2002 | Horn |
| 2002/0156693 A1 | 10/2002 | Stewart et al. |
| 2002/0161615 A1 | 10/2002 | Yui |
| 2002/0165988 A1 | 11/2002 | Khan |
| 2002/0194221 A1 | 12/2002 | Strong |
| 2002/0194601 A1 | 12/2002 | Perkes |
| 2003/0009319 A1 | 1/2003 | Fujiwara |
| 2003/0009430 A1 | 1/2003 | Burkey |
| 2003/0018508 A1 | 1/2003 | Schwanke |
| 2003/0028404 A1 | 2/2003 | Herron |
| 2003/0055668 A1 | 3/2003 | Saran |
| 2003/0074342 A1 | 4/2003 | Curtis |
| 2003/0079180 A1 | 4/2003 | Cope |
| 2003/0105654 A1 | 6/2003 | MacLeod |
| 2003/0110503 A1 | 6/2003 | Perkes |
| 2003/0126001 A1 | 7/2003 | Northcutt |
| 2003/0126077 A1 | 7/2003 | Kantor |
| 2003/0144891 A1 | 7/2003 | Leymann |
| 2003/0144912 A1 | 7/2003 | McGee |
| 2003/0145316 A1 | 7/2003 | McKinlay |
| 2003/0158782 A1 | 8/2003 | Thomson |
| 2003/0158811 A1 | 8/2003 | Sanders |
| 2003/0181991 A1 | 9/2003 | Chau |
| 2003/0187743 A1 | 10/2003 | Kumaran |
| 2003/0187763 A1 | 10/2003 | Jordan |

OTHER PUBLICATIONS

Berkus, "Unstructured Data" as an Oxymoron, Sep. 1, 2005, ITtoolbox Blogs, http://blogs.ittoolbox.com/database/soup/archives/unstructured-data-as-an-oxymoron-5588.*

Ramana Rao, "From Unstructured Data to Actionable Intelligence", IT Pro, Nov./Dec. 2003, pp. 29-35.*

* cited by examiner

Subrogation Demand Submission

Electronic Subrogation Folder

Supporting Document Handling

Claim Routing - On Network

Claim Routing - Off Network

No Responding Party Response

Response Options

Online Negotiation

Online Negotiation Automatic Approval

Electronic Denial

Automatic Settlement

Automatic Counter Claims

Manual Payment

Electronic Payment

STM Object Hierarchy

Relationship Example – Subrogation Demand

○ - indicates type of relationship (party type)

FIG. 23 JView Sample View

FIG. 24 JView Sample Form

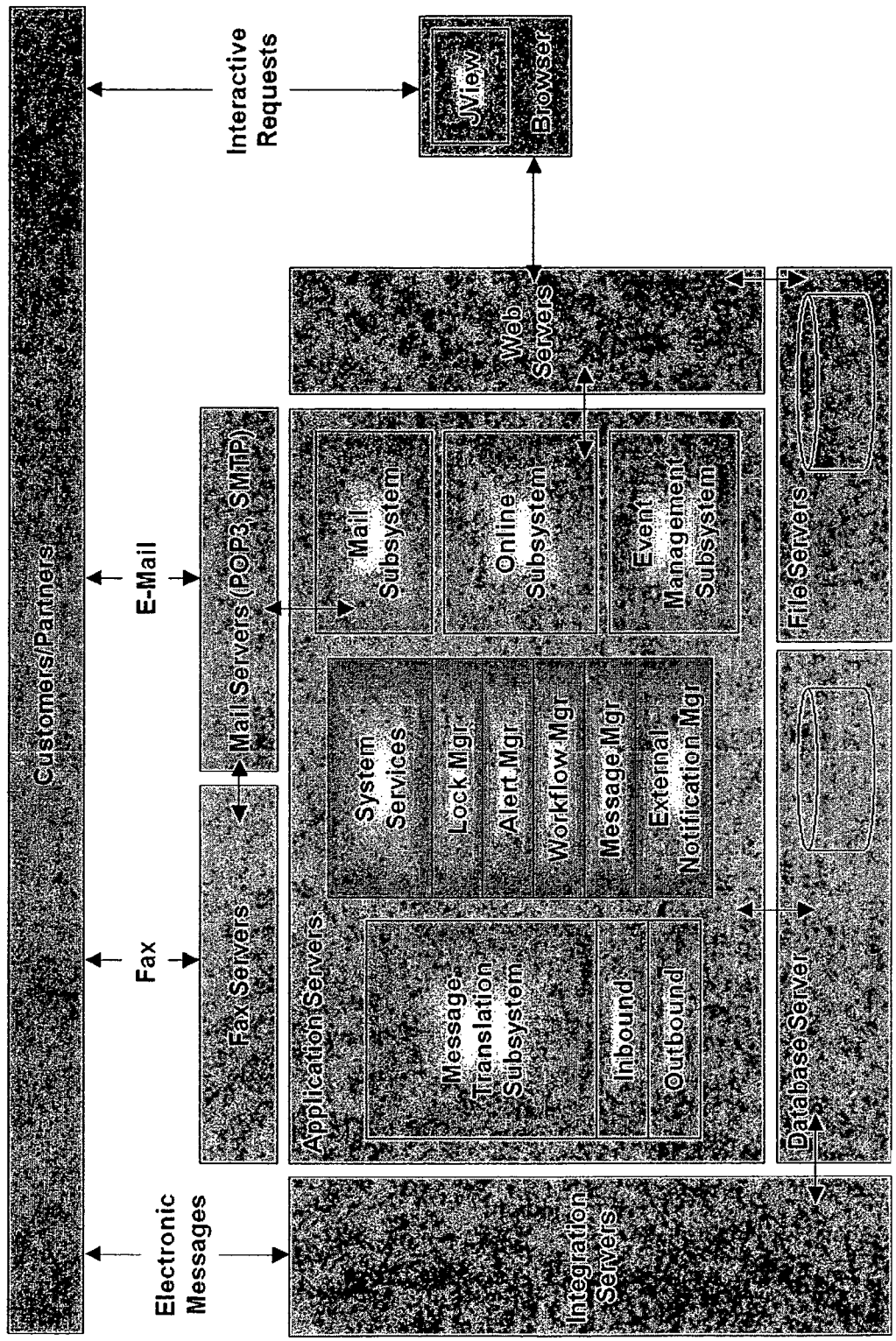
FIG. 26 - System Architecture

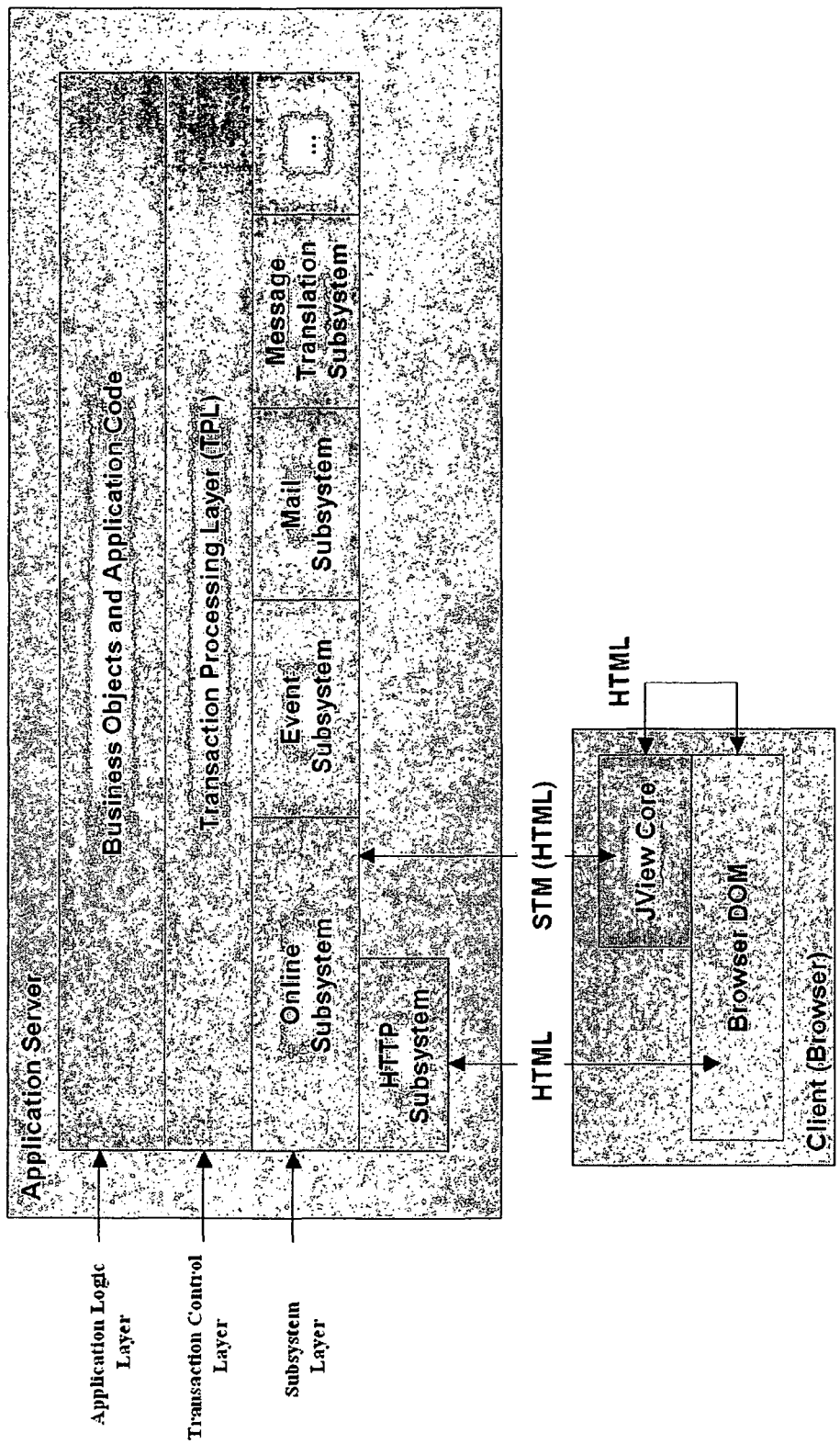
FIG. 27 – Application Framework Architecture

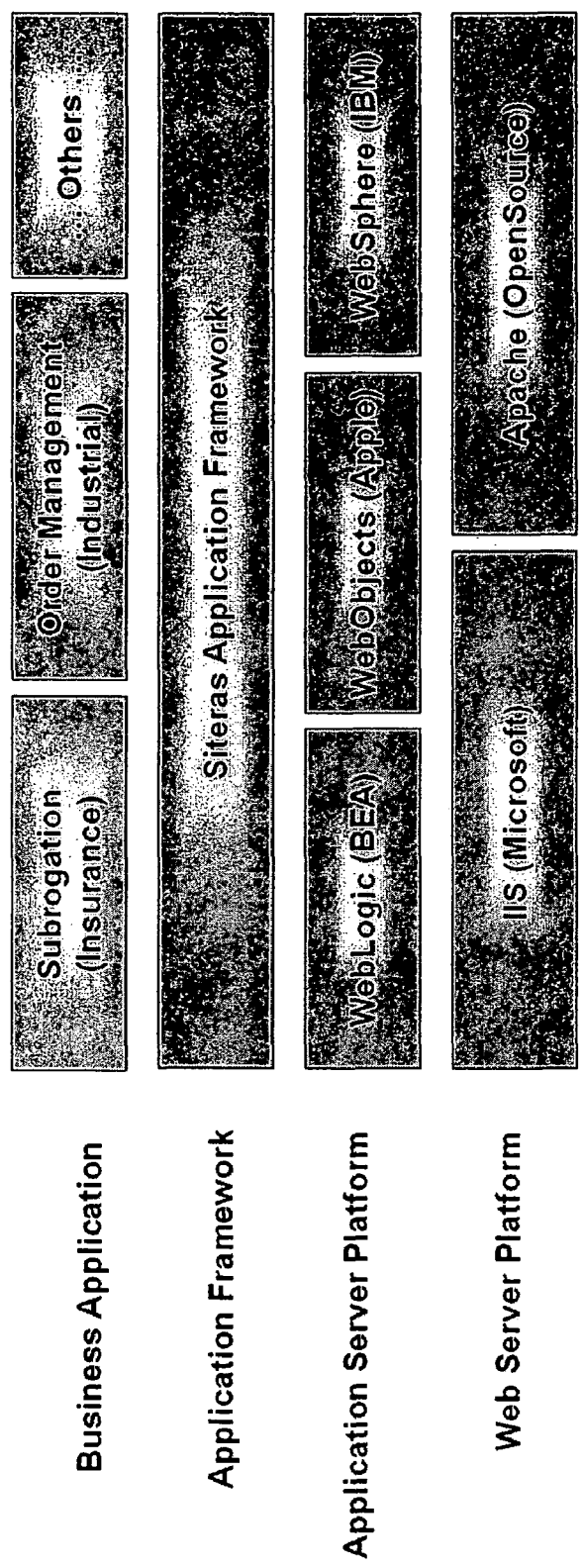
FIG. 28 – Web-Based Transaction Processing Architecture

SYSTEM AND PROCESS FOR ELECTRONIC SUBROGATION, INTER-ORGANIZATION WORKFLOW MANAGEMENT, INTER-ORGANIZATION TRANSACTION PROCESSING AND OPTIMIZED WEB-BASED USER INTERACTION

CROSS-REFERENCE

This application is a continuation application of utility application Ser. No. 10/704,460 filed Nov. 7, 2003, now abandoned. This application is related to Provisional Application No. 60/425,058 filed on Nov. 8, 2002, entitled "Electronic Subrogation System and Process", and Provisional Application No. 60/425,670 filed on Nov. 12, 2002, entitled "Electronic Subrogation system and Process".

FIELD OF THE INVENTION

The invention relates generally to an intelligent electronic subrogation network ("ESN") that automates intra-organization workflow, inter-organization workflow and collaboration for insurance subrogation. The invention also relates to a novel system architecture and process that includes an inter-organizational workflow management system, an inter-organizational transaction processing system, and a unique mechanism for optimizing and enriching web-based user interaction within any such system. The invention will primarily be discussed, at least initially, with reference to the operation of an electronic subrogation network.

BACKGROUND OF THE INVENTION

During the 80's and 90's, many business transaction processing systems were focused on integrating business processes and data that existed within an organization (i.e., intra-organization). These systems cover a wide array of business applications, of varying complexity, including production forecasting/scheduling, order processing, human resources management, financial accounting, sales management, etc. Commercial examples of such systems include offerings from SAP, Oracle, and PeopleSoft. Organizations that successfully implemented such systems achieved reduced costs, higher efficiency, and were more competitive. With the intra-organization systems in place, these organizations are now looking to integrate the business processes and data that exist between trading partner organizations (i.e., inter-organization).

Today, most inter-organizational business transactions occur using paper as the primary medium of exchange. This process is characterized by a high degree of manual processing and lengthy transaction cycle times resulting in high costs, errors, and much inefficiency. In contrast, automating inter-organizational processing systems have demonstrated substantial benefits including greater efficiency, reduced costs, reduced transaction cycle times, and vastly improved management information.

For example, within many industries, numerous opportunities exist for automating the processing of inter-organizational business transactions, e.g., Insurance, Manufacturing, HealthCare, Banking, etc. Within the insurance industry, one such opportunity exists related to subrogation. Insurance subrogation is defined as the process by which one insurance company (demanding party) seeks reimbursement from another company (responding party) or person for a claim it has already paid. For more information related to subrogation, refer to the detailed description below.

Within most insurance companies, the subrogation function is not highly automated. Many of the larger carriers have implemented a rudimentary scoring system for identifying subrogation, but very few have implemented automation for enterprise-wide and inter-enterprise subrogation workflow. Paper and manual processes still dominate the subrogation business practices in use today.

Hence, there is needed in the marketplace an automated system with the following capabilities unique to inter-organizational business transaction processing: 1) a centralized network hub (web-based) that facilitates the inter-connection of various organizations and eliminates the proliferation of point-to-point interfaces, 2) an inter-organizational workflow management system that provides a common framework for managing the state and status of all transactions within the system, 3) an inter-organizational transaction processing component that supports multiple organizations and their distinct relationship with each transaction while also ensuring the security and privacy of each organization's data, 4) a unified data model mechanism that allows common data elements to be exchanged while also supporting organization specific interface requirements, and 5) application specific data and functionality specific to the types of business transactions being processed.

Furthermore, within the insurance industry, an inter-organizational system for subrogation claims is needed. Such a system would provide the application specific data and functions unique to insurance subrogation workflow.

SUMMARY OF THE INVENTION

The electronic subrogation network (ESN) is a virtual clearinghouse for subrogation claims designed to eliminate inefficiencies and manual tasks in subrogation processing. Using the ESN, demanding parties can issue subrogation demands electronically to responding parties. The ESN's electronic folder supports both structured and unstructured data so that the involved parties can share claim information as well as any supporting documents. While the primary parties to the subrogation claim often involve the demanding and responding insurance carriers, additional parties can also take part in this business transaction (e.g., arbitration organizations, collection organizations, attorneys, etc.) The ESN is unique in its ability to provide a common workflow and collaboration process for subrogation that spans multiple distinct organizations—i.e., inter-organizational workflow and transaction processing.

The ESN provides functions to manage inter-company workflow and collaboration. The ESN manages workflow between the involved parties through a state-based workflow model that ensures workflow consistency among multiple parties. Responding parties can create rules in the ESN to automatically route the incoming subrogation demand to the appropriate file handlers. All involved parties can create business rules in the ESN based on each company's business practices, which are used to audit every file and identify exception conditions. Multiple parties can collaborate and negotiate online through the ESN. The ESN provides functions for automatic settlement of subrogation claims—without any human intervention—when claim files pass all parties' business rule audits and liability calls match. The ESN audits files against comparative negligence regulations of each state and, when appropriate, automatically generate counter claims that are linked to the original file. Any party using the ESN can assign any file to a third party, e.g., arbitration firm, collection firm, outside attorney, service provider, etc.

The ESN provides payment-netting functions. Payments can be netted bi-laterally or multi-laterally whereby the ESN will keep track of payments due between two or more parties over a definable period of time then issue an alert to the party(s) that needs to make a payment. In addition, the ESN will provide all parties with reconciliation and file allocation information.

All members of the ESN will have online access to comprehensive management reporting including both demand-side and response-side reports. In addition, the ESN provides a benchmarking function so that members can compare various aspects of their demand-side and response-side performance against the industry.

The ESN provides sophisticated inter-organizational workflow, collaboration and transaction processing capabilities. In doing so, the ESN is based on a core software platform that consists of several generic technologies including the Inter-Organization Workflow Subsystem, the Inter-Organization Transaction Processing System, and the JView™ Subsystem.

The Inter-Organization Workflow Subsystem is designed to meet the requirements of both intra- and inter-organizational workflow. It uses a series of workflow tables (data structures) and a unique workflow algorithm to perform all workflow management operations. The workflow tables are essentially a set of finite state machines (FSM's), that define a closed loop system for the workflow related to a given business process. The Workflow Subsystem manages the status of inter-organizational workflow, the status of intra-organization workflow, ownership of the next action on a file, navigation of functions that can be performed, and the state of the file.

The Inter-Organization Transaction Processing System provides the framework for a central processing network that handles inter-organizational business transactions. This framework insulates member organizations from each other, supports the exchange of structured and unstructured information, supports multi-party transactions and workflow, and provides extensive data security and privacy for each organization. This system consists of four major areas—Interface Subsystems, Transaction Processing Layer (TPL), System Services, and Application Logic. The Interface Subsystem supports the unique interface requirements of any given source of transaction origination. In doing so, the Interface subsystem supports transaction origination from either automated systems (using electronic messaging interfaces) or interactive users (using web-based interfaces). The Transaction Processing Layer is responsible for coordinating the processing of all transaction requests within the system. The System Services provide common components and services for locking and reservation, object graph services, business rule and alert management, workflow management, security management, individual and team ownership, external notifications, snapshot services, reporting, and document management. The Application Logic layer provides the system with the application specific functionality required for a given vertical business process. This layer consists of the Unified Data Model—a mechanism for organizing and modeling subrogation-specific business information, model-related application logic, transaction-related application logic, and configuration.

The JView™ subsystem provides a system and process for optimizing and enriching the inter-organizational interaction. It significantly improves system response time by offloading the HTML generation to the client system thereby substantially reducing the processing performed on the server. It reduces the size of the messages transmitted between the browser and the web server, thereby substantially reducing the communication bandwidth required. It provides a rich set of local functions (performed on the client system) that eliminate requests to the server. This further reduces the processing load on the server and greatly enhances the overall responsiveness of the system. Siteras JView™ fully utilizes existing web browser standards thereby maintaining compatibility with existing client browsers (i.e., it supports a true thin-client implementation and does not utilize any special browser extensions—e.g., browser plug-ins, java applets, or ActiveX controls).

Using this core technology, the combination of the ESN's subrogation-specific business functionality and advanced technology provide many unique benefits for the insurance industry. Benefits of the Electronic Subrogation Network include streamlining inter- and intra-company subrogation workflow; reducing the amount of paper handling of subrogation documents and transactions; improving productivity of both subrogation staffs (demanding party) and claim office staffs (responding party) by eliminating many manual tasks; reducing cycle time of subrogation claims; increasing subrogation recoveries through better resource allocation and automatic counter-claims; reduce claims loss costs through electronic auditing of subrogation files; improving customer satisfaction by accelerating deductible refunds; reducing payment handling expenses; and providing valuable management information.

BRIEF DESCRIPTION OF THE DRAWINGS

The features and inventive aspects of the present invention will become more apparent upon reading the following detailed description, and drawings, of which the following is a brief description:

FIG. 26 is a diagram showing the system architecture for inter-organizational transaction processing;

FIG. 27 is a diagram showing the distinct layers of the application framework architecture for inter-organizational transaction processing; and FIG. 28 is a diagram showing a typical web-based transaction processing architecture and the relationship of the application framework (for inter-organizational transaction processing) within this architecture.

DETAILED DESCRIPTION OF THE PREFERRED EMBODIMENT

Background

Electronic Subrogation Network (ESN)

Subrogation Defined

Figure 1:
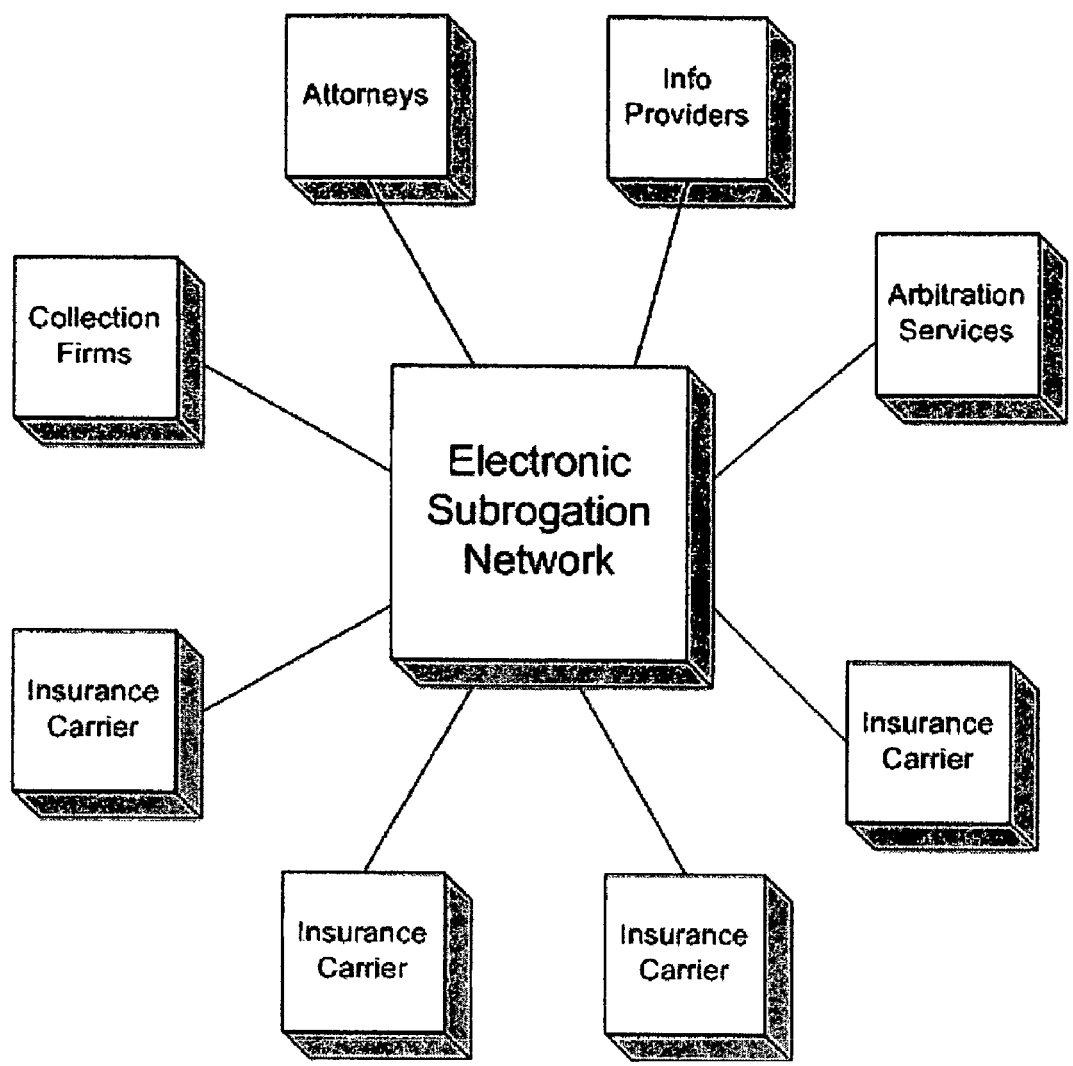
FIG. 1 shows various interfaces with users that may be implemented in the operation of an ESN in accordance with this invention.

Insurance subrogation is defined as the process by which one insurance company (demanding party) seeks reimbursement from another company (responding party) or person for a claim it has already paid. Examples of subrogation include:

Sally's vehicle is stopped at a stop sign when Pete's vehicle rear-ends her vehicle. Sally's car is damaged and she suffers some injuries. Sally files a claim with her auto insurance company. Her insurance company pays for Sally's damages and injuries, but believes that Pete was at fault in the accident. Sally's insurance company (demanding party) will then subrogate against Pete's insurance company (responding party) to recover the cost of the claims they paid.

Tom's house caught on fire as a result of a fire in the store next door. Tom files a claim with his homeowner's insurance company. Tom's insurance company pays for Tom's damages, but believes the store was liable for causing the fire. Tom's insurance company then subrogates against the insurance company of the store for the amount of the claims they paid.

Doug loses control of his sports utility vehicle and strikes a tree after his tires unravel. Doug files a claim with his auto insurance company who pays for his damages then subrogates against the SUV manufacturer and/or the tire manufacturer to recover the cost of the claim.

Jane's vehicle is hit by an uninsured motorist, Bob. Jane files a claim with her auto insurance company. Her insurance company pays for Jane's damages, but believes that Bob was at fault in the accident. Jane's insurance company will subrogate against Bob for the cost of the claim.

Current Subrogation Process

Subrogation today is a very manual, paper-intensive process. Some insurance carriers have information systems that help identify subrogation opportunities, but very few have any electronic communications with other carriers.

The subrogation process starts when the claim is first reported to the insurance carrier by the insured. During the claim investigation process, insurance carriers determine if there is an opportunity for subrogation. If a claim is "scored" as having an opportunity for subrogation, the file is transferred to the subrogation office (larger carriers have specialized units for subrogation while smaller carriers typically handle subrogation from their field offices with claim adjusters). Once the claim is paid, the subrogation office prepares a subrogation file consisting of a demand letter and some supporting documents. The demand letter contains basic information about the claim, e.g. claim amount, claim number, etc. as well as how much the demanding carrier believes the responding carrier is at fault. The subrogation file is then mailed to the responding carrier. The supporting documents usually include a copy of the estimate of damage off which the claim was paid, some proof of payment and copies of any associated invoices (e.g., rental car bill). However, supporting documents may include many other types of documents including police reports, photographs, vehicle valuation reports, witness statements, etc. Once assembled, the subrogation file (referred to as a "demand") is then mailed to the responding carrier. Subrogation departments often have difficulty determining where to send subrogation demands especially when the responding party is a large insurance carrier with hundreds or thousands of claim offices. As a result, subrogation demands often are sent to the wrong location.

Typically, responding carriers receive and handle subrogation files in their field offices. These claims are known as third party claims. If a subrogation demand is sent to the wrong office, it is re-routed to the proper office. This may add weeks or even months to the process. Once the demand finally reaches the appropriate file handler (usually a claims adjuster), the file handler will compare the facts of the demand to the facts of the claim they have on file. Usually the responding carrier's insured will have already filed a claim by the time the responding carrier receives the subrogation demand. The responding carrier's claims adjuster will then investigate the claim and determine if the demanding carrier's demand is justifiable. Often this will include obtaining additional documentation from the demanding carrier including damage photos, witness statements, etc. If the adjuster agrees with the demand, then he will authorize the claim for payment. Most auto subrogation files are settled this way, i.e., without any negotiation. If he does not agree with the demand, then he will deny the claim or negotiate the claim with the demanding carrier. Typically, negotiation occurs via the telephone and details of the negotiation are usually not documented. If settlement is eventually reached, the responding carrier pays the agreed amount. If settlement is not reached, then the file goes to arbitration or litigation. If the at-fault party is an uninsured motorist (UM), most carriers outsource the collection effort to a collection agency.

Most of the major property and casualty carriers are members of arbitration networks—non-profit organizations created to arbitrate subrogation claims between carriers. Members of the arbitration networks always send their arbitration files to the arbitration network's arbitration service. The arbitration networks charge a fee per filing and the arbitration process usually takes about 90 days. If either the demanding carrier or responding carrier is not a member of the arbitration network then the file goes to litigation.

Payment between carriers is also very inefficient. Typically, checks are cut for each and every file between carriers. This may result in hundreds or thousands of checks a day flowing in both directions between major carriers. Once payment is collected, the demanding carrier refunds its insured for the deductible paid—again via check.

Due in large part to all the paper and manual processes, subrogation cycle time is often very long. A typical cycle time for an average auto subrogation file is 90-120 days. Cycle time can be much longer for files that go to arbitration or litigation, total loss claims, and uninsured motorist claims.

Management information on subrogation workflow (as typical of any paper-based process) is usually poor. Some carriers have limited information on the demand-side process and very few, if any, carriers have any meaningful management information on the response-side.

Types of Subrogation

Auto Physical Damage

Auto physical damage ("APD") claims are those claims associated with the physical damage to the vehicle of an insured usually due to a collision. The vehicle may be repairable or it may be a total loss. Other claims that fall into this category include stolen vehicles and vandalism.

MedPay/PIP

MedPay/PIP claims are the result of injuries or sickness to a person covered by an insurance policy. MedPay/PIP claims include injuries from a vehicle collision.

Property

Property claims result from damage to real or personal property. Some property subrogation claims can be straightforward while others can be very large and complex to negotiate. Property claim volumes are much lower than auto claims, but property subrogation is a very similar workflow to APD.

Product Liability

Product liability claims result from damages caused by a defect in a product. Product liability subrogation claims usually involve complex negotiations and volumes are small.

Workers Compensation

Workers compensation claims result from injuries sustained in the course of performing one's occupation. Some workers comp subrogation claims can be straightforward while others can be very complex to negotiate.

Health Insurance

Like property and casualty claims, health insurance claims are also subrogated whenever the sickness or injury has been caused by negligence of another party.

Trends in Subrogation

Insurance carriers started to dedicate staff to subrogation in the mid-1990's. Historically, field claims adjusters handled subrogation claims. As larger carriers began to understand the significance and potential size of subrogation demand recovery dollars, they created special subrogation centers (usually centralized or regionalized) dedicated to recovering subrogation.

The subrogation function is not generally highly automated. Many of the larger carriers have implemented a rudimentary scoring system for identifying subrogation, but very few have implemented automation for enterprise-wide subrogation workflow. Paper and manual processes still dominate subrogation processes.

Several years ago, the industry recognized the need for improving inter-company communication of subrogation files. Through American National Standards Institute ("ANSI"), the industry formed a standards committee that completed an EDI X12 specification for subrogation in February 2001. The standard has not been implemented by any carrier. The standard defines business cases for only a subset of the real-world business cases. In addition, it assumes every carrier supports the standard and implements its own back-end software logic to interpret the data and execute its workflow.

Thus, there is needed an electronic subrogation system and process for all types of insurance claims, including those identified under the section entitled "Types of Subrogation." Benefits of the Electronic Subrogation Network ("ESN") of the present invention include: streamlining inter- and intra-company subrogation workflow'; reducing the amount of paper handling of subrogation documents and transactions; improving productivity of both the demanding and responding parties; reducing cycle time of subrogation claims; increase subrogation recoveries through automatic counter-claims; reducing claims loss costs through electronic auditing of subrogation files; improving customer satisfaction by accelerating deductible refunds; reducing payment handling expenses; and providing valuable management information.

Detailed Description—Electronic Subrogation Network (ESN)

The detailed description that follows may be presented in terms of programs, data structures or procedures executed on a computer or network of computers. These procedural descriptions and representations are the means used by those skilled in the art to most effectively convey the substance of their work to others skilled in the art.

As indicated above, the ESN acts as an electronic clearinghouse for subrogation demands and responses. The ESN is an Internet-based, computer implemented system and process that allows insurance carriers to interact with each other as well as with other parties (arbitrators, attorneys, collection agencies, etc.) involved in the subrogation process. With the ESN, parties can electronically send and receive subrogation demands, attach supporting documents (estimates, photos, police reports, etc.), negotiate online, settle files automatically, assign files to arbitrators and vendors, view and download online reports, automatically audit files, receive electronic alerts and notifications, and much more. In addition, the ESN includes the ability to send and receive electronic payments and net payments due. With the ESN's online reporting, parties have access to powerful management information on both subrogation demands issued and third party demands received. Because the ESN is web-based, information can be accessed anytime, anywhere provided the user has Internet access and implementation is often simple and straightforward since there is no software to install. If necessary, the ESN can interface directly to claims systems in virtually any format in a real-time or batch mode.

Figure 2:
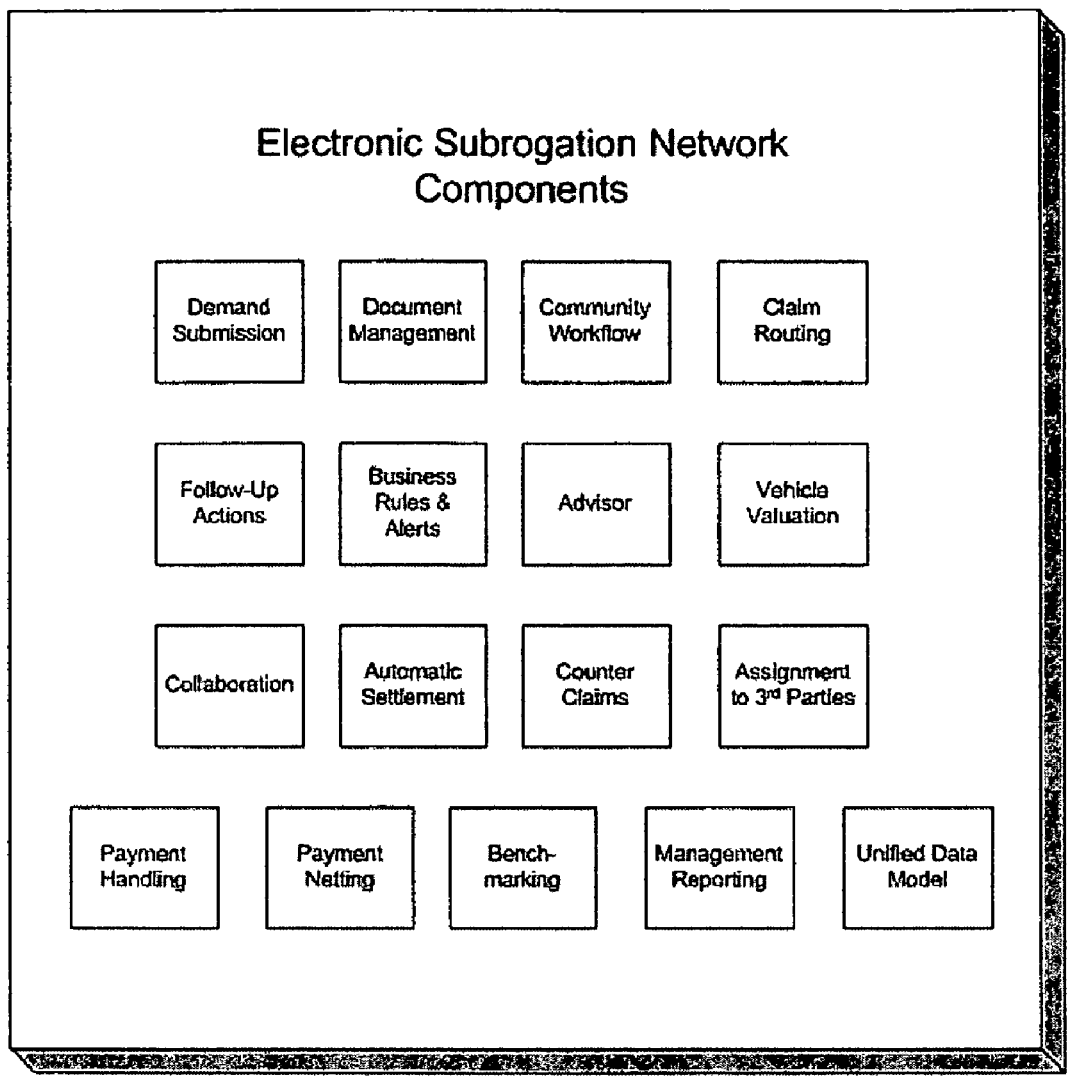
FIG. 2 shows a block diagram of the various modules/subsystems that may be included in an ESN formed in accordance with the teachings of this invention.

The ESN relates to an Internet- or other network-based system and process for electronically managing and settling inter-company subrogation transactions. The ESN provides a system for facilitating subrogation transactions and workflow between all parties involved in subrogation. As best seen in FIG. 2, the ESN may include data translation, collaboration, workflow, demand routing, security, business functions, business rules, electronic payments, subrogation folder reporting and connectivity modules or subsystems. Each subsystem or module, one or more of which may be used for processing a demand, may include software, hardware or both that facilitate processing of a demand.

The Electronic Subrogation Network ("ESN"), as indicated in FIG. 2, is a method for processing insurance subrogation claims through an electronic network. As best seen in FIG. 2, the ESN contains a variety of components and processes:

Subrogation Demand Information Submission & Document Management;
Subrogation Community Workflow;
Subrogation claim Routing;
Subrogation Follow-up Actions;
Subrogation Business Rules & Alerts;
Subrogation Advisor;
Subrogation Vehicle Valuation;
Subrogation Collaboration;
Subrogation Automatic Settlement;
Subrogation Automatic Counter claims;
Subrogation Assignment to Third Parties;
Subrogation Payment Handling;
Subrogation Payment Netting;
Subrogation Management Reporting;
Subrogation Benchmarking; and
Unified Data Model for Subrogation.

Subrogation Demand Information Submission & Document Management

Figure 3:
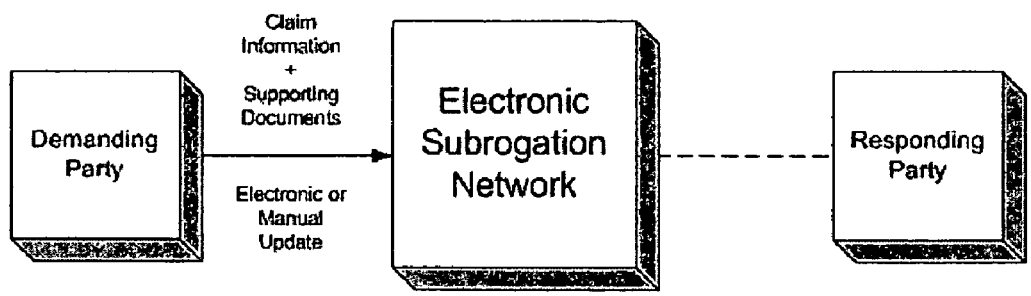
FIG. 3 shows a schematic and workflow process of how an initial demand may be submitted to the ESN shown in FIG. 2.

As best seen in FIG. 3, the ESN provides a method for submitting subrogation demands so as to provide a mechanism for transmitting structured (claims data from claims system) and unstructured (supporting documents and images) demand information, and provides a mechanism to digitize paper supporting documents.

In operation then, the ESN provides a process and system to perform the following operations: manually enter subrogation demand information into the ESN; upload file of subrogation demand records into the ESN; transmit subrogation demand files into the ESN via electronic interface.

The File Upload function allows a party to use the file upload capabilities within the ESN ASP to manually upload a file of transactions for processing. This technique can be used with any file format. It offers excellent security because it utilizes the same HTTPS transport as all other ASP-based interactive functions. Of all interface techniques, it requires the least amount of setup and configuration. To use File Upload, the party creates a file of subrogation demand records from their claim or subrogation system then uploads the file with the click of one button. The ESN then automatically maps each record to the Unified Data Model.

The ESN supports both batch and transactional interfaces. The batch interface allows a carrier to automatically send/receive a batch file of transactions to/from the ESN on a regular basis. Typically, a file transfer protocol is utilized (e.g., FTP, etc.). The file transfer is automated and does not require any manual processing. The transactional interface allows a party to automatically send/receive individual transactions to/from the ESN in a real-time event manner. This interface is fully automated and does not require any manual processing. This type of interface is used where real-time information is needed.

Figure 4:
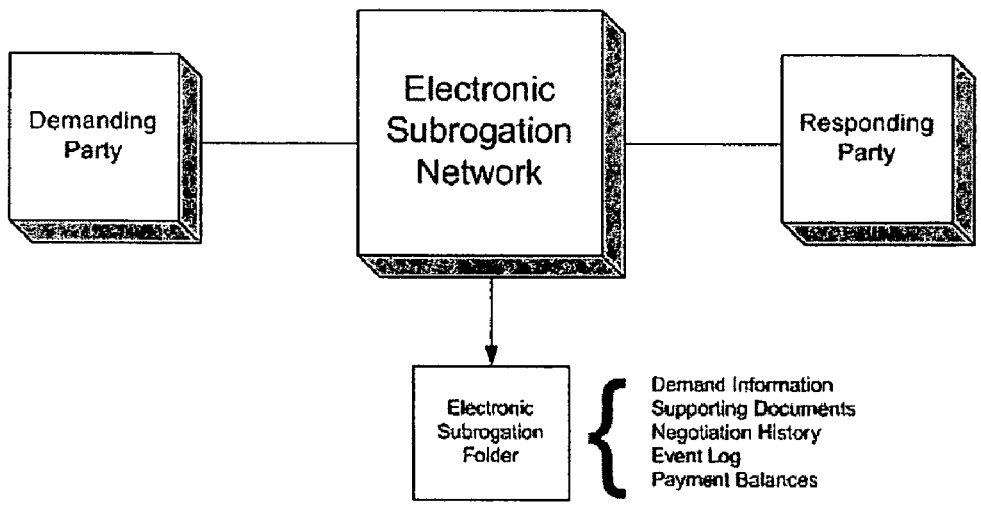
FIG. 4 illustrates a workflow process showing how a shared electronic folder and an audit trail may be created for files hosted on the ESN shown in FIG. 2.

As best seen in FIG. 4, once the ESN receives a subrogation demand record, the ESN creates an electronic subrogation folder, which can contain both structured and unstructured information as well as a history file. The history file is a time-stamped event log for every action taken on the folder. The history file contains a time-stamped event log that tracks the documents that were affected by the event and the user ID of the user who took the action that created the event. The history file provides both demanding and responding parties with a comprehensive audit trail.

Through electronic interfaces or file uploads, the ESN can send and receive messages in many formats, including EDI X12, XML, or ASCII files. The ESN also supports the ANSI X12N 272 Automobile Subrogation Demand and Response standard.

Figure 5:
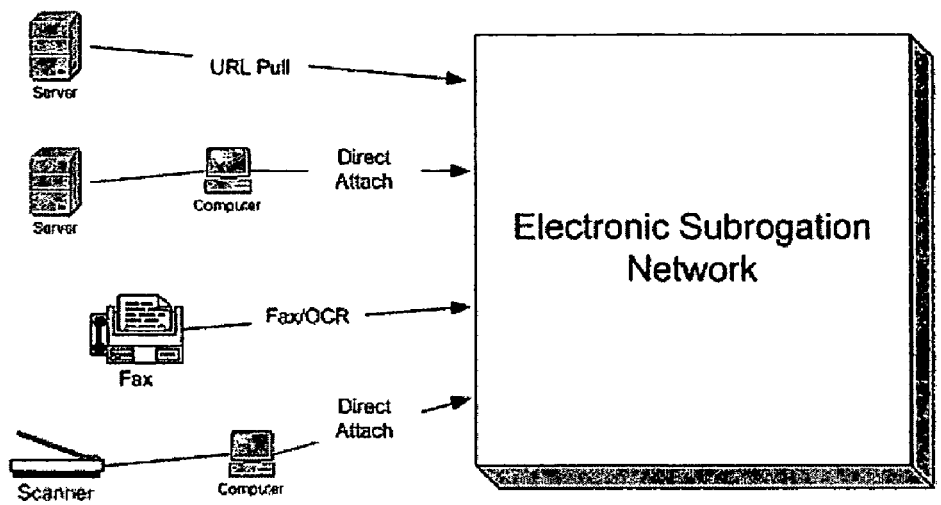
FIG. 5 shows a schematic and workflow process for uploading electronic and digital documents onto and for digitizing paper documents into the ESN.

As best seen in FIG. 5, unstructured supporting documents can be uploaded into the ESN generally with any of the following techniques.

When demands are submitted electronically, the electronic message (containing the demand data) can specify the URL (Internet location) for one or more related documents. Upon receipt of the electronic message, the ESN will automatically retrieve the specified document from the specified URL. This capability requires the sender to make all related documents available on a server that can be accessed via the Internet. Secure access to these documents can be provided in a number of ways (e.g., VPN, secure login, client-side digital certificates, etc.).

Users attach electronic supporting documents using the ESN direct attach function. Users browse to documents they wish to attach, select the document, select the type of document from a pull-down menu, provide a title and/or description of the document, select which parties have access to the document, then click an Attach button to attach the documents to the folder. To use this function, the supporting document must be available as a file on the local machine or on an available network server. Supporting documents can be in any of the following formats:

| Type | Application or Format | File Extension | MIME Type | Standard Format |
|---|---|---|---|---|
| Document | Microsoft Word | .DOC | application/msword | pdf |
| | Word Perfect | .wpd | application/wordperfect 5.1 | |
| | Microsoft Excel | .xls | vnd.ms-excel | |
| | Adobe Acrobat | .pdf | application/pdf | |
| | Plain Text | .txt | text/plain | |
| | HTML | .htm, .html | text/html | |
| Graphics | JPEG | .jpg, .jpeg | image/jpeg | pdf |
| | GIF | .gif | image/gif | |
| | TIFF | .tif | image/tiff | |
| | PNG | .png | image/png | |
| Audio | MP3 | .mp3 | audio/mpeg | mp3 |
| | WAV | .wav | audio/wav | |
| Video | MPEG | .mpg, .mpeg | video/mpeg | mpeg |

The ESN then converts the source document from its original format into a standard format for universal viewing. Documents are converted into the following formats:

Documents—Adobe Acrobat viewer/plug-in.
Graphics—Adobe Acrobat viewer/plug-in.
Audio—any standard MP3 player/plug-in (e.g., Microsoft Media Player)
Video—any standard MPEG player/plug-in (e.g., Microsoft Media Player)

Any paper documents can be sent to the ESN using its fax support. To use this support, the user would first uses the "Quick Attach" function to select the type of document then print a special fax cover sheet. This cover sheet is then placed on top of the document to be faxed. The document can then be faxed to the ESN. Upon receiving the fax, the ESN will automatically scan the special cover sheet (using OCR) for special codes and information. Using this information, the system will attach the document to the appropriate demand folder. The ESN manages multiple version of supporting documents.

Subrogation Community Workflow

The ESN manages workflow between parties (two or more) within the subrogation process so as to provide consistent workflow for inter-company collaboration, provide real time status information to all parties involved, and trigger company-specific workflow based on events and exception conditions within the workflow.

The subrogation specific workflow model includes inter-company workflow states, transitions, conditionality, status, action flags, etc. Company-specific workflow is also provided within the context of community workflow.

As best seen in TABLE 1, the ESN may support standard codes to represent the state of a demand at any point in the process (i.e., the standard inter-company subrogation workflow). These standard codes establish the basis for consistent understanding and communication between parties regarding the status of a given demand. As such, these codes represent the standard ESN inter-party subrogation file status.

Additionally, the ESN may be configured to allow for the definition of party specific status codes (i.e., intra-company subrogation workflow). These codes enable an organization to define additional workflow states that are specific to their business processes while still maintaining a standard process definition between organizations.

Subrogation Claim Routing

Figure 6:
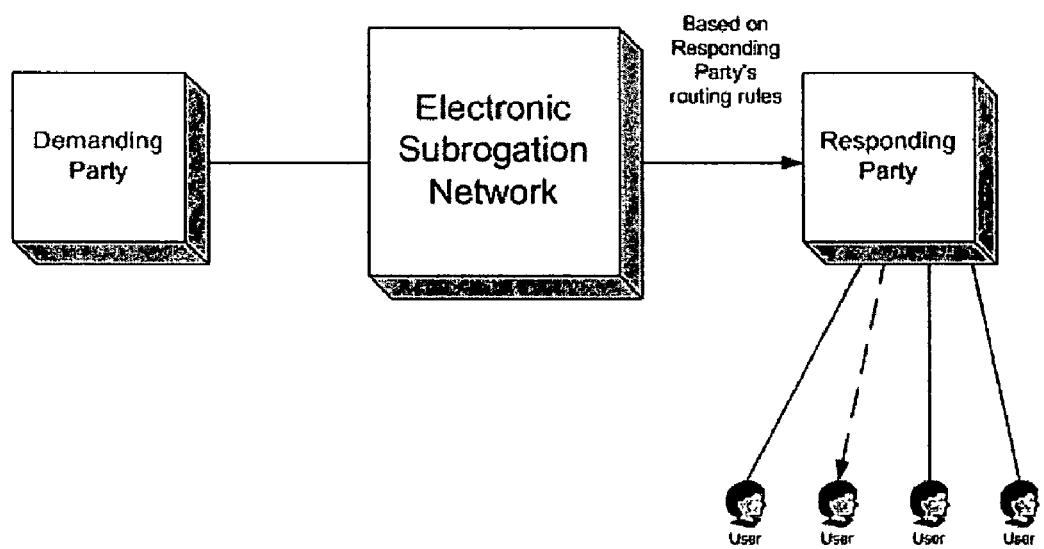
FIG. 6 shows a schematic and workflow process of an on-network demand routing for the ESN shown in FIG. 2.

The ESN routes subrogation demands to responding parties. A routing algorithm combines a demanding party specific index and a heuristic algorithm to determine the responding party. Data never actually leaves the ESN's server; the routing is virtual, and the file handler is notified of the demand on the ESN through an electronic notification (e-mail, page, text message, etc.). If notified via email, then the ESN provides a URL link for the user to access the ESN and the appropriate demand file. As best seen in FIG. 6, a responding party that is a member of the ESN will maintain routing rules in the ESN so that the ESN can electronically route incoming subrogation files to the appropriate office, group, or file handler. The ESN supports both Semi-Automated Routing and Automated Routing.

With Semi-Automatic Routing, the initial demand is routed to a responding party coordinator ("router") in a central, regional, or claim office location. Using the ESN, the router can view all incoming demands ("Pending Routing"). Using their internal claim system, routers can determine the responding party's claim number associated with the demand and the group or individual currently assigned to the file. The router will then use the "Route Demand" function to update the demand with additional information (e.g., the claim number, the liability percentage, etc), and transfer the demand to the correct group/individual within the party's organization. After completing this function, the system has now "queued" this demand to the specified group/individual ("Pending Response").

With Automatic Routing, the responding party will upload to the ESN a "claim index" file on a regular basis (e.g., daily). The claim index provides summary information about a claim, which permits a search to be made of the ESN to locate the claim. When the ESN receives an initial demand for this party, it may use the claim index to automatically route the demand to the correct group/individual within the responding party's organization. The claim index file can also be the basis for supporting automated agents within the ESN that can automatically review and respond to initial demands based on business rules.

The ESN also provides a function for first notice of loss conditions in which the ESN or the responding party can determine if the claim is a first notice of loss and automatically route the file to the responding party's loss reporting unit. When the responding party receives the initial demand, if the "claimant" (as identified in the initial demand) is insured/covered by the responding party, but no claim exists (within the responding party's claim system) for the specified loss date, then this demand represents a First Notice of Loss. In this case, the responding party will first need to establish a claim file (within their system) before processing this demand.

To support this workflow, the system will place this demand in a special state "First Notice of Loss". Thereby allowing the responding party to easily identify and process all incoming demands in this condition. With automated routing, this condition can be automatically identified with the addition of a policyholder index. With semi-automated routing, the routing coordinator, which may be a human operator, can use the "FNOL" function to move the demand into this state.

The ESN also supports the ability to reassign a file to another file handler through the Assign function. This electronic routing function is available for parties who are members of the ESN.

Figure 7:
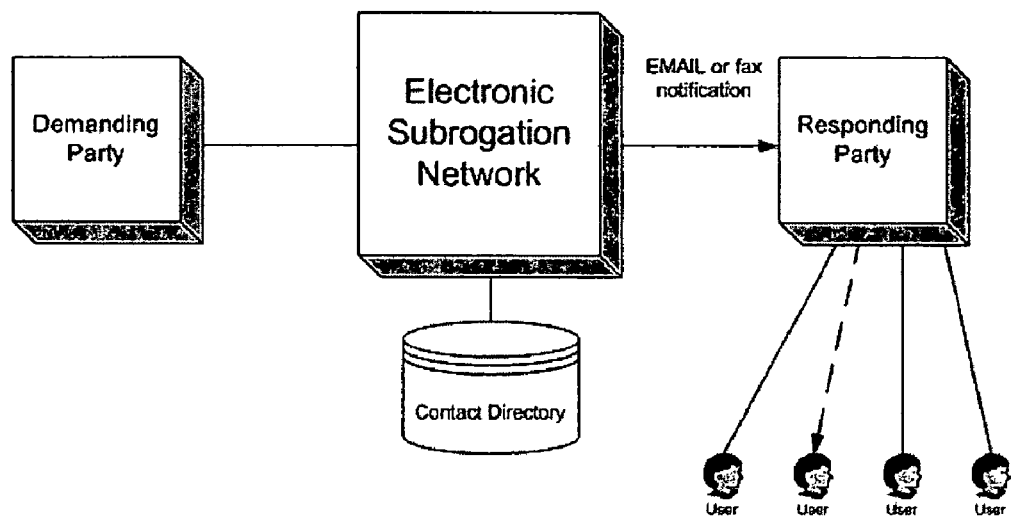
FIG. 7 shows a schematic of an off-network demand routing and workflow process for the ESN shown in FIG. 2.

As best seen in FIG. 7, a responding party that is not a member of the ESN will receive email or fax notification of subrogation demand from the ESN. A responding user can click a link in email to access the specific subrogation demand file. Responding parties who are not members of the ESN can reassign files by forwarding the ESN's email notification to the appropriate file handler. When an off-network responding user logs onto the system for the first time, the system will present a tutorial that provides a basic introduction to the ESN and familiarizes that user with the basic features they will need to correctly respond to the demand that was issued. Demanding parties will have access to online directory of off-network responding contacts, locations, and email addresses. This directory will be automatically updated whenever a demand is issued to a new off-network contact and is accessible by all demanding parties on the ESN.

Subrogation Follow-Up Actions

Figure 8:
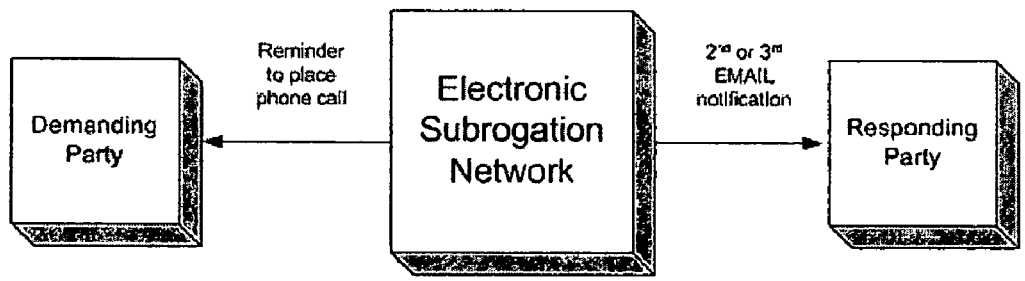
FIG. 8 shows a no responding party response module and workflow process for use with the ESN.

The ESN sets and automatically triggers follow-up actions for demanding users. As best seen in FIG. 8, if a responding party is not responding to subrogation demand, a demanding party can send multiple email reminders to a responding party. A demanding party can define company-specific follow-up action reminders in the ESN; for example, the ESN can issue reminders to demanding users to contact a responding user if there is no response in a specific timeframe defined by the demanding party. The ESN can issue alerts, reminders and next actions either to 1) a pooled team of demand users so that a given user in the pool gets the file that requires the next action, or 2) an individual file handler.

Subrogation Business Rules & Alerts

The ESN models the unique business practices of each member of the network and for handling workflow exception conditions so as to facilitate consistency between each member's business practices and the network's workflow.

The processing and functions performed by the ESN may be affected by a number of party specific parameters and settings. Collectively, these settings represent a party's "business rules" and allow a party to customize the processing of the ESN to support party specific business processes. Parties can define global or trading partner specific profiles and business rules. For example, when the ESN processes a given transaction, the logic within the ESN references an identified party's "business rules" and uses them to control the processing of the transaction. The ESN permits party specific business rules to be divided generally into a number of main categories as follows.

Company Rules

Define global settings for this party.

Workflow Rules

Define the party specific workflow.

Routing Rules

Define the party specific settings for semi-automated or automated demand routing. These settings are typically used to control how the ESN will route an incoming demand within a party's organization.

File Audit Rules

Define the party specific rules for file audits and conditions. This includes the following groups:

General

If total loss, was salvage deducted.

Demanding Party Specific

For any response received, is the Recovery percentage less than the Minimum Recovery percentage.

Responding Party Specific

Abnormal damage amounts specified as a percentage against the collision damage—i.e., rental reimbursement, towing, loss of use, etc. (by Demand Amount Range).

Maximum thresholds for various damage amounts (by Demand Amount Range.

Business Partner Rules

Define party specific settings applied to one or more business partners. A single generic set of rules can be established for all partners. In addition, a specific set can be established for a given business partner. In this case, these settings would then override any of the generic settings for this specific partner.

The following rules may also be included: required attachments for demands (by Demand Amount Range), and require attachments for demands based on each coverage code claimed.

Members can configure company-specific business rules. Every file is audited based on the business rules of all parties involved in the transaction. Alerts are triggered by exception conditions or violations of the business rules based on multi-party parameters (defined by ALL parties currently having access to the folder), e.g., a responding party can be alerted based on parameters of the demanding party.

Alerts may be customized for a particular party. This feature permits a party to determine specific exceptions conditions that will generate an alert. When viewing a file, if any alerts exist, an "Alert Pane" will be displayed within the file. When taking an action on a file, if any alerts exist or are newly detected, the user will be presented with a warning message. To continue with the transaction, the user must explicitly override this warning. In this case, the warnings and the user are logged in the history. The following list illustrates standard or generic alerts that may be included in the ESN:

File Audit Alerts

These alerts relate to exception conditions that are detected based on the "File Audit Rules" defined for a party.

Business Partner Exception Alerts

These alerts relate to exception conditions that are detected based on the "Business Partner Rules" defined for a party.

Comparative Negligence Alerts

These alerts relate to exception conditions that are detected based on the comparative negligence laws of the state where the loss occurred. For more information, refer to "Comparative Negligence Support" below.

Statute of Limitations Alerts

These alerts relate to exception conditions that are detected based on the statute of limitations laws for the applicable state.

Subrogation Advisor

The ESN assesses the best course of action within the subrogation process so as to improve subrogation performance, increase recoveries, and lower costs. The ESN can assess, for example, the cost-benefit of pursuing demand and/or pursuing a particular course of action, e.g., pursue litigation, etc.

Subrogation Vehicle Valuation

The ESN assesses the validity of a subrogation demand from a third party. For example, electronic audits for certain conditions of the file may be based on the configurable parameters of the demanding party, responding party, and vehicle value, e.g., total loss salvage, loss-of-use conditions, etc.

Subrogation Collaboration

Figure 9:
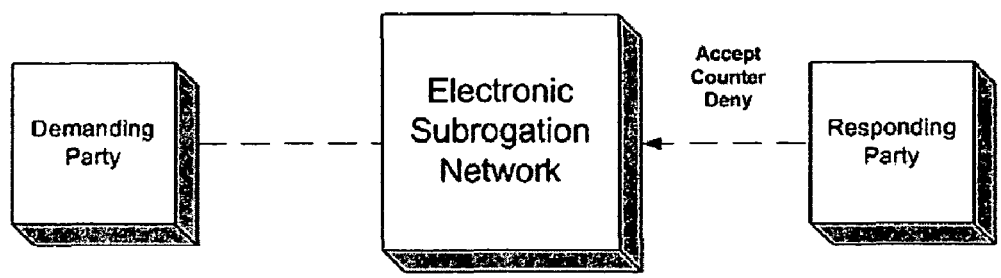
FIG. 9 shows a response options module and workflow process adapted for use with the ESN shown in FIG. 2.
Figure 10:
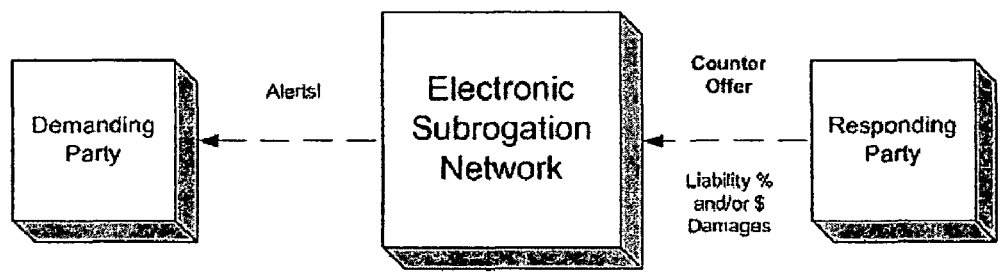
FIG. 10 shows an online negotiation module and workflow process adapted for use with the ESN shown in FIG. 2.
Figure 11:
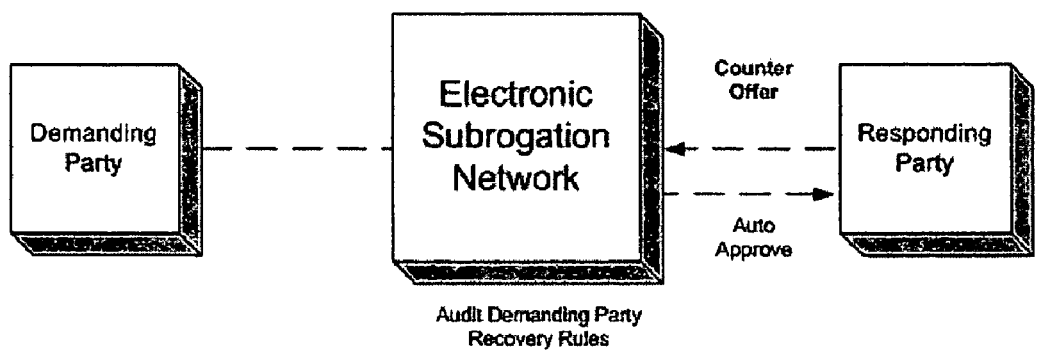
FIG. 11 shows an on-line negotiation/automatic approval settlement module and workflow process adapted for use with the ESN shown in FIG. 2.
Figure 12:
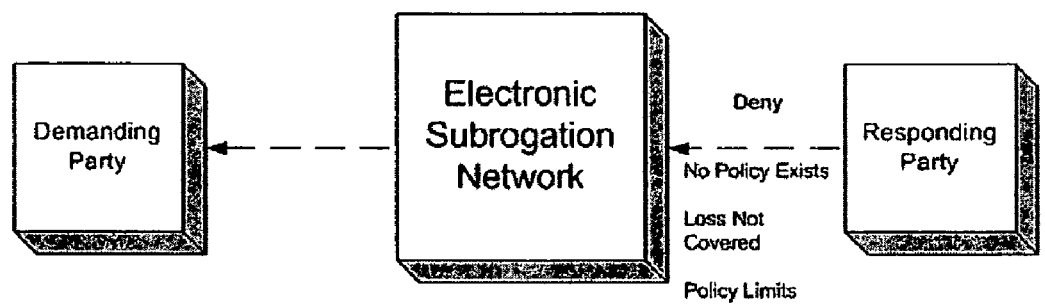
FIG. 12 shows the workflow process for an electronic/automatic denial feature adapted for use with the ESN shown in FIG. 2.

The ESN provides a method for multiple parties including demanding party and responding party to collaborate interactively. As best seen in FIG. 9, a responding party can Accept (agree to pay), Counter (negotiate), or Deny (refuse to pay) a subrogation demand. As best seen in FIG. 10, a responding party can prepare a counteroffer that may include counters on liability percentage and/or damage amounts (e.g., amount of collision damage, amount of rental reimbursement, etc.). A demanding party can define minimum acceptable counteroffers on a file-by-file basis and the ESN will issue an alert to the demanding party if a counteroffer is below a demanding party's minimum. As best seen in FIG. 11, a demanding party can define business rules regarding minimum acceptable counteroffers including liability percentage, damage amounts, and/or total demand, and the ESN can automatically approve counteroffers if the demanding party's business rules are met. As best seen in FIG. 12, a responding party can deny a demand and provide standard denial codes back to the demanding party.

Business Functions

The ESN provides business functions that support subrogation workflow. In addition to the standard functions provided in TABLE 2, the system allows a party to define custom functions that are specific to their business process and workflow. These custom functions can be defined to control data modification or display.

Subrogation Automatic Settlement

Figure 13:
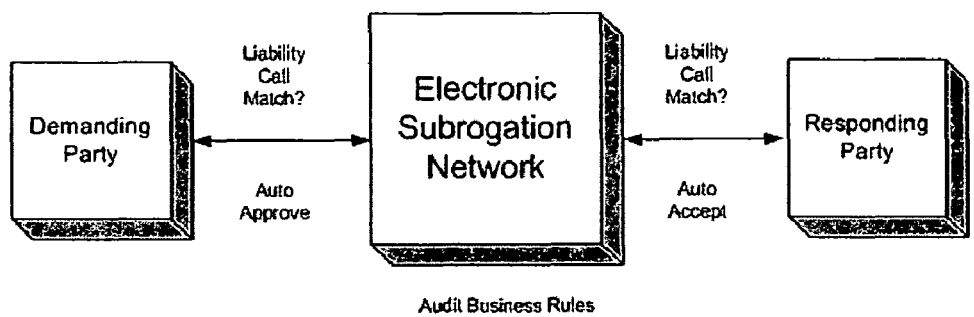
FIG. 13 shows an automatic settlement module and workflow process adapted for use with the shown in FIG. 2.

As best seen in FIG. 13, the ESN provides a method for settling subrogation claims between parties automatically with little or no human intervention by eliminating many manual tasks, and reduce cycle time for subrogation files. The ESN functions to settle files electronically if the file passes both parties' business rule audits and both parties' liability calls (the liability percentage assigned by each party to each party's insured) match or overlap. The liability call from the demanding party is provided in the initial demand submission. The liability call from the responding party is read by the ESN via an electronic interface to the responding party's claim system or via a claim index provided by the responding party. "Anti-gaming" capabilities eliminate responding parties guessing at demanding parties' business rules and/or liability calls.

Subrogation Automatic Counter Claims

Figure 14:
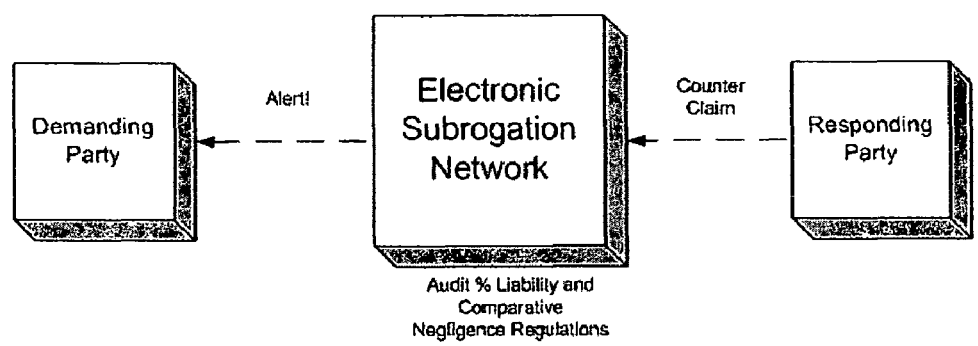
FIG. 14 shows an automatic counterclaims module and workflow process adapted for use with the ESN shown in FIG. 2.

As best seen in FIG. 14, the ESN may create counterclaims when in regulatory compliance, i.e., is configured to include the relevant laws of the state where the loss occurred, so as to help reduce lost counterclaim opportunities, and to help increase subrogation recovery, to help improve productivity of both demanding parties and responding parties by eliminating many manual tasks, and to help reduce cycle time for subrogation files.

Upon settlement of original demand, the ESN can audit liability percentage and comparative negligence regulations of the appropriate state department of insurance then, when the initial demand is settled at a liability percentage less than 100% for the responding party and meets the comparative negligence regulations of the state of loss, automatically prepare a counterclaim for the responding party against the demanding party for their fair share of the liability. For example, if the loss was in a pure comparative state and the two parties agreed on an 80% liability to the responding party on the initial demand, the ESN will prepare a counterclaim demand for the responding party for the 20% liability against the demanding party. Counterclaims are linked to the original demand. The ESN will alert a demanding party if their business rule audits are violated.

Within the ESN, users can create counterclaims in one of two ways—1) Using the "Create Counterclaim" action, or 2) Issuing a new demand where the demanding and responding claim numbers link to an existing demand (in a reverse relationship).

Create Counterclaim

Once the responding party has accepted a demand, the system will determine whether or not a counterclaim opportunity exists for this demand (depending on the liability percentage and the comparative negligence laws of the specific state which apply to this demand).

In processing the "Accept" function for a demand, the system will analyze these conditions. If this demand has the opportunity for a counterclaim, then the system will automatically flag it as such. A responding party specific view "Counterclaim Opportunities" will be provided that lists all demands that are candidates for issuing a counterclaim.

To issue a counterclaim, the responding party will select one of the demands from the "Counterclaim Opportunities" view. When that view is displayed, a new action will be available "Create Counterclaim". This action can be used to create a new demand document that is linked to the initial demand. When this document is created (via Save), the ESN automatically routes the counter claim to the demanding party that issued the initial demand. In doing so, both the initial demand and the counterclaim will be crosslinked (i.e., refer to one another).

Automatic Counterclaim Linking

When two companies issue demands to each other (independently) for the same loss, at the point the second demand is issued, the ESN will recognize the counterclaim relationship and automatically link the demands. This capability handles the situation where both companies believe the other to be "at-fault".

In general, any time the ESN detects that two demands have been issued between two companies (where the demanding and responding claim numbers reference each other); the system automatically "links" these demands.

Once a counterclaim relationship has been identified, the user can easily move back and forth between both claims by selecting the link to the counterclaim. From that point on, the collaboration capabilities for the counterclaim are exactly the same as for the initial demand.

Additionally, the ESN will also apply its knowledge of the comparative negligence laws of the appropriate state and issue warnings in the event a party's ability to issue, or continue with, a counter claim is impaired.

Additional views are provided to enable the responding party to manage counter claims that have been issued.

Within each state, comparative negligence laws are defined which govern the ability of a given party to issue a counterclaim. When a demand is being "Accepted" by a responding party, the ESN will apply the comparative negligence laws of the loss location state. Based on these laws, if the demand is accepted, the ESN will issue warnings to the user under the following situations: a counterclaim has not been issued, but accepting this demand will prevent a counterclaim from being issued; and a counterclaim has been issued, but accepting this demand may "invalidate" the counter claim that is currently "in negotiation". In this case, the system will require the user to override this warning in order for the demand to be accepted.

Major Types of Comparative Negligence Laws

There are three major types of negligence laws—pure comparative, modified comparative (49% and 50%), and none (i.e., contributory negligence). The following is a summary of how these laws affect the ability to issue claims and counterclaims.

Pure Comparative

The at-fault party can issue a counter-claim for any liability between 1% and 50%.

Modified Comparative 50%

Unless both parties agree to liability of 50%, the at-fault party cannot issue a counter claim.

Modified Comparative 49%

The at-fault party cannot issue a counter-claim. If both parties agree to 50% liability, then neither party can issue a claim to the other.

None

No subrogation is allowed. Neither party can file a claim.

Subrogation Assignment to Third Parties

The ESN provides a method for assigning subrogation files to third parties so as to improve productivity of both demanding parties and responding parties, reduce subrogation cycle time, and provide consistent management information.

Figure 15:
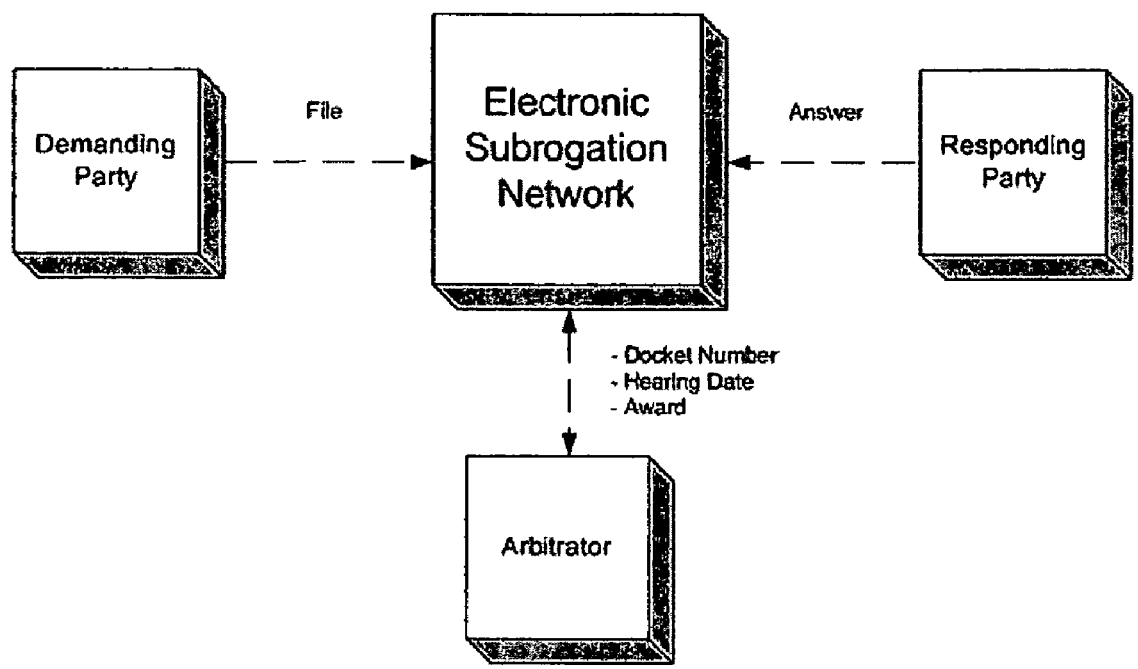
FIG. 15 shows an assignment (to arbitrator) module and workflow process adapted for use with the ESN shown in FIG. 2.

As best seen in FIG. 15, a demanding party can place arbitration filing through the ESN. Once the demanding party selects the arbitrate function, the ESN electronically notifies the responding party that the demanding party is filing for arbitration. This gives the responding party one more chances to settle prior to binding arbitration. The demanding party can then electronically file arbitration at any time after the initial notice is sent to the responding party.

Through its multi-party support function, the ESN notifies the arbitrator that the demanding party has filed for arbitration and provides the arbitrator with a view of all demands that have been filed for arbitration. The arbitrator can then enter hearing dates, docket numbers and other information into the file. The responding party can then review the arbitration filing online and file their answer. Once the hearing is complete and the judgment is awarded, the arbitrator can notify both parties of the award through the ESN. In this way, the ESN becomes an electronic "gearbox" for arbitration.

The ESN is designed to enable controlled access to each "shared" subrogation folder by multiple parties. In doing so, each party typically has a specific "business relationship" to that folder (Demander, Responder, Arbitrator, etc.). The ESN explicitly defines these named relationships; and for each relationship, the ESN explicitly controls what information is seen within the folder and what actions can be taken.

For example, suppose three parties are set up on the ESN—Gordon Insurance, Acme Insurance, and Arbco. If Gordon issues a demand to Acme, then when the subrogation folder for that demand is created, the demanding party will be Gordon (Demander relationship) and the responding party will be Acme (Responder relationship). As such, all users of Gordon will be limited to the data and functions associated with the "Demander" relationship when accessing this folder; and all users of Acme will be limited to the data and functions associated with the "Responder" relationship when accessing this folder.

Additionally, if Gordon submits the file for arbitration, then their arbitrator (Arbco) will be given access to the file. In doing so, all users of Arbco will be limited to the data and functions associated with the "Arbitrator" relationship when accessing this folder. Furthermore, if Acme had submitted a demand to Gordon, then the Demander/Responder relationships would be flipped for that specific subrogation folder.

When a company is setup on the ESN, all possible relationships for a given company are defined. In the example above, both Gordon and Acme would be configured to support both the "Demander" and "Responder" relationships. However, Arbco would be configured to only support the "Arbitrator" relationship (since it cannot directly issue or respond to subrogation demands).

Figure 16:
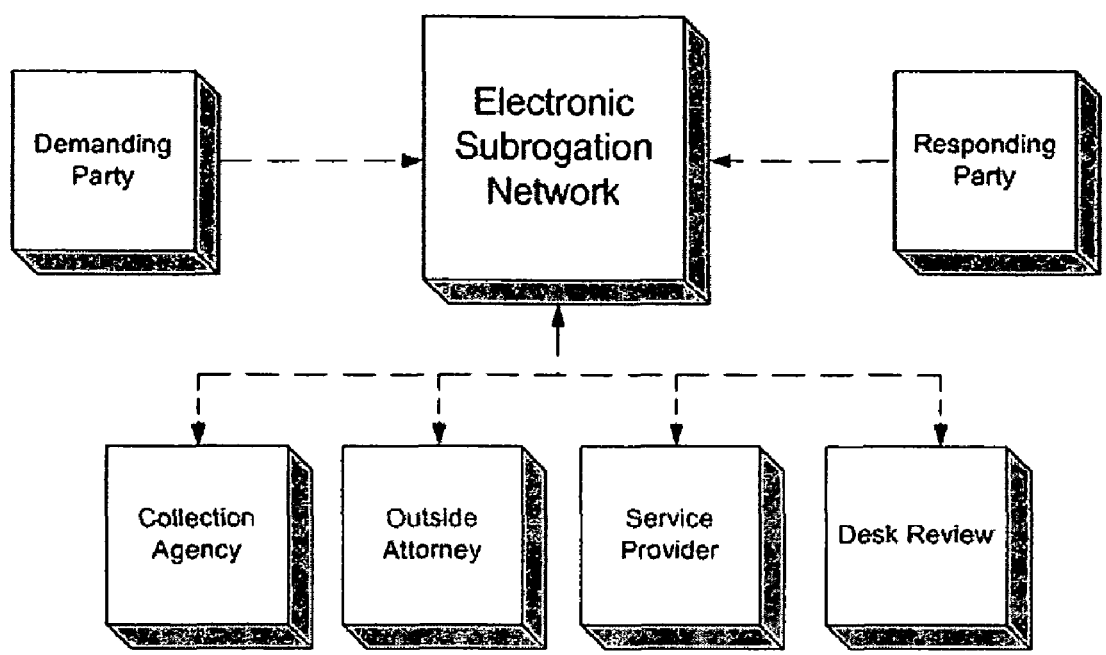
FIG. 16 shows an assignment (to vendors) module and workflow process adapted for use with the ESN shown in FIG. 2.

As best seen in FIG. 16, either a demanding party or a responding party can electronically assign a subrogation file to a vendor (e.g. collection agencies, outside attorneys, service providers, etc.) through the ESN. When a demanding party or responding party uses the assign function, the ESN automatically notifies the third party that there is a file they need to work. Depending on the interface from the third party, the ESN either notifies through an e-mail with a URL link or actually passes the file information through an interface to the third party's system. The ESN also provides the ability for third parties to enter status updates in the ESN.

Subrogation Payment Handling

The ESN provides a method for handling payments between parties involved in a subrogation claim so as to improve productivity of both demanding parties and responding parties by eliminating many manual tasks, and lower the costs of payment handling.

Figure 17:
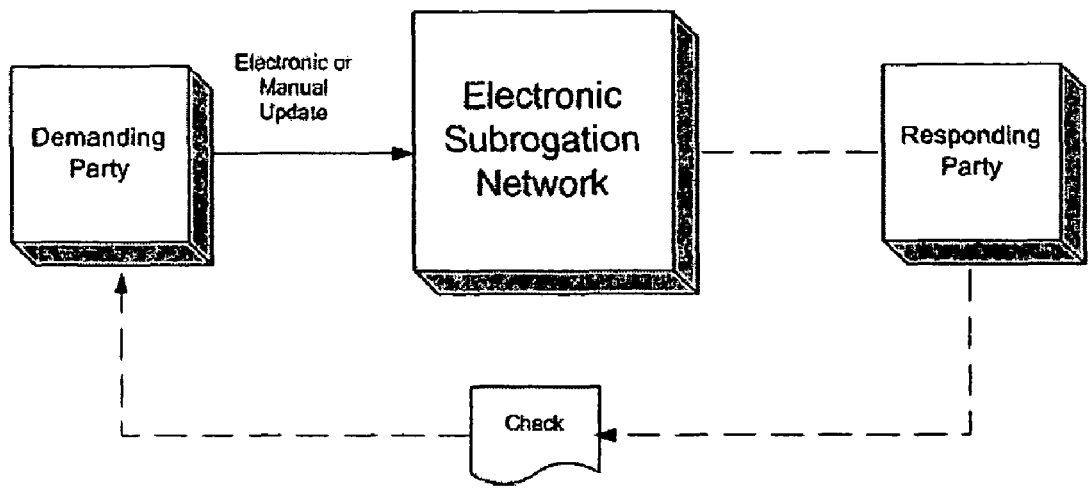
FIG. 17 shows a manual payment module and workflow process adapted for use with the ESN shown in FIG. 2.
Figure 18:
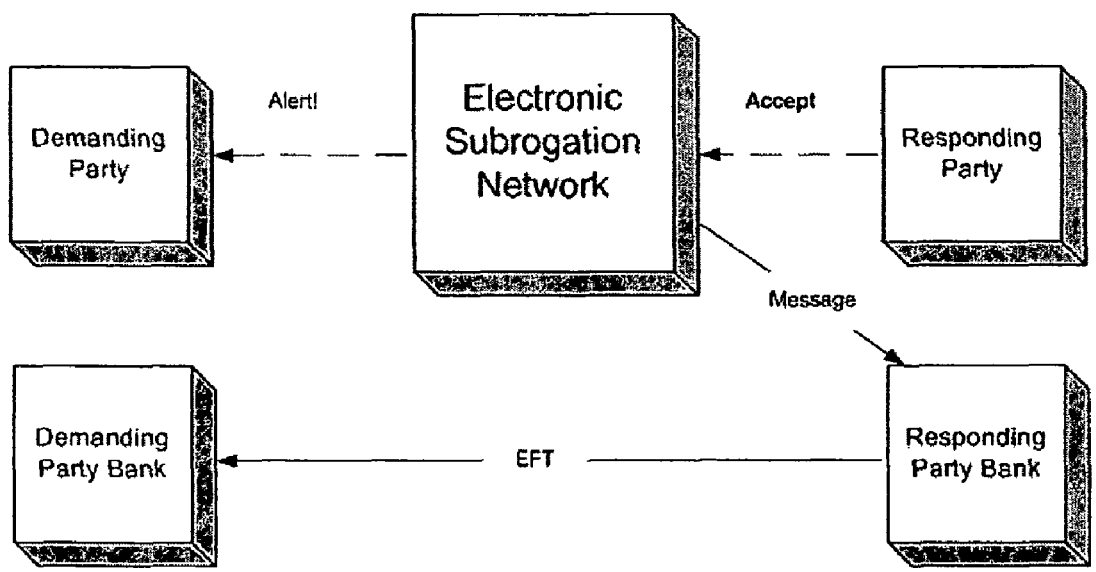
FIG. 18 shows an electronic payment module and workflow process adapted for use with the ESN shown in FIG. 1.

As best seen in FIG. 17, after receiving payment from responding parties, demanding parties can enter payment information manually into the ESN or upload files of payment information (payment amounts, dates, associated claim numbers, etc.) into the ESN. The ESN will automatically close out files where payment has been made in full. As best seen in FIG. 18, EFT payments can be triggered automatically upon acceptance by the responding party—the ESN can generate a message to a responding party's bank to trigger EFT or the ESN can generate a message to a responding party's system that in turn will initiate a message to a bank to trigger EFT (in the latter case, a responding party's system will send an EFT confirmation message back to the ESN).

Subrogation Payment Netting

Figure 19:
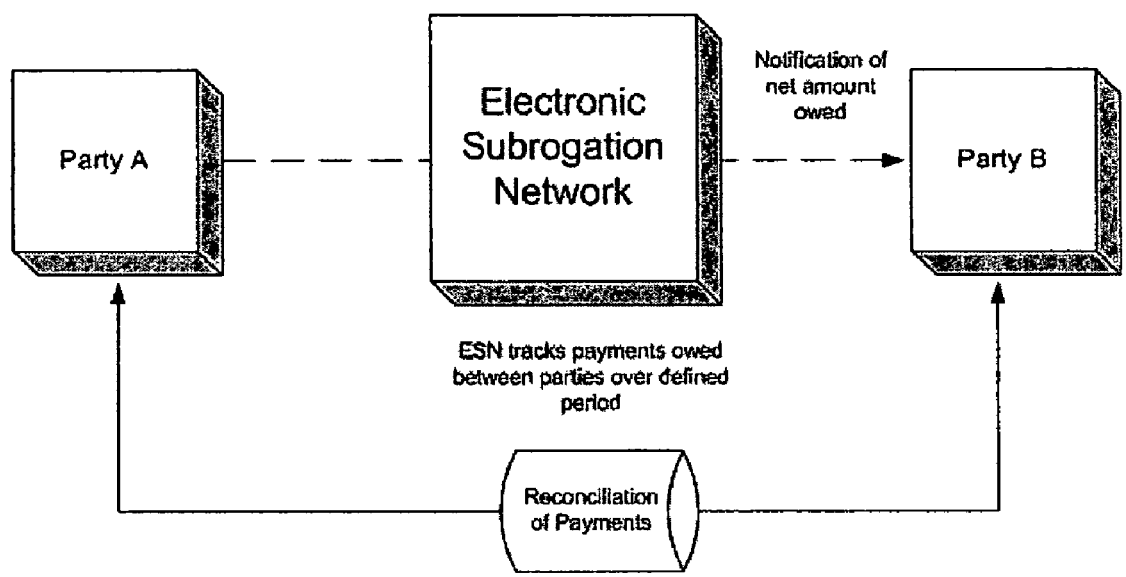
FIG. 19 shows a subrogation payment netting module and workflow process adapted for use with the ESN shown in FIG. 2.

As best seen in FIG. 19, the ESN provides a method for netting payments between parties involved in a subrogation claim so as to improve productivity of both demanding parties and responding parties by eliminating many manual steps, and lower the cost of payment handling.

The ESN functions to track payments owed and payments due over any time period for any member and provides information on or automatically triggers a payment. Payments can be netted bi-laterally (e.g., between two parties as best seen in FIG. 19) or multi-laterally (between a party and the ESN, which represents all members participating in the netting service). In bi-lateral netting, the ESN keeps track of the payments owed between two parties and initiates a notice for EFT to the party who has the payment balance at the end of any time period defined by the two parties. For example, if Party A and Party B agree to net payments every week, the ESN will track the amount of all the payments owed from A to B in the week and all the payments owed from B to A in the week, determine which party owes more and initiate a payment notice to the appropriate party. In multi-lateral netting, the ESN nets all payments and receipts with all the parties participating in the netting service for a given party. The ESN is then paid by the party or pays the party depending on the balance. Parties can configure the ESN to define party-specific netting periods. The ESN will provide management information and reconciliation file to allocate netted payments to each appropriate file.

Subrogation Management Reporting

The ESN provides management information to members of the network so as to improve subrogation performance for all parties, and provide better management information to both subrogation managers and claims managers. The ESN provides two types of online reporting—detail and summary. For subrogation, a number of standard reports may be provided with the ESN (listed below). The ESN allows members to filter, sort, and view management reports online. In addition to the standard reports, a member can define custom reports that are specific to their organization's business process and workflow.

For summary reports, typically data can be aggregated along the major dimensions of time period, geography, party, office, region, department, file handler/team, and status. Within these dimensions, the main data elements that can be summarized may include Demand Total Dollar, Response Total Dollar, Recovery Percentage Cycle Time or other relevant or desired data elements. For any of the identified data elements, the following summary statistics are generally supported: sum, average, weighted average, percentage, maximum, minimum, and count. However, other needed statistics may be supported.

| Typical Demander Reports | |
|---|---|
| Pending Files | Total Payments - Amount demanding party paid to close coverage |
| | Total Demands - Amount demanding party demanded |
| | Number of Files - Number of open files |
| Dollars Recovered Files | Total Dollars Recovered - Total Dollars recovered from all closed files |
| | Avg. Recovery Percentage -- Total Dollars recovered divided by the total Dollars demanded |
| | No. of Files - Total number of closed files |
| | Avg. Cycle Time - Date of demand issuance to payment receipt |
| Cycle Time | Date of Loss to Demand Issuance (days) |
| | Demand Issuance to Promise-to-Pay (days) |
| | Demand Issuance to Payment Receipt (days) |
| | Date of Loss to Payment Receipt (days) |

| Responder Reports | |
|---|---|
| Pending Files | Total Payments - Amount demanding party paid to close coverage |
| | Total Demands - Amount demanding party demanded |
| | Number of Files - Number of open files |

Responder Reports

| | |
|---|---|
| Paid Files | Total Dollars Paid - Total Dollars paid from all closed files |
| | Avg. Payment Percentage - Total Dollar paid divided by the total Dollars demanded |
| | No. of Files - Total number of closed files |
| | Avg. Cycle Time - Date of demand issuance to payment receipt |
| Cycle Time | Demand Issuance to Promise-to-pay (days) |
| | Demand Issuance to Payment Receipt (days) |
| Counter Claims | Total Dollars Recovered - Total Dollars recovered from all closed files |
| | Avg. Recovery Percentage - Total Dollars recovered divided by the total Dollars demanded |
| | No. of Files - Total number of closed files |
| | Avg. Cycle Time - Date of counter claim issuance to payment receipt |

Operational Reports

Operational Reports are designed to provide management information to system administrators. Standard reports include User Profile Reports and Usage Reports.

Subrogation Benchmarking

The ESN provides a method for members of the network to conduct benchmarks of best practices across the insurance industry so as to improve subrogation performance in all insurance carriers, and provide better management information to both subrogation managers and claims managers. The ESN allows members to benchmark various parameters of their subrogation and/or claims operation against the aggregate industry based on the ESN's database. For example, demanding parties may benchmark their recovery ratios against the industry for a specific geographic area; responding parties may benchmark their payout ratios against the industry for a specific geographic area.

Unified Data Model (UDM) for Subrogation

Figure 20:
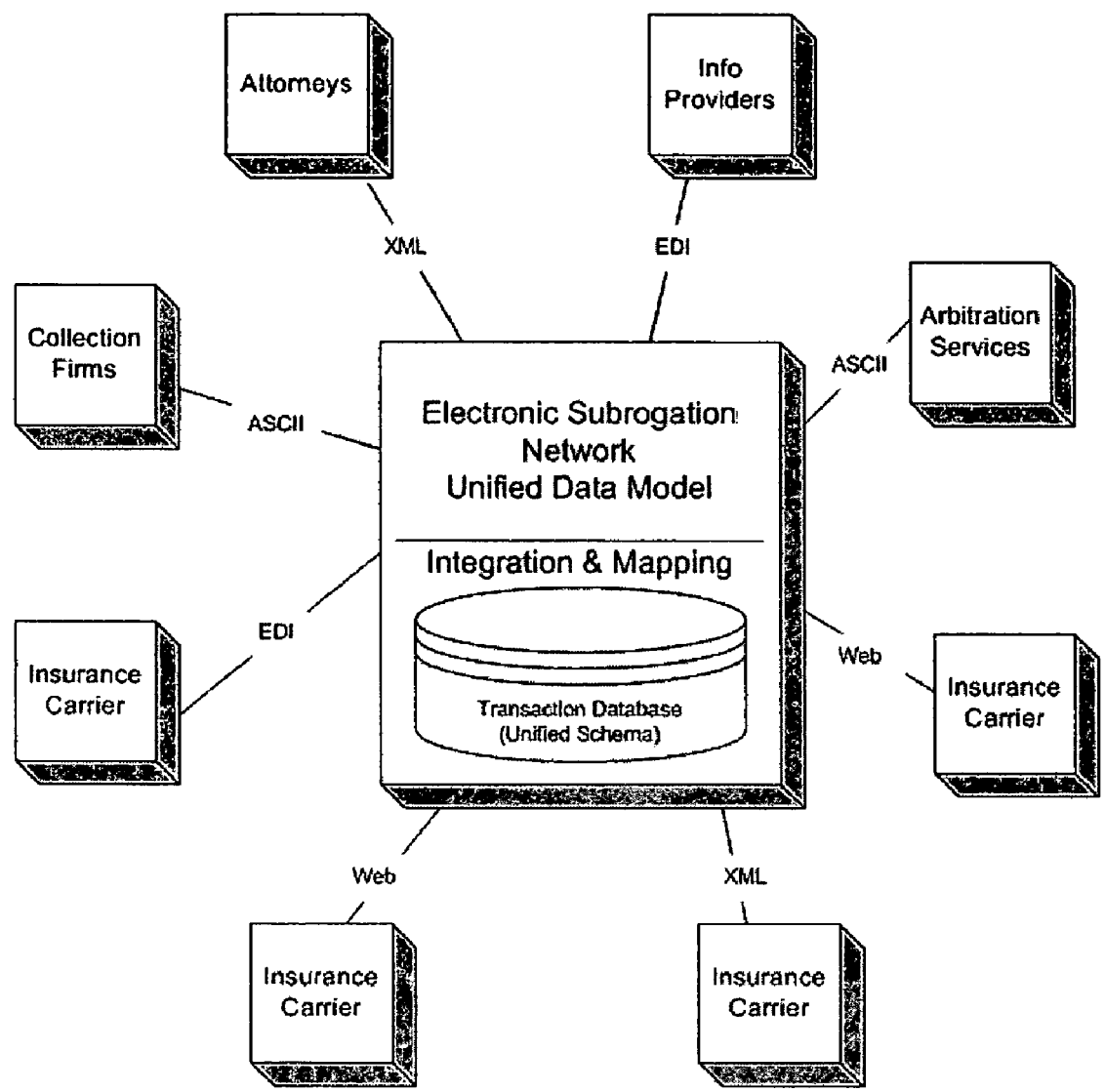
FIG. 20 shows a unified data model (module) adapted for use with the ESN shown in FIG. 2.

As best seen in FIG. 20, the ESN provides a method for organizing and modeling subrogation-specific business information so as to provide consistent data to both demanding parties and responding parties, and provide translation of data from one format to another format. The ESN provides entities, attributes, and relationships specific to subrogation workflow. Incoming data formats are translated from their source format to the UDM format. UDM data formats are translated to outgoing data formats. Symantec translations occur such that the meaning of any particular element is consistent from file-to-file.

TABLE 1

Inter-company States (Status)
A demand file can only be in one of the following discrete "inter-company" states at a time.

| Discrete State | Description |
|---|---|
| Pending Issuance | Indicates that the demand file has been received by the ESN (either electronically or via demand file upload) and that the ESN detected an error that is preventing this demand from being issued (e.g., missing or invalid data). At this point, the demand has not been issued to the responding party and can only be viewed by the demanding party. |
| Pending Routing | Indicates that the demand has been issued and assigned to a responding party, but this party has not "routed" this demand within its organization. For responding parties using semi-automated routing, this status is normal. For responding parties using automated routing, this status is rare. |
| Pending FNOL | Upon receipt of the demand, if the demand represents the "First Notice of Loss" for the responding party, then this status indicates that the responding party is in the process of setting up a claim file within their claim system. |
| Pending Response | Indicates that the demand has been routed to a file handler within the responding party's organization and is awaiting an initial response. |
| Pending Investigation | Indicates that the demand has been initially reviewed and is being investigated by the responding party. |
| Counter Offer Issued | Indicates that the responding party reviewed the demand, and that a counter offer has been made for consideration by the (D)emanding party. |
| Counter Offer Approved | Indicates that the demanding party reviewed the counter offer and agrees to the terms of the counter offer. |
| Revised Demand Issued | Indicates that the demanding party reviewed the counter offer and that the demand has been revised for consideration by the (R)esponding party. |
| Disputed | In the event that demanding party and responding party cannot agree on the demand, and if arbitration is not an option, then this status indicates that the demand is in dispute. At this point, the demanding party is typically evaluating whether or not to pursue litigation. |
| Denied | Indicates that the responding party has denied the demand. |
| Pending Arbitration Filing | Indicates that the demanding party intends to submit this demand to arbitration and is now in the process of preparing their contentions. |
| Arbitration Filed | Indicates that the demand is formally in arbitration. The demanding party has submitted this demand for arbitration and the (R)esponding party is now required to submit their response to the arbitration filing. |
| Arbitration Answer Filed | Indicates that the demand is formally in arbitration. The responding party has submitted their response to the arbitration filing. The file has been assigned to an (A)rbitrator and is awaiting the award of a settlement. |
| Settlement Awarded | Indicates that the arbitration process is now complete and that a settlement has been awarded. The responding party must now "Accept" the settlement. |
| Accepted | Indicates that the responding party has "Accepted" the demand as it currently stands, and will now proceed with the payment of the agreed amount to the demanding party. This status represents a formal "promise to pay" by the responding party. |
| Closed | Indicates that the file has been closed. In the typical case, this will represent that the demanding party has received all outstanding payments as agreed from the responding party. If not, the file disposition codes will indicate the reason for file closure. |

Aggregate States

In addition to the discrete states listed above, the workflow subsystem may include the following "aggregate states." An aggregate state is a set of two or more discrete states. Standard views are provided within the system to display files in a given aggregate state.

| Aggregate State | Description |
| --- | --- |
| Open | Any file that is not "Closed". |
| Pending Acceptance | Any file that is "Open" and not "Accepted". |
| In-Negotiation | Any file that is "Counter Offer Issued", "Counter Offer Approved", or "Revised Demand Issued". |
| In-Arbitration | Any file that is either "Arbitration Filed" or "Arbitration Answer Filed". |

TABLE 2

Demander Functions
The following section lists the business functions that are typically specific to a Demander.

| Function | Description |
| --- | --- |
| Create Demand | Manually create and issue a new demand. |
| Repair | Manually correct an incomplete or invalid demand that was created from a demand file upload or an electronic message. |
| Delete | Manually delete an incomplete or invalid demand that was created from a demand file upload or an electronic message. Once a demand file has been issued, it cannot be deleted. |
| Revise | Revise a demand. This function is typically used in response to a counter offer that was received from a responding party. |
| Approve | Approve a counter offer. This approval indicates the acceptance, by the demanding party, of the proposed counter offer and allows the responding party to now "Accept" the demand as currently proposed in the counter offer. |
| Arbitrate | Prepare to submit a demand for arbitration. This function indicates to the responding party that the demand is being prepared for arbitration. This action places the file in a state (Pending Arbitration Filing) that allows the demanding party to prepare and attach their arbitration contentions. |
| File Arbitration | Formally submit the demand for arbitration. This action implicitly grants "Arbitrator" access rights for this specific file to the arbitration service, thereby allowing them to process the arbitration filing. |
| Supplement | Amend a specific demand to include a "supplement". |
| Dispute | Indicate that no agreement can be reached with the responding party. This function is typically used to indicate that the demanding party cannot reach agreement with the responding party and that arbitration is not an option. At this point, the demanding party will decide whether or not to litigate the file or close it. It places the file in a state (Disputed), which allows the demanding party to easily identify all files in this condition. |
| Apply Payment | Record a payment received for a file. This function will apply the payment to the specific file. If the payment relieves the outstanding balance on the file, then the file will be automatically closed. |
| Close | Close a file. This function will typically be performed automatically when the final payment is applied to the file. When used manually, the user will be required to specify a file disposition representing the reason for closure. |
| Reissue | Reissue a demand to another party. If a demand was issued to the wrong responding party, this function allows the demanding party to reissue the demand to the correct responding party. |
| Reopen | Reopen a file that has been closed. This function allows a demanding party to re-open a file that has been closed for the purpose of presenting additional payment amounts for recovery, or for providing new information to the responding party for reconsideration. |
| Upload Demands | Upload a file of demands. This function is used to manually upload a file of demands to the ESN. In processing this command, the ESN will ensure that the complete contents of the file are successfully stored on the ESN. It will then respond back to the user. In the background, the ESN will process each demand in the file by creating a demand and issuing the demand to the correct party. A view will be provided that enables the user to review the status of the subsequent processing of the demand upload. |
| Upload Payments | Upload a file of payments. This function is used to manually upload a file of payments to the ESN. In processing this command, the ESN will ensure that the complete contents of the file are successfully stored on the system. It will then respond back to the user. In the background, the ESN will process each payment in the file by applying the payment to a specific demand file. If the payment relieves the outstanding balance in the file, it will automatically close the file. A view will be provided that enables the user to review the status of the subsequent processing of the payment upload. |
| Responder Functions | The following section lists the business functions that are typically specific to a Responder. In general, the main responding party functions are available to both on-network and off-network responding parties. Where a function is only available to an on-network responding party, it is so indicated. |
| Accept | Accept a demand. This function is used to accept the terms of the demand as it currently stands. In doing so, this represents the formal "promise to pay" commitment on the part of the responding party. |
| Counter | Make a counter offer. This function is used by a responding party to make a counter offer to a demand. When making the counter offer, the responding party can alter the liability percentage or the payment amounts. |
| Investigating | Indicate that the demand is being investigated. This function will change the status of the file to "Pending Investigation". |

TABLE 2-continued

Demander Functions
The following section lists the business functions that are typically specific to a Demander.

| Function | Description |
| --- | --- |
| File Arbitration Answer | File a response to an arbitration filing. If the demanding party has submitted the file for arbitration, the status of the file will be changed to "In-Arbitration (R)". At this point, the responding party may prepare and attach its response to the arbitration filing. After the response has been attached, then this function is used to indicate that the response has been filed. This function will change the status of the file to "In-Arbitration (A)" indicating that it is now ready to be reviewed by the arbitrator for a final judgment. |
| Deny | Deny the demand. This function is used to indicate that the demand is being denied. When denying a demand, the responding party must select a denial code from the ESN's list of standard denial codes. |
| Create Counter Claim | Create and issue a counter claim. After a demand has been accepted, the ESN will determine whether or not the responding party can issue a subrogation counter claim. If so, then this function is used to create and issue the counter claim. |
| Route Demand | Route an incoming demand within the responding party's organization. For responding parties using semi-automated demand routing, this function is used to manually route/assign the demand to the appropriate team or individual. |
| FNOL | Indicates that the demand represents the "First Notice of Loss" to the responding party. This function changes the status of the file to "Pending FNOL" and allows the responding party to first establish a claim file within their claim system. |

Arbitrator Functions
The following table lists the business functions that are typically specific to an Arbitrator.

| Function | Description |
| --- | --- |
| Award Settlement | Award a settlement to the demanding party that filed the arbitration. This function is used by an arbitrator to award a settlement to the demanding party that filed the arbitration. |

Common Functions
The following table lists business functions that are not specific to a given relationship and may be shared by all relationships (unless specifically noted). Where a function is only available to an on-network party, it is so indicated.

| Function | Description |
| --- | --- |
| Attach | Attach a related document to the file. When using this function to attach the related document, the document must exist as a file on the local system or network accessible by the local system. The user will be required to enter the file name, or use the "file browser" to locate the file to be attached. When attaching a document, the attachment can be marked as "Private". Private attachments can ONLY be viewed by the users of the party who created the private attachment. |
| Fax Attachment | Prepare the fax cover sheet for related documents that are being attached to a file by fax. When a related document exists as a paper document, this document can be attached to the file by faxing the document to the ESN. To do so, a special fax cover sheet needs to be attached as the first page of the fax. This function is used to create the special fax cover sheet. The fax cover sheet will be displayed in a separate browser window where it can then be printed. |
| Note | Make a free-form text note in the file. When making a note, the note can be marked as "Private". Private notes can only be viewed by the users of the party who created the private note or other designees. |
| Inquiry | Make a free-form text note requesting a clarification or more information from another party. This function differs from the Note function above only in that a "reply" is expected from the party to whom the request is being issued. |
| Update | Update any other data fields within the file that do not affect the business terms of the demand (e.g., loss date, loss location, responding party's claim number, etc.). This function is used to update certain details of the file that do not affect the current terms of the subrogation demand (i.e., this function does not allow the payment amounts or the liability percentage to be modified). A separate version of this function is available for each party to maintain shared data elements or party specific data elements (that are private to that party). |
| Assign | Transfers file ownership to another team or individual within an organization. This function is used accommodate intra-company workflow and file assignment by allowing the ownership to be changed within an organization. |

Background—JView

During the mid to late 90's, the commercial use of the Internet emerged and flourished due in large part to the emergence of user-friendly browser technology (e.g., Mosaic, Netscape, Internet Explorer, etc.). This movement fueled the wide scale implementation of web-based systems (web servers) to support the growing number of browser-based users. One key to this movement was the definition of message format standards (i.e., HTML) that were supported by all browsers.

The initial web servers were used to provide static content by merely transmitting static web pages (containing HTML) to a browser. Using this approach, web sites were created by developing sets of interrelated web pages that were linked together.

As the use of the Internet expanded, it became necessary for these servers to deliver dynamic content (e.g., a page with the current status of an order, a page with the current arrival time of a flight, etc.). Dynamic content requires that the server dynamically construct the information for each browser request. In doing so, the server uses logic to analyze what information is requested, retrieves the information from the necessary data source, and dynamically constructs the web page containing HTML (i.e., HTML Generation) for transmission back to the browser. Using this approach, the browser cannot distinguish a static page from a dynamic page.

Browser technology also evolved in parallel with web server technology. Most notably, was the development of a standard browser scripting capability that allowed a user to interact with a web page without creating a new request back to the web server. This greatly enhanced the user interaction and responsiveness capabilities of the browser making it possible to construct a rich user interface (similar to that of a standard fat-client interface). This scripting capability was initially referred to as JavaScript, but is now formally referred to as ECMAScript.

Requirements and Challenges

Currently, most web-based systems expend processing cycles to format the dynamic content into HTML format. This processing load can account for 30-50% of the processing load for a typical server. Relative to the size of the information being transmitted, the size of the HTML stream containing this information is substantially larger (by 3-5×). This requires additional communication bandwidth for transmission. Being dependent on the server for web page generation requires each user interaction to be processed by the web server, which results in increased response time for various operations (e.g. sorting a result page of items, performing data validation, performing calculations, etc.).

The JView subsystem, described below, overcomes these limitations by 1) off-loading the HTML generation to the client system, thereby substantially reducing the processing performed on the server, 2) reduces the size of the messages transmitted between the browser and the web server, thereby substantially reducing the communication bandwidth required, 3) provides a rich set of local functions (performed on the client system) that eliminate requests to the server; this further reduces the processing load on the server and greatly enhances the overall responsiveness of the system, and 4) fully utilizes existing web browser standards thereby maintaining compatibility with existing client browsers (i.e., it supports a true thin-client implementation and does not utilize any special browser extensions—e.g., browser plug-ins, java applets, or ActiveX controls).

These capabilities are achieved with a JavaScript subsystem that runs within the browser and an HTML compatible message structure (a "Siteras Transaction Message"—STM) that is transmitted between the browser and the server.

Within the client browser, the JView™ subsystem consists of a series of JavaScript files. In response to an initial request to the web server, a small set of JavaScript files (i.e., the JView™ subsystem core) are downloaded to the client browser. Once downloaded, these files are cached by the browser (just like other images or static pages). Additional JavaScript files are downloaded on a modular basis as they are needed by the various application interactions with the server (once downloaded, these additional files are also cached by the browser). These JavaScript files provide the browser with the ability to perform the following functions locally (without any further interaction with the server): HTML Generation (all HTML generation is performed by the JView™ subsystem on the client); sorting (including multi-column sorting); data formatting (dates, numbers, percents, etc.); dynamic HTML (e.g., expanding/collapsing panes/tabs); print formatting and preview; hierarchical menuing; syntactical editing and validation; basic application validation; static and dynamic domain management (i.e., checking a value against a list of values); required field checking; application calculations; and response time measurement Within the JView™ subsystem, a unique set of JavaScript coding techniques are employed to keep the response time overhead for the JView™ subsystem processing itself to a minimum.

Each interaction with the server consists of a standard HTTP request/response (the format of which is HTML 3.2 based and contains a "Siteras Transaction Message" (STM)). The STM is a hierarchical structure of key-value pairs (similar to an XML based message in structure and content). Unlike a typical server generated HTML message, the STM contains mostly business data. As such, the size of this message is greatly reduced. Essentially, this message structure is used to deliver a "data island" to the client browser where the JView™ subsystem can operate on it generically. NOTE: There are two reasons why the JView™ subsystem uses the STM vs. XML format—1) The STM maintains compatibility with a broad set of browsers (many browsers do not support XML), and 2) XML is also very verbose and is 1-2× the size of the STM.

JView™ Benefits

The following is a summary of the key features and benefits of the JView™ subsystem architecture. Taken together, these features allow the JView™ subsystem to approach the performance and functionality of a fat-client system, with ease of use and manageability of a thin-client system.

Broad Browser Compatibility

The system can work with any browser that supports JavaScript v1.2, HTML 3.2, and CSS Level 1.0. This provides support for a broad number of browsers, including older versions of mainstream browsers (e.g., 4.x series browsers from both Microsoft and Netscape). It does not utilize any of the features that are specific to a given browser type or version.

Totally Thin Client

The system supports true "thin-client" architecture in that it does not require or utilize any java applets, java applications, browser plug-ins, or active-X controls. Additionally, it does not utilize persistent "cookies".

Exploits Client System Processing Power

Many of the JView™ subsystem features are aimed at utilizing the local processing power of the client machine. This greatly improves the responsiveness of the system, reduces the number of interactions with the server, and offloads the server from having to perform this processing. The performance of the JView™ subsystem has been optimized to have as minimal an impact as possible on the response time to/from the server. In general, the JView™ subsystem processing adds less than 1 second of response time to any server interaction. Additionally, as the processing power of client systems continues to improve the response time overhead due to the JView™ subsystem processing should continue to reduce.

Reduces Transmission Size

On a transaction-by-transaction basis, the size of the STM stream to/from the server is 4 to 5 times smaller than the comparable server generated HTML page. This characteristic makes it ideal for applications where dial-up access or other low-bandwidth channels (e.g., wireless) are still dominant.

Reduces Server Processing Load

Due to the offloading of HTML generation to the client system, and the reduced number of interactions with the server (because of the JView™ subsystem local processing capabilities), the processing load for the typical server is reduced by 30-50%.

Improves End User Response Time

Due to reduced transmission size, the use of dynamic HTML, and the other functions and services that are performed locally, the JView™ based subsystem outperforms a typical server based HTML implementation by a factor of 8-10 times.

Rich User Interface

Due to the local processing capabilities (described above), the user interface capabilities of the JView™ subsystem are comparable with those of many fat-client systems.

Improves User Interface Development Productivity

The typical development cycle for thin-client user interfaces involving dynamic content starts with the graphic designer creating static pages as prototypes. Once these are approved, they are given to an engineer to be coded (so that the pages can be dynamically generated within the server). Multiple iterations of review and correction often follow. In general, this is a serial development process.

With the JView™ subsystem architecture, the development of the user interface can proceed in parallel with the development of the server side transaction processing code. All that is needed at the outset is the definition of the STM (i.e., the data packet) for each type of interaction. Once the STM is defined, both the UI and the server side code can be developed in parallel. In addition, there is no effort wasted on a UI prototype. Various iterations of the UI can be developed and refined, and once done; the UI is ready for production. Only a final integration test with the server side code is needed to ensure operability.

Provides a Foundation for User Interface Customization

Since the UI is maintained externally from the server code, and since the transaction request is message based, the JView™ subsystem architecture supports a high degree of UI customization (without the need to modify the code on the server).

Commercial Example

The Electronic Subrogation Network is a commercial example of a fully operational system that embodies the concepts described herein specifically for the vertical market of Insurance Subrogation claims Processing.

Terminology

This section contains terminology definitions that are useful in understanding the concepts described in the description that follows.

Browser-Based Client

A client system should have a browser that supports HTML 3.2 (or higher) and ECMA script 1.0 (or higher). (ECMA script is commonly referred to as JavaScript). Examples include, but not limited to, Microsoft Internet Explorer v4.0 or higher and Netscape Navigator 4.7 or higher.

Server-Based HTML Generation Approach

Any approach wherein the server produces an HTML stream and where such stream contains the user-interface tags such that the browser merely needs to "render" this HTML stream for display.

End-User Session

A finite period of time, usually denoted by explicit logon and logoff events, that allows a given user to conduct one or more application specific processing requests.

Basic Thin Client Architecture

An architecture that provides application functionality to an end-user via a browser-based client that accesses a server, wherein the browser-based client does not rely on any special extensions including, but not limited to, non-standard plug-ins, download-able java applets, and/or ActiveX controls.

"Siteras Transaction Message" (STM)

A message between a browser and a server conforms to standard HTML format. This message is used to transmit transaction data between a server and the browser. Unlike a typical HTML message, it uses JavaScript syntax to encapsulate transaction data.

Detailed Description—JView

The JView™ subsystem is an object-oriented system that consists of a modular set of JavaScript, CSS and graphic files. The JView™ subsystem runs within browsers that support ECMAScript 1.0 (i.e., JavaScript).

This section contains detailed process and component descriptions related to the JView™ subsystem, and discusses concepts and technologies known in the computer field such as:

Object-oriented design and programming
Basic Internet Fundamentals (browser/server interaction, HTTP requests/responses, TCP/IP basics, etc.)
HTML
CSS
JavaScript
W3C Document Model (DOM)

JView™ Subsystem Files

The files that make up the JView™ subsystem can be divided into the following categories—Core, Business Classes, Images, Core Display Components, Display Components, Domain Components, Views/Forms, Logos, and Application Query Components.

Core Files

These files perform the generic services of the JView™ subsystem used by all application interactions. These files are a small subset of the overall application system. Since these files are reloaded by the by the browser with each interaction, it is important to minimize the total size and number of the files in this set. The following table describes the files included in this category.

| File | Description/Functions |
| --- | --- |
| jv_main_000.js | JView ™ Main. Contains the class definitions needed for initialization. Controls the load sequence for the remaining files in the Core. Contains common JavaScript functions (service functions) that are used by the entire JView ™ system. |
| jv_jvmgr_000.js | JView ™ Manager. Contains the JVMGR class definition. |
| jv_jvbase_000.js | Base Classes. Contains the abstract class hierarchy used to represent the data (objects) received from the server in the STM. These classes are subclassed by the business classes (described later). |
| jv_jvdisp_000.js | Display Classes. Contains the abstract class hierarchy used for any UI elements that are displayed in the browser. These classes are subclassed by the display components (described later). |
| jv_JView_000.js | JView ™ Display Class. Contains the JVIEW ™ class definition. |
| jv_stm_000.js | STM Classes. Contains the class definitions that are used to represent the major components of the STM received from the server. |
| jv_dommgr_000.js | Domain Manager. Contains the JVDOMAINMGR class definition. |
| jv_global_000.js | JView ™ Globals. Contains global constants used throughout the entire JView ™ subsystem. |

| File | Description/Functions |
| --- | --- |
| style.css | Cascading Style Sheet (CSS) Definitions.<br>Contains all the CSS definitions used throughout the JView ™ subsystem. This file ensures that the "look and feel" of all UI elements are consistent. |

Business Classes

For each vertical application, the business classes represent the business objects used within that vertical application. One file is defined per business object. These definitions relate directly to the business object definitions (classes) that are implemented on the server (as defined in the application repository or data model).

Views/Forms

With each interaction from the server, the JView™ subsystem will display either a "view" or a "form" in the data area portion of the overall JView™ subsystem UI framework. A view is used to display a collection or list of multiple business items (usually in a summary format). A form is used to display a single business item (usually in a detail format). For example, a "view" could be used to display a list of "orders"; a "form" would be used to display the details for a specific order from that list.

For each vertical application, one or more views and forms are defined. The entire collection of views and forms for any given application represents the complete set of UI interactions for that application. A complex application system typically consists of hundreds of views and forms.

Core Display Components

These files are used to define abstract display classes from which other application specific display components can be subclassed. In doing so, all the application components inherit their common capabilities from the core display classes. This allows the JView™ subsystem to maintain UI consistency within a given application. The following table describes the files included in this category.

| File | Description/Functions |
| --- | --- |
| jvd_Table_000.js | Table Component<br>Contains the JVDTable abstract class definition. This class is subclassed by other application specific display components to define an application specific table within a view or a form. |
| jvd_Pane_000.js | Pane Component<br>Contains the JVDPane abstract class definition. This class is subclassed by other application specific display components to define an application specific pane within a form. |
| jvd_GroupBox_000.js | GroupBox Component<br>Contains the JVDGroupBox abstract class definition. This class is subclassed by other application specific display components to define an application specific group box within a form. |
| jv_jvField_000.js | JView ™ Field Component.<br>Contains the JVField class definition. This class is used to display a single business data element within a form. |
| jv_jvComplexField_000.js | JView ™ Complex Field Component<br>Contains the JVComplexField class definition. This class is used to display a complex arrangement of multiple business data elements within a form. |
| jvd_Domain_000.js | Domain Selection Component.<br>Contains the JVDomainComponent class definition. This class is used when displaying multiple values from a domain to the user on a form. |
| jv_jvquery_000.js | JVQuery Component<br>Contains the JVQUERY abstract class definition. This class is subclassed by the query components (described later). |

Display Components

For each vertical application, one or more display components are defined that contain the application specific data elements that are to be displayed to the user on a view or a form. In order to maintain a high degree of UI consistency within the overall application, each display component is subclassed from one of the core display components.

Query Components

A "View" is typically defined to display a list of homogeneous items in a summary format (e.g., a table). In many cases, the items in the list all share one or more common characteristics—for example, a list of orders awaiting shipment, a list of customers that are "active", and a list of open accounts, etc. In many cases, users will want to filter the list from a larger list to a smaller list.

For each vertical application, one or more query components are defined that allow the user to filter the items that are displayed in a given view. As such, for each view that is defined, one or more query components will be defined. The query component is used to limit the filter/query operations that can be performed against a specific view.

Domain Components

When entering data for a specific business data element, it is often required that the value being entered belong to a predefined list of values (i.e., exist within a domain).

For example, a domain for "gender" could contain the values "M" and "F". For each vertical application, one or more domain components can be defined. Each component defines the list of values that make up that specific application domain. Once defined, the JView™ subsystem can then use these lists to facilitate data entry (by display lists of values that can be selected from) and for validation.

Images

The files in this category represent any generic graphics files that are used throughout the JView™ subsystem and not specific to any given vertical application or client.

Logos

The files in this category represent any application or customer specific graphics files that are used within a given vertical application.

JView™ Subsystem Classes

The classes that make up the JView™ subsystem can be divided into the following categories—Core, STM, Base, and Display.

Core Classes

The Core classes represent those classes that perform generic functions and services used by the entire JView™ subsystem. The following table describes the classes included in this category.

| Class | Description/Functions |
|---|---|
| JVMgr | JView ™ Manager<br>Main class, anchor point, used to control main flow within the JView ™ subsystem for each interaction.<br>Control point for all requests submitted to the server. |
| JVTraceMgr | Trace Manager.<br>Controls and manages the internal trace table used for debugging. |
| JVLoadMgr | Loaded File Manager.<br>Controls and manages the JavaScript "include" files that are to be dynamically loaded after each interaction with the server.<br>Ensures that the same JavaScript file is not being loaded multiple times. |
| JVDomainMgr | Domain Manager<br>Controls and manages any static and dynamic application domains that are being used for the current interaction. |

STM Classes

The STM classes are used to represent the major components of the STM received from the server. The following table describes the classes included in this category.

| Class | Description/Functions |
|---|---|
| STM | STM Message - Overall<br>This class is a container class that references all the other objects that make up the overall STM. |
| STMHdr | STM Header<br>Contains the STM Header attributes (described later). |
| STMNB | STM NavBar<br>Contains the STM NavBar data structures (described later). |
| STMMsg | STM Application Messages<br>Contains the any application message data structures from the server (described later). |
| STMFnList | STM Function List<br>Contains the list of valid application functions that can be performed by this user for this interaction (described later). This is an array of STMFunction objects. |
| STMFunction | STM Function<br>Contains the attributes for an application function contained within the STMFnList. |

Base Classes

The Base classes represent the abstract class hierarchy that is used to represent the data and structure of the business information received from the server in the STM. The following table describes the classes included in this category.

| Class | Description/Functions |
|---|---|
| JVBase | Base Object Class<br>This abstract class contains the attributes that are common to all other JView ™ base objects. All other JView ™ Base classes are subclassed from this class. |
| JVList | List Class<br>This abstract class is used to represent an array of other base objects (i.e., either an array of JVBObjects or JVGAttr objects). |
| JVBObject | Business Object Class<br>This abstract class is used to represent a single instance of a business object. All business class files are subclassed from this class. |
| JVBoolean | Boolean Attribute Class<br>This class is used to represent a single Boolean data element (attribute) within a business object (JVBObject). |
| JVString | String Attribute Class<br>This class is used to represent a single string/character data element (attribute) within a business object (JVBObject). |
| JVDateTime | DateTime Attribute Class<br>This class is used to represent a single date time data element (attribute) within a business object (JVBObject). |
| JVInteger | Integer Attribute Class<br>This class is used to represent a single integer numeric data element (attribute) within a business object (JVBObject). |
| JVFloat | Float Attribute Class<br>This class is used to represent a single floating point numeric data element (attribute) within a business object (JVBObject). |
| JVMemo | Memo Attribute Class<br>This class is used to represent a single memo data element (attribute) within a business object (JVBObject). A memo data element is like a string data element, but the memo data element allows for special characters. |
| JVGAttr | Generic Attribute Class<br>This class is used to represent a generic data element (attribute) within a business object (JVBObject). In this case, the interpretation of the data contained within this attribute is dependent on the containing component class. |

Display Classes

The Display classes represent the abstract class hierarchy that is used by the display components to define and control the UI. The following table describes the classes included in this category.

| Class | Description/Functions |
|---|---|
| JVDisplay | Display Object Class<br>This abstract class contains the attributes that are common to all other JView ™ display objects. All other JView ™ Display classes are subclassed from this class. |
| JView ™ | JView ™ Class<br>This class is used to represent the current view or form object for the current interaction. It serves as the anchor point for the display object component hierarchy. |
| JVQuery | Query Component Class<br>This class is used to represent the current query component (if defined) for the current interaction. The application specific query component definition will create an instance of this class to contain the specific data elements and values used to control querying/filtering operations. |

| Class | Description/Functions |
|---|---|
| JVDTable | Table Component Class<br>This abstract class is used to define a table component within the UI. It provides generic services common to all tables. Any application specific table components will be subclassed from this class. |
| JVDPane | Pane Component Class<br>This abstract class is used to define a pane component within the UI. It provides generic services common to all panes. Any application specific pane components will be subclassed from this class. |
| JVDGroupBox | GroupBox Component Class<br>This abstract class is used to define a groupbox component within the UI. It provides generic services common to all groupboxes. Any application specific groupbox components will be subclassed from this class. |
| JVDDomainComponent | Domain Component Class<br>This class is used to represent an application domain (if defined) for the current interaction. For each interaction, multiple domain definitions can be used and in this case, one instance of this class will be created for each domain. The application specific domain component definition will create an instance of this class to contain the specific data elements and values used to control domain search, retrieval, and validation operations. |
| JVField | Field Component Class<br>This class is used to define a field component within the UI. It provides generic services common to all fields. |
| JVComplexField | Complex Field Component Class<br>This class is used to define a complex field component within the UI. It provides generic services common to all complex fields. |

STM Format and Structure

The "Siteras Transaction Message" (STM) is a hierarchical structure of key value pairs that are specifically designed to hold business data, in raw format, being transmitted between a server and a browser. It is similar in structure, capability, and purpose to other data encoding mechanisms (e.g., XML, PList, etc.). This format allows the JView™ subsystem to achieve high performance and broad browser compatibility. The STM contains the following logical subsets of data—Header, Nav Bar, Business Objects, Function List, Messages, and Domains.

Header

This section contains data elements that are used to maintain the state of the JView™ subsystem environment and coordinate the execution of a transaction between the server and the JView™ subsystem executing in the browser.

Nav Bar

This section contains the data structures that are used by the JView™ subsystem to construct the NavBar within the UI. The NavBar provides the user with a hierarchical menuing system for accessing the functions within the application system.

Business Objects

This section contains the business objects (business data) related to the application function being executed. Within the STM, these business objects exist in their primitive object format. Using these business objects, the JView™ subsystem provides a user friendly presentation (i.e., generates the HTML displayed in the browser) based on the definition of the application specific view or form (JView™ subsystem object) contained in each interaction.

Function List

This section contains an array of the application functions that the user is allowed to perform. This list allows the system to enforce a first layer of security.

Messages

This section contains an array of any application messages that were generated as a result of executing the last application function. These messages may be informational, warnings, or errors.

Domains

This section contains an array of dynamic domain definitions that have been sent from the server (where the content of the values within the domain are dynamically determined by application conditions with each function). Static domain definitions, where the values within the domain do not change, are provided via Domain Components (i.e., JavaScript files). However, these static domain definitions are not transmitted within the STM.

STM HTML Message Format

Upon receiving the HTTP response from the server, the browser will perform its normal functions related to processing an HTML message. When initially received by the browser, the STM is encoded within a standard HTML stream. A sample message is contained in Diagram 1. The following table summarizes the major parts of this message (the line number references relate to the sample message in Diagram 1).

| Line(s) | Description |
|---|---|
| 1-4 | Standard HTML tags. These tags declare the stream as an HTML stream. The overall HTML stream is declared in lines 1-219. The HTML HEAD portion (containing the STM) is declared in lines 3-207. The HTML BODY portion is declared in lines 209-218. |
| 5 | Cascading Style Sheet inclusion. |
| 6 | Include the main JView ™ JavaScript file. This statement causes the entire JView ™ Core to be loaded. |
| 7 | Include JView ™ view or form definition. This statement provides the definition for the application specific form or view that will be displayed within the JView ™ UI framework. This statement will also cause all the related application class definitions to be loaded. |
| 8 | If a "view" is being displayed, this line provides the definition for the application specific query component to be used with the view. |
| 10-206 | STM<br>The full STM encapsulated in JavaScript functions. |
| 13-48 | Header<br>The Header portion of the STM. |
| 50-59 | NavBar<br>The NavBar portion of the STM. In this example, the Nav Bar contains 6 distinct navigation items on lines 52, 53, 54, 55, 56, and 57. |
| 61-143 | Business Objects<br>The Business Object portion of the STM. In this example, there are two instances of business objects contained in this section. Both business objects are SAFolder_Subro objects. The first instance is defined by lines 62-101, the second instance is defined by lines 102-142. |

| Line(s) | Description |
|---|---|
| 145-162 | Function List<br>The Function List portion of the STM. In this example, the function list contains two distinct Function entries on lines 147-153 and 154-160. |
| 164-169 | Messages<br>The Message portion of the STM. In this example, two distinct application messages are defined on lines 166 and 167. |
| 171-200 | Domains<br>The Domains portion of the STM. In this example, a single application domain named "RespondingCompanies" is defined containing 4 domain items. |
| 209-218 | HTML BODY<br>These lines represent the HTML BODY declaration. In most standard HTML streams, this section will contain a large number of definitions that define the UI formatting to be performed by the browser. With the JView ™ subsystem this section is virtually empty. On line 209, the "ONLOAD=" parameter causes the browser to invoke the JView ™ Manager to complete the JView ™ initialization and generate the HTML to be displayed in the browser for this interaction. |

JavaScript STM Functions

Within the HTML stream described above, JavaScript functions are used to encapsulate the business data. Using these functions, any business data structure, simple or complex, can be defined. For the STM portion of the message, the following JavaScript functions are used:

| Single Objects |
|---|
| NS(<classId>,<objectId>,<instanceName>)<br>NE( ) |

These functions are used to define a single object node. The NS( ) function is used to start the declaration of the object and the NE( ) function is used to end the declaration. A single object node can contain other single objects, array nodes, or attribute nodes. When defining the object node, the <class> specifies the type of object to be instantiated, the <objectId> is its unique object identifier, and the <instanceName> is the name by which the parent object (if any) refers to this object.

| Object Arrays |
|---|
| RS(<instanceName>)<br>RE( ) |

These functions are used to define an array node. Essentially, this type of node is used to define a collection of objects of the same type/class. The RS( ) function is used to start the declaration of the array and the RE( ) function is used to end the declaration. An array node can contain any number of single object (NS) or generic attribute (GA) nodes. When defining the array node, the <instanceName> is the name by which the parent object (if any) refers to this array.

| Attributes |
|---|
| AB(<attributeId>, <value>)<br>AD(<attributeId>, <value>)<br>AF(<attributeId>, <value>)<br>AI(<attributeId>, <value>)<br>AM(<attributeId>, <value>)<br>AS(<attributeId>, <value>) |

These functions are used to define a single attribute node (data element) within an object (NS). The different function names related to the primitive type of the data represented by the attribute—Boolean (AB), DateTime (AD), Numeric-Floating Point (AF), Numeric-Integer (AI), Memo (AM), and String (AS). When defining an attribute node, the <attributeId> is the name by which the parent object refers to this attributed, and the <value> is the data value of the attribute.

| Generic Attributes |
|---|
| GA(<attributeType>, <value1>, <value2>, ..., <valuen>) |

These functions are used to define a single generic attribute node (complex data element) within an array (RS). This attribute can only be used within an array node. It is a special type of complex attribute and the interpretation of the attribute type and values is left to the parent object.

Full Mode vs. Raw Mode Format

In the message example above, the "full mode" format is used. In this format, the classIds and attributeIds are expressed as full character strings. A "raw mode" format is also used that further reduces the overall message size by replacing the character string representations of the classIds and attributeIds with numeric codes. Additionally, raw mode can use either the JavaScript function method of data encapsulation or the JavaScript array syntax. The JavaScript array method is preferred for production as this eliminates any overhead associated with the execution of the data encapsulation functions themselves. Using this method, all data encoding rules conform to those defined by JavaScript syntax.

The following summarizes various STM formats:

STM Full Mode

```
NS("STMHdr",null,"oHdr");
    AB("readOnly",0);
    AD("dateCreated","20000531105702");
    AF("amtTotal",17.43);
    AI("count",4);
    AM("comments","This is line 1\nThis is line2\n");
    AS("companyName","Insurance Property & Casualty");
NE( );
```

STM Raw Mode (Using JavaScript Function Encapsulation)

```
NS(1,null,1);
    AB(1,0);
    AD(3,"20000531105702");
    AF(4,17.43);
    AI(8,4);
    AM(2,"This is line 1\nThis is line2\n");
    AS(7,"Insurance Property & Casualty");
NE( );
```

STM Raw Mode (Using JavaScript Array Encapsulation)

```
STMHdr =
    [[1,null,1],
        [1,1,0],
        [2,3,"20000531105702"],
        [3,4,17.43],
        [4,8,4],
        [5,2,"This is line 1\nThis is line2\n");],
        [6,7, "Insurance Property & Casualty");]
    ];
```

STM Object Format

Figure 21:
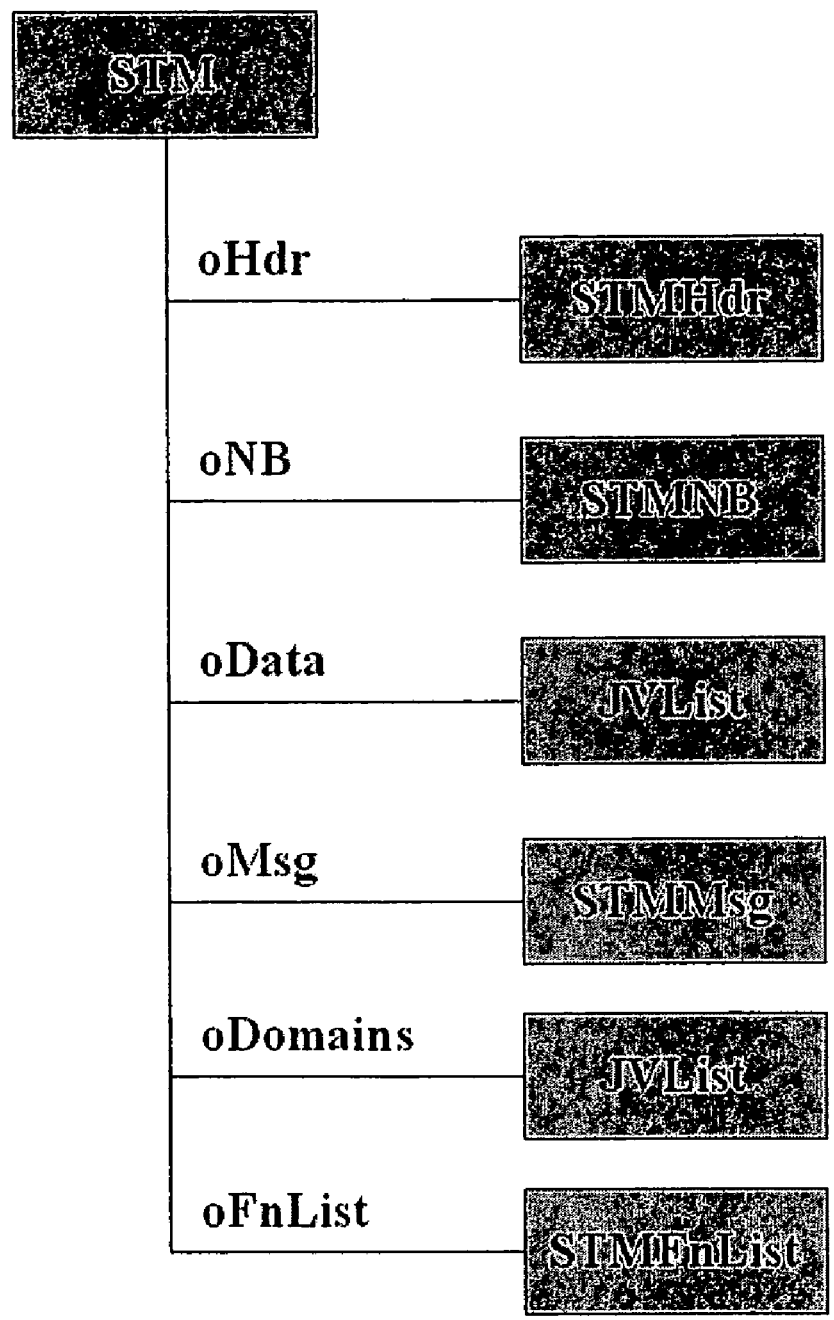
FIG. 21 is a diagram showing STM object hierarchy in the JView™ subsystem.

The processing of the STM message results in the creation of the STM object within the browser environment. The structure of this object is depicted in FIG. 21.

JView™ Subsystem Object Hierarchies

During the initialization of the JView™ subsystem environment, two main object hierarchies are constructed—the Base Object Hierarchy and the Display Object Hierarchy.

Base Object Component Hierarchy

The base object hierarchy consists of the base objects (derived from JVBase) that were created as a result of processing the STM (as depicted within Diagram 1). This hierarchy is anchored within a global variable "goSTM" that can be accessed at any time by any part of the system. All business objects related to the application function are contained in the subtree goSTM.oData. This subtree is an array (RS) that can contain 0-n business object subtrees. For a View, it will contain 0-n business object subtrees. For a form, it will only contain a single business object subtree.

Display Object Component Hierarchy

The display object hierarchy consists of display objects (derived from JVDisplay) that were created as a result of processing the JView™ Subsystem View/Form component associated with this interaction (as defined in line 7 of the sample message in Diagram 1). This hierarchy is anchored within an instance variable of the JView™ Subsystem Manager "oJView" (the JView™ Subsystem Manager Object instance is in turn anchored with a global variable "goJM"). The display objects are used to hold instance and state data related to the UI and to some extent mirror the DOM objects that are created from the generated HTML. This hierarchy is necessary because certain local operations (e.g., resorting a table) are used to completely refresh portions of the DOM—in this case, the display object contains the data needed to regenerate the DOM objects.

JView™ Subsystem Processing The three distinct phases to the JView™ subsystem operation are described in detail in the following sections.

Initialization
Interaction
Request Submission

JView™ Subsystem Initialization

With each HTTP response received from the server, the JView™ subsystem environment within the browser is completely rebuilt. Because of this, the system was designed modularly in order to minimize any delays associated with this initialization. Some browser platforms allow for data to persist across interactions (e.g., cookies, IE behaviors, etc.)—other than the normal browser caching mechanisms (i.e., used for HTML pages, graphics, CSS, and Javascript files), the JView™ subsystem does not rely on any browser specific mechanisms for caching data across server interactions.

Browser Initialization

Upon receipt of a new HTTP response from the server, the browser will perform any internal initialization and process the newly received HTML stream.

Core Loading and Initialization

After the browser has loaded the CSS file, the JVMain JavaScript file will be loaded and processed by the browser as follows. A series of global constants (needed for initialization) are processed first. The class definition for the Trace Manager is processed. The Trace Manager is instantiated and initializes itself. The early creation and initialization of the Trace Manager allows all other parts of the JView™ subsystem to record trace entries for debugging purposes. The Trace Manager is anchored in the global variable goJVTraceMgr so that it can be accessed by any part of the system. The class definition for the Load Manager is processed. The Load Manager is instantiated and initializes itself. The Load Manager is used to keep track of all JavaScript files (e.g., views/forms, components, classes, etc.) that have been loaded. The Load Manager is anchored in the global variable goJVLoadMgr so that it can be accessed by any part of the system.

A series of JV_Include functions are processed to load the other JavaScript files that make up the JView Core (refer to JView™ "Include" Capability for more detail). As a result the following core files will be loaded in sequence when the browser completes the processing for JVMain—JView™ Manager Class (jv_jvmgr_000.js), JView™ Base Classes (jv_jvbase_000.js), JView™ Display Classes (jv_jvdisp_000.js), JView™ View/Form Class (jv_JView_000.js), STM Classes (jv_stm_000.js), Domain Manager Class (jv_dommgr_000.js), and Global Constants (jv_global_000.js). As each file is loaded, it is recorded in the Load Manager.

A series of global function definitions will then be processed. These functions provide general services that can be used by any part of the JView™ subsystem. After the processing for JVMain is complete, the browser will load and process each of the core files included above.

JView™ Subsystem Manager Creation

During the processing of the Global file (jv_globals_000.js), the JView™ Subsystem Manager is instantiated. This object is anchored in the global variable goJM so that it can be access by any part of the system. The initialization of this object is deferred until later (see "JView™ Subsystem Manager Initialization" below).

View/Form and Application Class Loading

Once the loading of the JView™ Subsystem Core files is complete, the browser will continue processing the statements in the HTML stream from the current HTTP response. The next statement in this stream will be a <SCRIPT> tag that references the JavaScript file for the application specific View or Form. This statement causes the browser to load and process this file as follows. Additional method and attribute definitions for the JVIEW class (specific to this form) are processed. These definitions give the JVIEW class its application specific behavior for the current interaction.

A series of JV_Include functions are processed to load the other JavaScript files that are used by this form/view. There are two main groups of files that are included—Display Components and Business Classes. A JView™ subsystem form or view is built by assembling one or more display components (described below in "JView™ Subsystem UI Architecture"). The Display Component "includes" result in the loading of all display component definitions that are needed for this view/form. Within the Business Object portion of the STM, each business object requires that its application class definition exist within the JavaScript environment within the browser.

The Business Class "includes" result in the loading of all business class definitions that are needed by the current STM.

After the processing for the application specific view/form is complete, the browser will load and process each of the display component and business class files included above.

Query Component Loading

Once the loading of the application view/form, display component, and business class files is complete, the browser will continue processing the statements in the HTML stream from the current HTTP response. If a view is being processed for this interaction, the next statement in this stream will be a <SCRIPT> tag that references the JavaScript file for the application specific query component. This statement causes the browser to load and process this file.

STM Processing—Base Object Hierarchy Creation and Initialization

After all the JView™ subsystem core and application specific files have been loaded, the browser will continue processing the statements in the HTML stream from the current HTTP response. The next statements in the stream are in-line JavaScript statements that represent the STM. The browser will process these statements as follows. The browser will execute each JavaScript STM function in the order it occurs within the HTML stream (e.g., NS( ), RS( ), etc).

As each function is processed, a new node (object) in the JView™ Subsystem Base Object hierarchy will be created. For NS( ) functions, an application specific object will be created (based on the classId specified in the NS( ) function). For all other STM functions the type of object created depends on the specific STM function as follows:

RS( )—JVList
AB( )—JVBoolean
AD( )—JVDateTime
AF( )—JVFloat
AI( )—JVInteger
AM( )—JVMemo
AS( )—JVString
GA( )—JVGAttr As each node is created, JVBase initialization will be executed. This initialization sets JVBase attributes used to represent the linkage of this node within the Base Object hierarchy (i.e., parent, child, sibling, etc.). Based on the sequence of the statements in the STM, the Base Object hierarchy is created from top to bottom and left to right. As each application specific subtree is created, any application specific initialization will be executed. This initialization, if any, exists within each application business class as an Init( ) method. The application specific initialization performs any application specific data manipulations that are needed by the current interaction. After all STM JavaScript functions have been executed, the JView™ Subsystem Base Object Hierarchy is created. This object hierarchy contains all the business data, as business objects, sent from the server in response to the previous request.

JView™ Subsystem Manager Initialization

After the STM functions have been processed, the Init( ) method of the JView™ Subsystem Manager (JVMgr) will be executed. This method is triggered by the "ONLOAD=" parameter of the <BODY> tag in the current HTML stream. The following summarizes the processing performed in this method.

Initialize the Domain Manager. This initialization results in the processing and setup of any domains that were contain in the STM (in the Domains section).

Create an instance of a JVIEW object. Up to this point, only various JVIEW class definitions have been processed (both generic and application specific). At this point, the actual JVIEW object (view or form) is created. This object anchors the display hierarchy that controls the UI associated with the current interaction.

At this point, the display object hierarchy will be created and initialized. This complex process is described next. At the completion of this process, control will be returned to the JView™ Subsystem Manager and its initialization will be completed.

Display Object Hierarchy Creation and Initialization

This process results in the creation of the display objects used to generate and control the UI for the current interaction. It is trigged by invoking the Init( ) method of the JVIEW object. Within this method, the following processing is performed (for brevity, any references to "view" below imply a view or a form).

Any application specific view initialization is performed by invoking the InitView( ) method for the JVIEW object. This method allows the view to perform any application specific processing prior to generating and displaying the HTML. Such initialization includes initializing the component variables that contain references to any display components created later, initializing other variables based on data conditions within the base hierarchy, sorting business data within the base hierarchy, etc.

Once the view is initialized, the display components are created and the HTML is generated in a single process. This process is triggered by invoking the CreateHTML( ) method of the JVIEW object. Prior to invoking this method, an array is created and passed to this method as a parameter (i.e., the HTML array). This array is used to contain all the HTML statements that are generated by all display methods and components invoked during the processing of the Create-HTML method. This method will perform the following: invoke the CreateHeader( ) method to generate the HTML for the Header portion of the UI; invoke the CreateInfoBar( ) method to generate the HTML for the Info Bar portion of the UI; invoke the CreateNavBar( ) method to generate the HTML for the NavBar portion of the UI; if any application messages exist, invoke the CreateMsgArea( ) method to generate the Message Area portion of the UI; for a form, invoke the CreateActionBar( ) method to generate the HTML for the Workflow Bar portion of the UI; and invoke the Create-DataArea( ) method to create/initialize any display components and generate the HTML for the Data Area portion of the UI (the portion that contains application specific information). This method is defined in the application specific JView™ subsystem file for the current interaction. It will either 1) generate HTML directly, 2) create any child display components that make up the UI for this view, or 3) use a combination of both techniques.

For each display component created, the following processing will occur. The display object for this component will be instantiated and linked into the display hierarchy. Any initialization of the component will occur within the constructor of the class for this display object. The CreatePre-HTML( ) method will be invoked for the newly created display object. This method provides for container-oriented HTML generation by any of the super classes for this object. The CreateHTML( ) method will be invoked for the newly created display object. Similar to the above, this method will result in the generation of any application specific HTML for this component. To do so, it will either 1) generate HTML directly, 2) create any child display components that make up the UI for this view, or 3) use a combination of both techniques. This process allows for orderly nesting and creation of display components anchored off of the initial JVIEW object. This process supports the construction of a simple or complex UI. The CreatePostHTML method will be invoked for the newly created display object. This method provides for container-oriented HTML generation by any of the super classes for this object.

After the CreateDataArea( ) method completes, some final special HTML tags are generated. An HTML FORM is created—JVFORM_STM. For JView™ subsystem forms that support the uploading of files from the local environment, a standard browser file widget (STMFILE) is created within this HTML FORM (<INPUT TYPE="file" . . . >). Finally, a special hidden field (STMDATA) is also defined within this HTML FORM (<INPUT TYPE="hidden" . . . >)—this field is used to contain the outbound STM stream for any subsequent request to the server.

Upon completion of the main CreateHTML( ) method for the JVIEW object, the HTML stream will be prepared and the DOM object within the browser for the BODY portion of the current Document will be updated with the new HTML (this process is described further in "HTML Generation" below). At this point, the UI "focus" will be set (based on the definition within the JView™ subsystem of the first field that is to receive the input focus), and control will be returned back to the JView™ Subsystem Manager.

JView™ Subsystem Manager Initialization (Continued)

After the UI has been created, the JView™ Subsystem Manager will complete its initialization by performing its response time calculations. At this point, control will be returned to the browser and UI control is returned to the user.

JView™ Subsystem Interaction

Once control has been returned to the user, the JView™ subsystem environment allows the user to operate locally (without interaction from the server). To do so, the JView™ subsystem relies on the Dynamic HTML mechanism within the browser to perform interaction related services. These services include the following:

Dynamic Sorting
Data Formatting and Display
Expanding/Collapsing Portions of the UI (e.g., Panes).
Print Formatting and Preview
Hierarchical Menuing
Syntactical Editing and Validation
Complex Application Validation
Application Calculations The HTML that was initially generated contains the definitions that allow for the triggering of specific methods within the JView™ subsystem display objects in response to any Dynamic HTML events generated by the browser in response to various user interactions.

One key aspect of this local interaction relates to data entry. For any data entered by the user, the JView™ subsystem environment will perform syntactical validation (e.g., ensure valid numbers, dates, etc.) and invoke any application specific validation defined within the business classes. Once these validations have been performed successfully, the specific base object affected by this data (within the base object hierarchy) will be modified with the new data. As such, as the user interacts with the UI, the base object hierarchy is dynamically updated to reflect the current state of the data. The importance of this will be clear later when describing request submission to the server.

For more information on these services, refer to the "JView™ Subsystem Services".

JView™ Subsystem Request Submission

The user will continue to operate locally within the browser environment until they select a UI element that triggers a new request to the server. Within the JView™ subsystem environment, all such requests are processed and generated from a central point within the JView™ subsystem environment—namely the JView™ Subsystem Manager. The following summarizes the request submission process.

For any UI elements that will trigger a request to the server, the generate HTML will ensure that the element results in a call to the InvokeFunction( ) method within the JView™ Subsystem Manager (JVMgr).

The InvokeFunction( ) method will perform parameter validation and then invoke the JVMgr.SubmitHostRequest( ) method.

The SubmitHostRequest( ) method will perform the following: save the current NavBar state (i.e., which menu levels are open/closed) within an instance variable in the STM Header; update other STM Header variables with data values specific to the new request (e.g., functionName, chainType, objectId, transactionParms, OLS command, qualifier, and other JView™ subsystem environment context variables); and construct the outgoing STM stream for the request by traversing the base object hierarchy for the Header and Business Object subtrees and creating a single text stream (whose format is identical to the inbound STM format depicted in Diagram 1).

In fact, the specific format used depends on the server and can be any serial syntax that can represent hierarchical structure of key:value pairs (e.g., STM, XML, PList, etc.). The resulting stream is then stored in the special form variable (STMDATA), that was created when the HTML was initially generated (refer to 2 g in the "Display Object Hierarchy Creation and Initialization" section above).

Based on the type of request (non-editing or editing), the request is submitted to the host in one of two ways. For non-editing requests (i.e., requests that do not result in data modification on the server), the HTML FORM JVFORM_STM is "submitted" with METHOD=GET. For editing requests (i.e., requests that result in data modification on the server), the HTML FORM JVFORM_STM is "submitted" with METHOD=POST.

After submitting the request to the server, control is returned to the browser to await the response to the newly issued request.

JView™ Subsystem Services

Within the overall JView™ subsystem processing described above, specific services are performed. This section details the operation of these specific services.

JView™ Subsystem "Include" Capability

The JView™ subsystem "include" capability was intended to insulate the server from the specific manner in which the JView™ Subsystem Core was modularized. This allows the server to merely specify a single JView™ subsystem file (i.e., jv_main_000.js) in its HTTP response stream. Within that file, other files are subsequently "included" so as to complete the loading of the JView™ Subsystem Core. This approach allows the JView™ Subsystem Core to be divided in any manner or extended without requiring any change on the server.

The standard browser environment does not provide for a generic mechanism to "include" JavaScript files. As such, the following process is used.

Within the <HEAD> section of the HTML stream for a given HTTP response stream, a reference to an initial main JavaScript file using an HTML <SCRIPT SRC= . . . > tag is defined. The browser will load the JavaScript file referenced by this tag from its local cache, or from the server. Once loaded, the browser will start processing the statements defined in this file. These statements can either be JavaScript definitions or executable statements.

To "include" another JavaScript file, a series of executable JavaScript statements are contained within the main JavaScript file that perform the following: construct a string variable that contains a new HTML <SCRIPT> tag for the JavaScript file to be included; and perform a document.write function specifying this new string variable. This function will result in the new HTML statement being written to the current HTML stream being processed (ahead of any HTML statements that are being sent from the server).

Once the browser completes the processing of the main JavaScript file, it will then process any newly inserted HTML statements that were dynamically created by executing the JavaScript code in the main file—thereby resulting in the loading of the additional JavaScript files.

Essentially, the processing is the same as if the server had included the additional JavaScript files in its original HTML stream Trace Management Within the JView™ subsystem environment, the Trace Manager maintains trace information that is useful for debugging purposes. The following process is used to manage trace information. Upon initialization, the Trace Manager will allocate an array (with a fixed number of entries) for trace data. The Trace Manager is anchored in a global variable goJVTraceMgr. Whenever the Trace Manager method AddTraceEntry( ) is called, the Trace Manager will add the new trace entry to its internal trace table. When the trace table becomes full, the trace manager will wrap around to the start and replace the oldest trace entry with the newest trace entry. Other Trace Manager methods are available for displaying the trace table.

JView™ Subsystem Initialization Optimization

Due to the fact that the JView™ subsystem environment must be completely reconstructed by the browser, it is essential to keep the processing overhead related to initialization to a minimum.

One mechanism used to reduce initialization time was to modularize the JView™ subsystem into a number of distinct files. This approach had a number of distinct advantages. Relative to the combined file sizes of the entire application system, the JView™ Subsystem Core files represent a small subset (15% or less). Once a JView™ subsystem file is downloaded from the server, it will be placed in the browsers local cache—unless that file changes, any subsequent references to it will be satisfied from the browsers local cache (rather than retrieving it from the server). The overall modularization of the system minimizes the number of files that are needed for each application interaction. Even though the overall application system may comprise thousands of views, forms, reports, and related components, a user will only need to download those files that are needed for the current interaction. As such, the JView™ subsystem avoids long "initialization" delays associated with the loading of a monolithic system (e.g., Java application, Java applets, etc.). Because of the extensive modularization, if a JView™ subsystem file does change, only the new JView™ subsystem file needs to be downloaded, not the entire system.

State and Context Management

Upon each interaction with the server, the JView™ subsystem environment running within the browser is completely refreshed (reinitialized). Since the system does not rely on, or use, any browser provided persistence mechanisms for recording state (e.g., cookies, IE behaviors, etc.), the Header section of the STM is used to store any context information from the JView subsystem environment. When a new request is submitted to the server, the JView™ subsystem environment will store information related to its current "context" within the STM header. This information will be passed to the server. In response to the request, the server will return this context information, unaltered, back to the JView™ subsystem environment within the same STM header variable. The JView™ subsystem environment will then use this context information to re-establish the context it had when it submitted the original request.

Function Security

In order to eliminate the proliferation of user specific forms, views, and reports (views), the JView™ subsystem allows these views to be created in a way that is not user specific. However, because these views can be used by multiple users, they often need to contain embedded links to other application functions. In this case, not all users will be authorized to perform all functions.

The function security architecture within the JView™ subsystem provides a mechanism to ensure that a given user can only access the functions for which they are authorized. The following summarizes the operation of this mechanism. The FunctionList portion of the STM defines a complete set of functions for which the current operator is authorized. During the creation and initialization of a JView™ subsystem form/view, any embedded links to application functions on the server are all defined using the JVIEW.CreateEmbeddedLink( ) method. As the form is being created this method will be invoked for each link defined on the form/view. Using the FunctionList, the CreateEmbeddedLink( ) method will validate that the current user is authorized to access the application function associated with this link. If not, the link will be disabled or hidden (based on the parameters passed to this method).

JView™ Subsystem UI Architecture

The JView Subsystem UI architecture is based on a component model. These components are organized around the JView™ Subsystem UI framework. The JView™ subsystem framework provides a consistent application workspace for the user. Since all the parts of the framework are themselves components, this framework can be easily modified and extended to be compatible with a large number of application systems. The JView™ subsystem framework consists of the following major components.

Header Area—general area for providing "branding" information for the company using the system and the vendor.

Info Bar—general information area displaying information about the current task and user.

Nav Bar—this area provides access to the specific functions within the application in the form of a hierarchical menuing system.

Message Area—an area for displaying application specific messages.

Workflow Bar—For forms, this area is used to display one or more action buttons that are used to perform common application functions that affect the workflow of the specific business document being displayed.

Command Area—For views and forms, this area is used to display one or more links that are used to perform secondary application functions related to the specific business document being displayed.

Data Area—For views, this area is used to display application specific information, usually in tabular form related to multiple business transactions or documents. For forms, this area is used to display application specific information related to a single business transaction or document.

Within the Data Area of a view or form, one or more additional display components can be defined (e.g., tables, panes, groupboxes, etc.).

Figure 23:
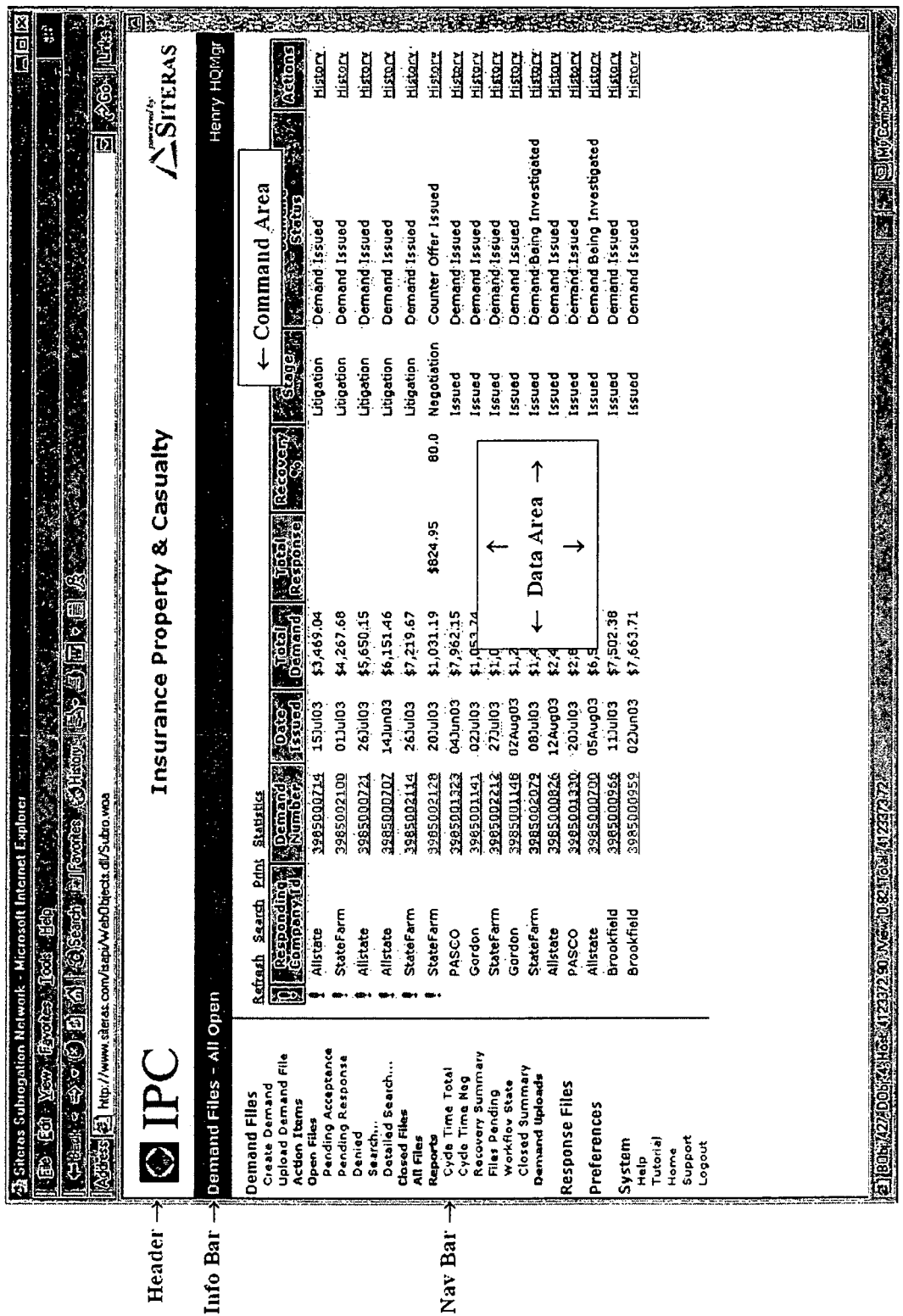
FIG. 23 shows an example of a JView "view"
Figure 24:
FIG. 24 shows an example of a JView "form"

FIG. 23 contains an example of a JView™ subsystem "view". FIG. 24 contains an example of a JView™ subsystem "form".

The component based nature of the JView™ Subsystem UI architecture allows a given application component to be defined once and then be reused across multiple views or forms.

HTML Generation

Due to the extensive amount of HTML generation performed within the JView™ subsystem environment, the performance of this aspect of the system has a major impact on the responsiveness of the system. When the JView™ subsystem was developed, the HTML generation techniques that were documented within the industry did not perform adequately enough for use in a production class system. For large HTML streams (150 KB or more), these techniques often took 30 seconds or more (on a Pentium III class processor). As such, the JView™ subsystem uses a special algorithm, disclosed herein, that has demonstrated the capability of generating a large HTML stream (150 KB) in less than 500 milliseconds on a Pentium III class processor.

Diagram 2 contains a code section that illustrates the HTML generation technique used within the JView™ subsystem. The following table summarizes this technique (the line number references relate to the code section in Diagram 2).

| Line(s) | Description |
| --- | --- |
| 1 | Declaration for a standard JavaScript array. Each element in this array will be used to hold an HTML code generation fragment. |
| 2 | Declaration for a standard JavaScript variable. This variable will later be used to hold the entire HTML stream that is being generated. |
| 4-7 | HTML code generation statements. Each HTML fragment being generated is assigned to a new element within the HTML array. |
| 9 | Using the standard JavaScript "join" method (for Array objects), the complete HTML stream is generated by concatenating all the individual array elements together in one atomic operation. |
| 10 | Once the full HTML stream is generated, the DOM within the browser is updated with a single atomic operation that completely replaces the HTML for the document BODY (using the outerHTML property). |

Sorting

Due to the high "data" bandwidth capability inherent in the JView™ subsystem architecture, a JView™ subsystem "view" is able to efficiently display a large number of result rows for any given business query—500 to 1000 (compared to the 20-25 displayed by most search engines). Once this result set is returned to the JView™ subsystem environment, users will typically want to resort the result rows based on various columns.

Within JavaScript, a primitive sort method is provided for Array objects. This sort method relies on the existence of a "compare" function that can compare any two elements within an array and pass a return code indicating whether one element was greater than, less than, or equal to the other element.

Within the Business Object portion of the base hierarchy, an Array is used to store the full set of Business Objects for the current interaction. However, since these objects are arbitrarily complex, it is not practical to statically code a "compare" function. Additionally, even though JavaScript provides an "eval( )" function that can be used within a generic compare function to evaluate arbitrary business objects, this function is performance intensive. As such, the use of this function for sorting large results sets was not practical.

To overcome this limitation and provide a robust sorting capability for both single and multicolumn sorting, the following technique is used within the JView™ subsystem: when a view is initialized, a compare function is dynamically code generated for each column within the view; for each compare function generated, the "eval( )" function is invoked once to essentially compile this function into internal JavaScript format; and when the view needs to be sorted, the system determines the column(s) being sorted and then passes the compiled compare function to the sort method for the array being sorted.

Using this technique, JView™ subsystem sort times are typically less than 1 second (on a Pentium III processor) for result sets containing as many as 1000 rows.

Application Validation and Processing

Due to the rich object oriented environment established within the JView™ subsystem environment, application validation and processing is simplified. Whenever a data element within the Base Object Hierarchy is modified, the "OnUpdate( )" method is invoked for each immediate parent object in the base hierarchy (all the way to the root object—the STM). This method allows each containing object to trigger validation or processing logic based on the specific portion of their tree that was updated.

During this process, any data modifications made to the base hierarchy are automatically displayed in the UI. This occurs because of the linkages that are established between the base and display hierarchies. Namely, when a base object is updated, the JView™ system maintains a linkage to any display objects that are dependent on this base object. From these display objects, the correct DOM object (within the browser environment) can be refreshed.

Response Time Measurement

The JView™ subsystem, running in the client browser, also measures and tracks response time. The following summarizes the mechanism used for response time measurement and tracking. Whenever a request is made, the JView™ subsystem records a local timestamp (TS1) within the client browser and passes this to the server (along with the request). After processing the request, the response from the server will contain the original timestamp (TS1). Additionally, the server will provide its own host response time (HostTime) that measures the duration from when the server received the request to when the server generated the response. Upon receiving the request, the JView™ subsystem records another local timestamp (TS2). This timestamp is taken very early in the JView™ subsystem initialization process so as to accurately record the closest time to the receipt of the response.

After taking timestamp TS2, the JView™ subsystem will proceed with its initialization. After the initialization is nearly complete (just before returning browser control to the user), a final timestamp will be take TS3 and response time statistics will be calculated as follows:

Total End User Response Time=TS3−TS1.
JView™ Overhead Time=TS3−TS2
Host Response Time=HostTime (provided by the server)
Network Time=(TS3−TS1)−HostTime These statistics are stored within the current JView™ subsystem environment (within the JView™ Subsystem Manager), and are transmitted back to the server with the next processing request. The server can then store this information within the application database. In this way, each new request to the server contains the response time statistics for the previous processing request.

This mechanism is unique in its ability to measure the actual response time experience by the end-user at their browser.

Performance Optimization

The wide array of local services available eliminate the need for the client to communicate with the server—thereby further reducing bandwidth, end-user response time, and server processing cycles.

By off-loading the above services to the client (especially the HTML generation), a substantial reduction in server processing cycles is achieved.

The JavaScript core application components used in the JView™ subsystem are extremely modular. This modularity helps to eliminate the response time delays upon initial interaction with the server that are associated with non-modular systems.

Multi-Channel Communication

Multiple browser windows are used when creating a separate communication channel with the server. This allows an end-user to issue multiple independent and parallel application processing requests with the server. The OLS maintains the state of each of these parallel communication channels so as to preserve the integrity of each request.

Within each communication channel, either structured (STM), unstructured (files), or both types of information can be communicated in either direction.

Maintaining Browser Compatibility

To maintain compatibility with the broadest set of browser-based clients, the lowest possible levels of JavaScript and HTML are used. Additionally, only the basic set of thin client services provided by the client browser is provided. The system does not use special plug-ins, Java applets, or ActiveX controls as the use of such services reduce the general applicability of the system to a wide range of environments.

Diagrams—JView

The following diagrams illustrate a number of features of the JView™ subsystem described above.

Diagram 1 shows a STM Sample Message (Full Mode) code.
Diagram 2 shows a JView™ Subsystem HTML Generation code.

Diagram 1—STM Sample Message (Full Mode)

```
1.      <!DOCTYPE HTML PUBLIC "-//W3C//DTD HTML 3.2//EN">
2.      <HTML>
3.      <HEAD>
4.      <META HTTP-EQUIV="expires" CONTENT="Wed, 02 Aug 2000 08:00:00 GMT">
5.      <LINK REL="stylesheet" TYPE="text/css" HREF="../jview/common/style.css">
6.      <SCRIPT LANGUAGE="JavaScript" SRC="../jview/common/jv_main_000.js"></SCRIPT>
7.      <SCRIPT LANGUAGE="JavaScript" SRC="../jview/jviews/jv_SubroFoldersD_Summary_Full_000.js"></SCRIPT>
8.      <SCRIPT LANGUAGE="JavaScript" SRC="../jview/queries/jvq_SubroFoldersD_Basic_000.js"></SCRIPT>
9.
10.     <SCRIPT language=JavaScript>
11.     <!- STM Start
12.     NS("STM");
13.     NS("STMHDR",null,"oHdr");
14.         AS("url","/Scripts/WebObjects.exe/subro");
15.         AS("wosid","HvAcD1oBZTEHxTNIito9F0");
16.         AS("coName","Insurance Property & Casualty");
17.         AS("coLogo","ipc.gif");
18.         AS("operatorID","Henry HQMgr");
19.         AS("OLSMode","Normal");
20.         AS("woContextID","4");
21.         AS("title","Demand Files - All Open");
22.         AS("functionName","SubroFoldersD_OpenAll");
23.         AS("intrinsicId","_ReadManyRaw");
24.         AS("object");
25.         AS("refObject");
26.         AS("insertionRef");
27.         AS("partyType","D");
28.         AS("qualifier");
29.         AS("sortParams","[[\"toAppData.toDemand.dateDemandReceived\",\"A\"]]");
30.         AS("queryParams");
31.         AS("chainedQualifier");
32.         AS("coID","IPC");
33.         AS("nbState","JVNB_3:1,JVNB_5:1,JVNB_0:1,JVNB_2:1");
34.         AS("jvContext","1061946572477");
35.         AS("responseStat","{JVSUBMIT:'null'}");
36.         AS("helpPath","../Help/_Common");
37.         AS("tutorialPath","../Tutorial/_Common");
38.         AS("OLSCmd");
39.         AS("chainType","Top");
40.         AS("stackId","2");
41.         AS("urlHome");
42.         AS("urlSupport");
43.         AI("woi",-1);
44.         AI("stackDepth",1);
45.         AB("displayCoName",1);
46.         AB("displayFirst",0);
47.         AB("displayTutorial",0);
48.     NE( );
49.
50.     NS("STMNB",null,"oNB");
51.         RS("oActions");
52.             GA("NBACTION","/001,Demand Files/006,Open Files/008,Pending Acceptance","SubroFoldersD_PendingAcceptanceAll");
53.             GA("NBACTION","/001,Demand Files/006,Open Files/010,Pending Response","SubroFoldersD_PendingResponse");
```

```
54.            GA("NBACTION","/001,Demand Files/006,Open Files/016,Search...","SubroFoldersD_OpenSearchBasic");
55.            GA("NBACTION","/50,System/10,Home",null);
56.            GA("NBACTION","/50,System/20,Support",null);
57.            GA("NBACTION","/50,System/30,Logout","Logout");
58.        RE( );
59.    NE( );
60.
61.    RS("oData");
62.        NS("SAFolder_Subro",1,null);
63.            AS("stage","Issued");
64.            NS("SAFolderData_Subro",2,"toAppData");
65.                NS("SAParty",3,"toPartyD");
66.                    AB("actionFlag",1);
67.                    AI("alertCount",3);
68.                NE( );
69.                NS("SAParty",3,"toPartyR");
70.                    NS("SACompany",4,"toCompany");
71.                        AS("companyName","Allstate Insurance Company" );
72.                        AS("companyId","Allstate" );
73.                    NE( );
74.                NE( );
75.                NS("SA_Demand",5,"toDemand");
76.                    AD("dateDemandIssued","20030507000000");
77.                    AF("pctRecovery");
78.                    NS("SA_DemandClaimDetail", 6, "toClaimDetailD" );
79.                        AS("claimNumber","34-000224");
80.                    NE( );
81.                    NS("SA_DemandClaimDetail", 7, "toClaimDetailR" );
82.                        AS("claimNumber","175-00224");
83.                    NE( );
84.                    NS("SA_DemandNeg", 8, "toCurrentNeg" );
85.                        NS("SA_DemandNegDetail", 9, "toCurrentProposalD" )
86.                            AF("amtPaymentTotal",2203.61);
87.                            AF("amtDemandTotal",2203.61);
88.                        NE( );
89.                        NS("SA_DemandNegDetail", 9, "toCurrentProposalR" )
90.                        NE( );
91.                    NE( );
92.                NE( );
93.                NS("SATask_Subro",6,"toTaskDemand");
94.                    AS("lastActivity","Issued");
95.                NE( );
96.                NS("SATask_Subro",null,"toTaskArbitration");
97.                NE( );
98.                NS("SATask_Subro",null,"toTaskLitigation");
99.                NE( );
100.           NE( );
101.       NE( );
102.       NS("SAFolder_Subro",1,null);
103.           AS("stage","Issued");
104.           NS("SAFolderData_Subro",2,"toAppData");
105.               NS("SAParty",3,"toPartyD");
106.                   AB("actionFlag",1);
107.                   AI("alertCount",3);
108.               NE( );
109.               NS("SAParty",3,"toPartyR");
110.                   NS("SACompany",4,"toCompany");
111.                       AS("companyName", "Gordon Insurance Company" );
112.                       AS("companyId", "Gordon" );
113.                   NE( );
114.               NE( );
115.               NS("SA_Demand",5,"toDemand");
116.                   AD("dateDemandIssued","20030407000000");
117.                   AF("pctRecovery",.80);
118.                   NS("SA_DemandClaimDetail", 6, "toClaimDetailD" );
119.                       AS("claimNumber","34-000108");
120.                   NE( );
121.                   NS("SA_DemandClaimDetail", 7, "toClaimDetailR" );
122.                       AS("claimNumber","GI-138-00331");
123.                   NE( );
124.                   NS("SA_DemandNeg", 8, "toCurrentNeg" );
125.                       NS("SA_DemandNegDetail", 9, "toCurrentProposalD" )
126.                           AF("amtPaymentTotal",5000.00);
127.                           AF("amtDemandTotal",5000.00);
128.                       NE( );
129.                       NS("SA_DemandNegDetail", 9, "toCurrentProposalR" )
130.                           AF("amtDemandTotal",4000.00);
131.                       NE( );
132.                   NE( );
133.               NE( );
```

```
-continued

134.                    NS("SATask_Subro",6,"toTaskDemand");
135.                        AS("lastActivity","Negotiation");
136.                    NE( );
137.                    NS("SATask_Subro",null,"toTaskArbitration");
138.                    NE( );
139.                    NS("SATask_Subro",null,"toTaskLitigation");
140.                    NE( );
141.                NE( );
142.            NE( );
143.        RE( );
144.
145.        NS("STMFNLIST",null,"oFnList");
146.            RS("oFunctions");
147.                NS("STMFunction",null,"");
148.                    AS("name","DemandD_Detail");
149.                    AS("text");
150.                    AS("rootObjectType","SA_Demand");
151.                    AB("bWorkFlow",0);
152.                    AS("workflowBarRootClass");
153.                NE( );
154.                NS(" STMFunction",null,"");
155.                    AS("name","DemandD_History");
156.                    AS("text");
157.                    AS("rootObjectType","SA_Demand");
158.                    AB("bWorkFlow",0);
159.                    AS("workflowBarRootClass");
160.                NE( );
161.            RE( );
162.        NE( );
163.
164.        NS("STMMSG",null,"oMsg");
165.            RS("oMessages");
166.                GA("MSG_INFO","Application informational message.");
167.                GA("MSG_ERROR","Application error message.");
168.            RE( );
169.        NE( );
170.
171.        RS("oDomains");                                              //New Domain Support
172.            NS("SADomain",501);
173.                AS("domainName","RespondingCompanies");
174.                AS("domainType","DYNAMIC");                          //DYNAMIC, STATIC, LOOKUP
175.                AS("domainItemType","COMPLEX");                      //COMPLEX, ATTRIBUTE
176.                AS("domainClass","SACompany");
177.                RS("toDomainItems");
178.                    NS("SACompany",77771);
179.                        AS("name","Erie Insurance");
180.                        AS("companyId", "Erie");
181.                        AB("onNetwork",0);
182.                    NE( );
183.                    NS("SACompany",77774);
184.                        AS("name","Gordon Insurance Company");
185.                        AS("companyId", "Gordon");
186.                        AB("onNetwork",0);
187.                    NE( );
188.                    NS("SACompany",77776);
189.                        AS("name","Insurance Property & Casualty");
190.                        AS("companyId", "IPC");
191.                        AB("onNetwork",0);
192.                    NE( );
193.                    NS("SACompany",77780);
194.                        AS("name","New Jersey Manufacturers");
195.                        AS("companyId", "NJM");
196.                        AB("onNetwork",0);
197.                    NE( );
198.                RE( );
199.            NE( );
200.        RE( );
201.
202.    NE( );
203.
204.    // STM End
205.    //-->
206.    </SCRIPT>
207.  </HEAD>
208.
209.  <BODY TOPMARGIN="0" LEFTMARGIN="0" MARGINHEIGHT="0" MARGINWIDTH="0" ONLOAD="goJM.Init( )" >
210.    <DIV ID="JV_BODY">
211.        <NOSCRIPT>
212.        Site Error 0001 - Javascript Not Supported or Currently Disabled Within Your Browser.
213.        <br><br>
```

-continued

```
214.        To resolve this problem, please contact Siteras Customer Support at
215.            <A href="http://www.siteras.com">www.siteras.com</A>
216.            </NOSCRIPT>
217.        </DIV>
218.        </BODY>
219.    </HTML>
```

Diagram 2—JView™ HTML Generation

```
1.     var aHTML = new Array( );        // HTML Array
2.     var sHTML;                        // HTML Stream
3.
4.     aHTML[aHTML.length] = "<BODY>";
5.     aHTML[aHTML.length] = "<TABLE>";
6.     aHTML[aHTML.length] = "<TR><TD>This is some
       text.</TD></TR>"
7.     ... additional HTML generation statements or method
       calls ....
8.
9.     sHTML = aHTML.join("");           // Create the HTML Stream
10.    JV__BODY.outerHTML = sHTML;
```

Background—Inter-Organizational Workflow Management

Automated systems that process business transactions often need to manage and track the flow of these transactions within the related business process (i.e., workflow). Typically, this workflow capability is explicitly coded within the software used to control the system. These systems cover a wide array of business applications, of varying complexity, including production forecasting/scheduling, order processing, human resources management, financial accounting, sales management, etc. Commercial examples of such systems include offerings from SAP, Oracle, and PeopleSoft.

During the 80's and 90's, these systems were focused on integration of business processes and data that existed within an organization (i.e., intra-organization). Organizations that successfully implement such systems achieve reduced costs, higher efficiency, and compete more effectively in the global economy. With the intra-organization systems in place, these organizations are now looking to integrate the business processes and data that exist between trading partner organizations (i.e., inter-organizational).

Requirements and Challenges

At a minimum, intra-organization workflow management must be capable of the following: 1) maintaining status information related to the current state of the business transaction (Status). In general, the status information is defined in such a way that it is easy to understand the flow of the transaction as is proceeds from inception to conclusion, 2) maintaining ownership information related to the current owner of the business transaction—i.e., the person/group/organization that is responsible for taking the next action on the transaction (Ownership), 3) determining the allowed operations/functions that can be performed on the business transaction at any given point within the workflow (Navigation), and 4) determining the new state for a business transaction when an operation/function is performed that affects that transaction (State Management).

When workflow management for a complex business process is explicitly coded within an application system, the following limitations arise: 1) it is very difficult to determine whether or not all business process conditions can be handled; as a result, comprehensive testing of such workflow is difficult, time consuming, and expensive, and 2) when the underlying business process changes, software modifications are required to support any changes or additions to the related workflow.

Beyond the requirements of intra-organization workflow, inter-organizational workflow requires the following additional capabilities. 1) a common framework, specific to the business process, that enables all the individual organizations to be able to communicate about the status of a business transaction in a consistent manner; this is referred to as community workflow status or inter-organizational workflow status, 2) the ability to maintain the transaction status with respect to each individual organization involved in the transaction (i.e., related to it's own internal systems or business processes); this is referred to as organization-specific workflow status or intra-organization workflow status, 3) the ability to distinguish between and amongst multiple organizations involved in a transaction (i.e., the parties involved in the transaction), 4) the ability to distinguish the role or relationship that any given organization has with respect to a specific transaction, 5) the ability to manage the functions/operations that each organization can perform based on their relationship in the business transaction and the current state of the transaction, and 6) the ability to provide security and privacy for each organization with respect to data and functions.

Inter-Organization Workflow Management Subsystem

The Inter-Organization Workflow Management Subsystem (or just Workflow Subsystem) is designed to meet the requirements of both intra and inter organization workflow. This subsystem is not dependent on a specific vertical business process or application. This subsystem is unique in its ability to deal with multi-party workflow management that spans distinct organizations. The following sections describe the key characteristics and benefits of the Workflow Subsystem.

General

The workflow subsystem does not manage workflow based on explicitly coded software instructions. Rather, it uses a series of workflow tables (data structures) and a unique workflow algorithm to perform all workflow management operations.

The workflow tables are essentially a set of finite state machines (FSM's), that define a closed loop system for the workflow related to a given business process. Using this approach, the workflow defined for each business process is complete (i.e., no holes or gaps can exist in the workflow table).

Status (Community Status—Inter-Organization Workflow)

With inter-organizational workflow, the workflow subsystem includes a framework that allows all the participants to communicate about the status of their transactions using a consistent language. For each business process, a specific community framework (i.e., terminology, status codes, etc.) will be defined. The workflow subsystem can support any number of independent community frameworks.

Within the folder, the stage is used to represent the main community workflow status for the transaction. This is used to track the overall progression of the transaction through its workflow towards conclusion.

For each task within the folder, the parties that are allowed to operate on that task are defined. For each such party, a community task party state is maintained. This allows the workflow subsystem to manage and track the community status of each party on each task.

Status (Organization Status—Intra-Organization Workflow)

In order to support intra-organization workflow, a parallel framework (similar to the community framework) is established within the workflow subsystem. The only difference is that this framework is specific to a given organization. This framework is used to manage and track any organization specific activities that occur within a business process. For each business process, a specific organization specific framework (i.e., terminology, status codes, etc.) can be defined (by party type). The workflow subsystem can support any number of independent organization specific frameworks.

For each party on the folder, the organization stage is used to represent the main organization workflow status for the transaction. This is used to track the overall progression of the transaction through its organization specific workflow towards conclusion.

For each task within the folder, the parties that are allowed to operate on that task are defined. For each such party, an organization task party state is maintained. This allows the workflow subsystem to manage and track the organization specific status of each party on each task.

Ownership

By maintaining the action party on each task within the folder, the workflow subsystem is able to determine which organization is responsible for taking action on the business transaction at both the folder level, and the specific task level.

Navigation

Based on the current state information maintained within the folder and tasks, the workflow subsystem can determine the functions that can be performed at any time by any party. This capability is referred to as workflow navigation or just navigation.

Using this navigation capability, the enclosing system that uses the workflow subsystem can present to any user the list of valid business operations that can be performed at any time (subject to that user's security profile). This eliminates the need for the operator to remember the different workflow conditions and greatly aids in the training of new operators. At the same time, this mechanism ensures the integrity of the business process by preventing any "out of process" operations from being performed.

State Management

Based on the current state information maintained within the folder and tasks, when a new function is performed on the folder, the workflow subsystem will automatically update the state information within the folder (i.e., on the folder and any tasks).

This capability is at the heart of the workflow subsystem and allows for an orderly transition from one business state to another. Upon completion of any given workflow transition, the folder will now reside in a new state (or just the same state).

Within the workflow table, it is possible to define conditional workflow. This workflow allows the resulting workflow state to be set based on the value of any number of additional business data elements contained within the folder (i.e., as affected by the function that is just performed). The definition of these criteria can be arbitrarily complex and any number of conditional workflow rules can be defined.

Commercial Example

The Electronic Subrogation Network is a commercial example of a fully operational system that embodies the concepts described herein specifically for the vertical market of Insurance Subrogation claims Processing.

Terminology

This section contains terminology definitions that are useful in understanding the concepts described in this section.

Folder

Each distinct business transaction is represented by a folder. The folder is used to logically contain all information related to this transaction (e.g., parties, tasks, documents, contacts, alerts, attachments, events, etc.).

Party

A business transaction involves the interaction between two or more parties where, for the purpose of that transaction, each party takes on a specific relationship (described further below). With intra-organization workflow, parties are typically different business units (e.g., division, department, etc.) within the same organization. With inter-organizational workflow, parties are typically different organizations or individuals.

Relationship (Party Type)

Figure 22:
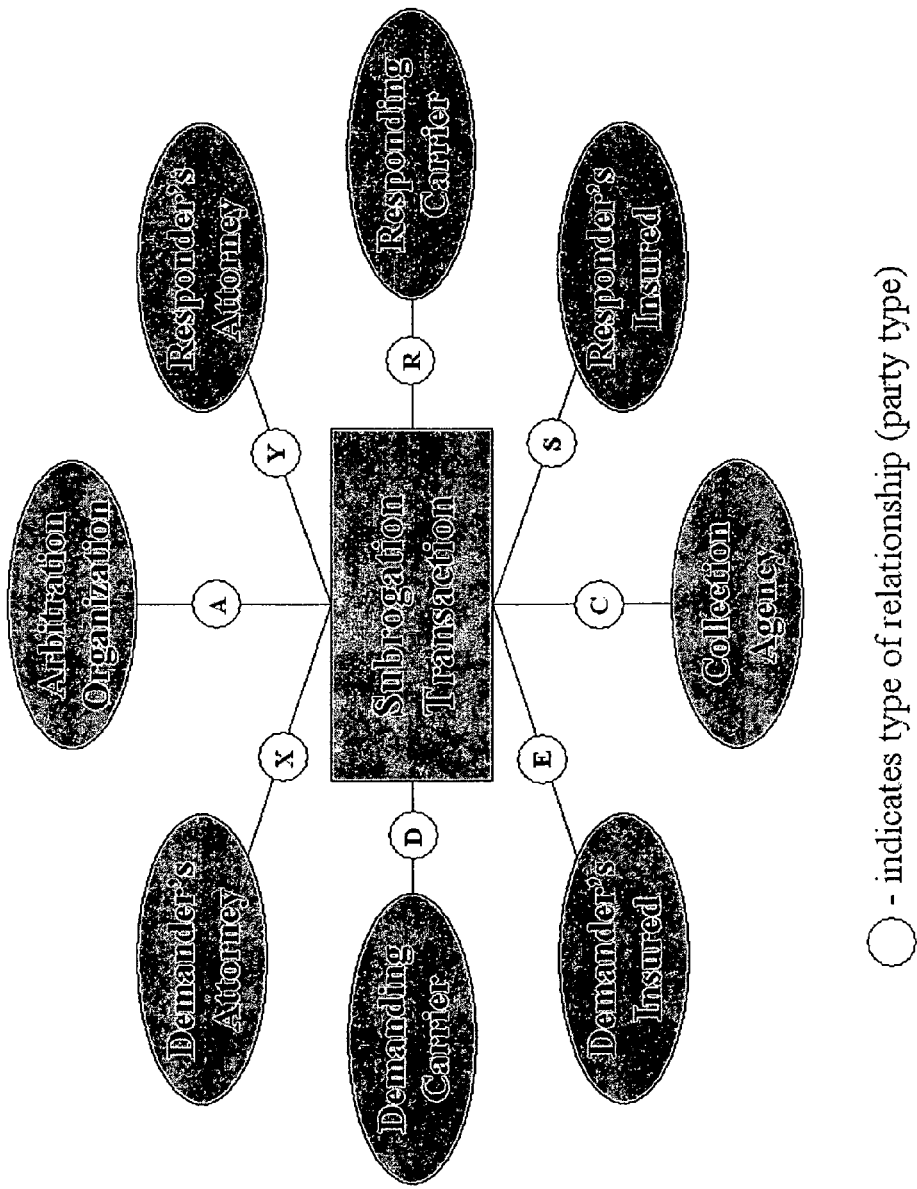
FIG. 22 shows the concept of multiple parties and their "relationship" to a transactional folder (e.g., insurance subrogation transaction) within the inter-organizational workflow management system.

For each specific type of business transaction (folder), one or more relationships are defined. Each relationship defines the role that a given party will play with respect to that transaction. For example, in a simple order management transaction (Order Folder), one party represents the "Buyer" and one party represents the "Supplier". As such, for each party defined on the folder, that party's relationship to the transaction is referred to as their party type. FIG. 22 illustrates the relationships of multiple parties with respect to an Insurance Subrogation Demand transaction.

Tasks

A task is used to represent an independent business activity (related to the transaction for this folder). Each folder must have at least one task (its primary task). With complex business processes, multiple tasks are used within the folder to manage and track multiple parallel activities related to a given business transaction. For example, for an order management transaction (Order Folder), one task is defined for the order itself, and additional tasks are defined for each distinct shipment/invoice.

Action Party

For each task on the folder, the party responsible for taking the next action related to that business activity is referred to as the action party. When the business transaction is concluded, no further business activity will occur. At this point, no action party will exist on any tasks within the folder.

Function

Each operation that can be performed on the folder, that affects the information or status of the folder, is referred to as a function. Based on the folder, certain functions can only be performed by a specific party type, while others can be performed by some or all party types. In a simple order management transaction some examples of functions include: issuing a purchase order (buyer), accepting an initial order (supplier), creating a shipment/invoice (supplier), etc.

Business Transaction

An interaction between two or more parties that results in the formal exchange or transfer of goods, services, capital, information, or other resources. Examples include an insurance claim, a purchase order, booking an airline flight, ordering a book, etc.

Organization

Two distinct legal entities (e.g., companies or individuals) as opposed to different business units (of arbitrary size) within a single legal entity.

Workflow

A defined set of business operations and/or processes, triggered by an initial business event (business transaction), that proceed in a specific sequence or order, and culminate in a conclusion or completion of the transaction. A simple workflow will follow a prescribed set of operations in sequence to conclusion (single path). A complex workflow will contain multiple conditional paths, only one of which will be taken based on the business conditions present in the transaction.

Inter-Organization Workflow

A workflow that exists between two organizations for the purpose of conducting/completing a business process/transaction specific to those organizations.

Workflow State

A specific point within a given business workflow. For any given transaction, its complete workflow will typically encompass many distinct states.

Workflow Progression (Stage)

Within the context of a business transaction, most transactions progress from inception towards some form of closure. There can be many different paths that any given transaction takes through the various workflow states towards closure. And, the number of possible paths is directly related to the number of distinct workflow states and possible transitions allowed in any given workflow (essentially most business workflows are defined as "closed loop" processes in that any transactions entering the system will eventually exit the system). Within the Inter-Organization Workflow Management system, the current progression of a given transaction is referred to as its stage. The stage is maintained in the folder for each business transaction.

Finite State Machine (FSM)

A model of computation consisting of a set of states, a start state, an input alphabet, and a transition function that maps input symbols and current states to a next state. Computation begins in the start state with an input string. It changes to new states depending on the transition function.
(Above definition from NIST—http://www.nist.gov/dads/HTMUfiniteStateMachine.html)

Detailed Description—Inter-Organizational Workflow Management

The Inter-Organization Workflow Management Subsystem (or just Workflow Subsystem) provides for both intra and inter organization workflow management. This subsystem is not dependent on a specific vertical business process or application and is unique in its ability to deal with multi-party workflow management that spans distinct organizations.

This section contains detailed process and component descriptions related to the workflow subsystem. This discussion assumes some familiarity with the following concepts and technologies:

finite state machine concepts and terminology
general business-oriented transaction processing concepts
object-oriented design and programming The workflow subsystem described in this section has been implemented within the following business transaction contexts:

Insurance—Subrogation claims (Demands, Responses, Arbitration Filings, etc.)
Manufacturing—Order Processing (Purchase Orders, Shipping, Invoicing, Returns, etc.)
Retail—Store Management (Labor Scheduling, Employee Maintenance, Timecard Tracking, etc.)
General—Call Logging and Problem Management Overview The following sections summarize the key concepts used within the system.

General

The following general insights have driven the development of the workflow subsystem. A folder (defined below) is a container for a related set of data elements for a given business transaction. In its purest sense, the true workflow state of any given folder is represented by the distinct values that exist in all its data elements at any given point in time. Unfortunately, this approach would not be practical for human comprehension (i.e., information overload). From a practical standpoint, the workflow of a given folder can be adequately represented by a finite set of value permutations that occur across a subset of its data elements. Each such permutation is represented by a given workflow state. This is a form of shorthand that allows humans to understand, organize, and relate to the processing of any business transaction.

Folder

Within the system, each distinct business transaction is represented by a transactional folder. Each folder has the following key characteristics. It is a logical container for all information related to the transaction (e.g., parties, tasks, documents, contacts, alerts, attachments, events, etc.). Within the folder, a major workflow variable (stage) is maintained. This variable represents the workflow progression for this folder. Within the folder, one or more parties (party) are defined. This collection of parties represents the distinct set of organizations that are allowed to interact with this transaction. Each such party so defined is governed by their relationship to the transaction (referred to as their party type). This party relationship is used to constrain the information that can be viewed and the functions that can be performed (by this party, with respect to this transaction). Within the folder, one or more workflow tasks (task) are defined. A task is used to represent an independent business activity (related to the transaction for this folder). Each folder must have at least one task (its primary task).

Stage

For any transactional folder, the stage represents the major progression (i.e., its workflow progression) of that transaction towards its eventual completion or closure. In general, once a transaction has moved to a given stage, it does not move back to a prior stage.

Tasks and Task Parties

Within a folder, tasks are used to represent one or more business activities that are occurring related to the completion of the transaction. The following are the characteristics of a task:

The granularity of the task definition (i.e., the specific business activity to which it relates) depends on the needs of the specific business application. By default, a primary task is created when the transactional folder is created. When the task is created, a certain number of parties must be assigned to the task (at least 1). This assignment is used to constrain the information that can be viewed and the functions that can be performed (by this party, with respect to this task). Additional parties can be granted access to the task during its life. Once assigned, a party is never removed from a task. For each party assigned to a task, a task party is created. Multiple tasks can exist within a folder at the same time. This enables the system to support parallel business activity within a given business transaction. Within each task party, a party specific variable (party state) exists for each party defined on the task. This variable is used to track the current workflow state of that party with respect to the task.

A single action variable (action party) exists for each task that identifies the party that needs to take the next action for this task. Since multiple tasks can exist in a folder, multiple action variables can exist (i.e., parallel workflow can be managed). Within each task, a last activity variable contains a description of the last activity that was performed on the task that changed the action party. Any party can view all the workflow states of any task that it has access to. Any function can change the state of one or more party specific state variables on one or more tasks (as defined within the workflow table). When all the party states on a task are "closed", the task is "closed". In this case, the action flag is set to null (i.e., a task that is closed cannot require action). When the state of the primary task is "closed", the stage of the folder is "closed". However, in this case, other tasks within the folder may not be closed. This allows for "post-close" workflow to occur in an orderly fashion. At the point all the tasks within the folder are "closed", the folder is "closed". The true workflow state of a folder is really the aggregation of all states on all tasks.

Community Workflow

With inter-organizational workflow, a common language or framework must be established for all organizations involved in the transactions. This allows for consistent and effective communication related to the workflow state of any given transaction. Within the workflow subsystem, the following data elements represent this common framework:

Folder—stage
Party—partyType
Task—actionParty, lastActivity
Task Party—partyState These data elements represent the community workflow information that is available to all parties defined for the specific folder.

Intra-Organization Workflow

Since any inter-organizational workflow must also exist within the context of intra-organization workflow (i.e., workflow that is specific to a given organization), the workflow subsystem supports the maintenance of the organization specific workflow states. The following data elements are used to maintain organization specific workflow state:

Party—orgStage
Task Party—orgState

These data elements represent the organization specific workflow information. This information is private to each party within the folder.

Workflow Data Model

Figure 25:
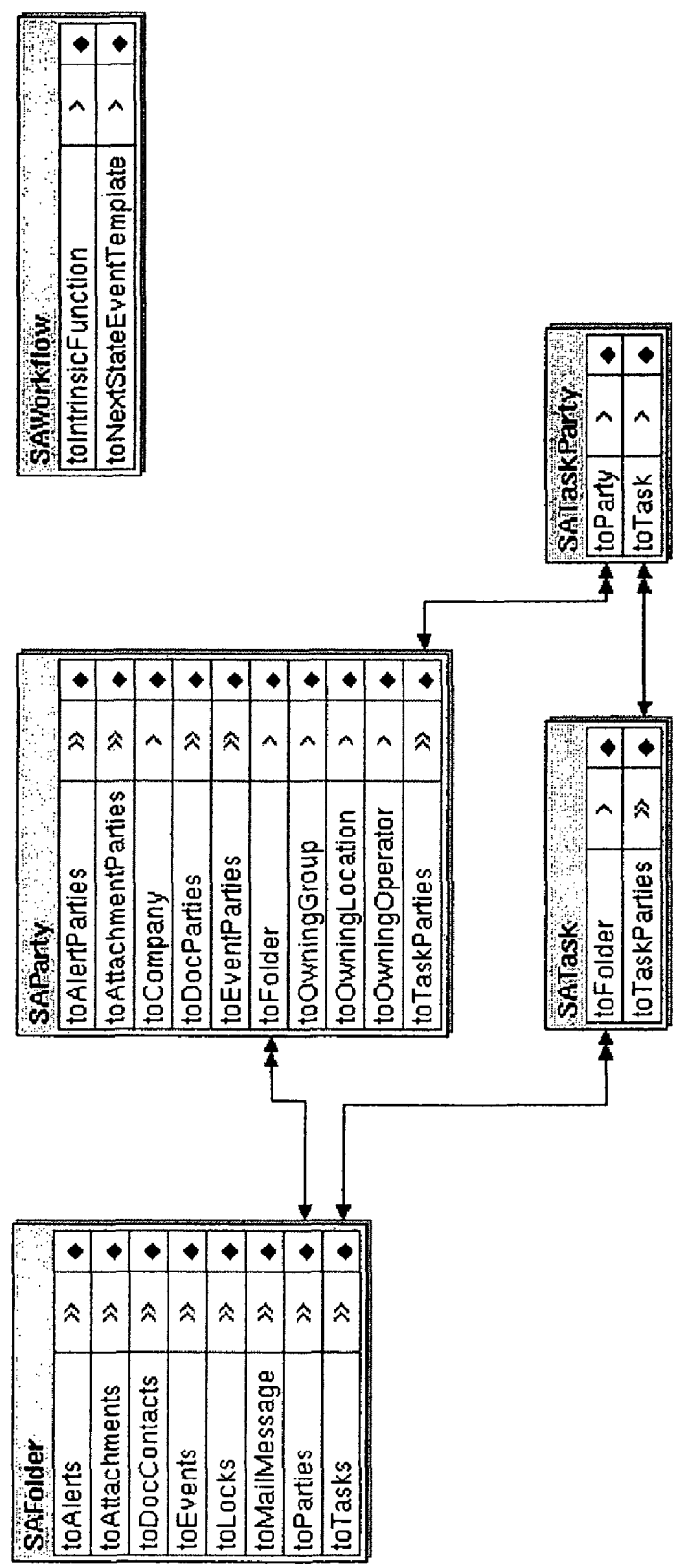
FIG. 25 is a entity-relationship diagram of the major data entities within the inter-organization workflow management system.

FIG. 25 illustrates those main data entities and their relationships used by the workflow subsystem. The Folder (SAFolder), Party (SAParty), Task (SATask) and TaskParty (SATaskParty) entities contain the actual workflow state information for a given business transaction. The Workflow Table contains the workflow definitions that are used by the workflow processes.

Workflow Table

The Workflow table is at the heart of the workflow subsystem. Essentially, this table is used to define and organize multiple Finite State Machines (FSM's). These FSM's work in combination to define and control the workflow for the entire application system. This table and the related workflow processes are described in detail below.

For any given application system, a single workflow table is defined that contains the community workflow definitions for all business transactions processed by this application. Another table is also defined that contains the organization specific workflow definitions. This organization specific workflow table is similar in structure to the community workflow table.

Workflow State Transitions

The main purposes of the workflow table is to allow the system to determine the next workflow state for a transactional folder based on its current state and the completion of a given application function that alters that folder—i.e., the workflow state transition. Within the workflow subsystem, the workflow state transition mechanism is used to modify any or all of the following: stage, party state, actionParty, or taskParties.

Workflow Navigation

In addition to defining workflow state transitions, the workflow table implicitly defines workflow navigation as well. For any given transactional folder in a given state, the workflow table will define the application functions that are allowed to be performed in this state. Based on these definitions, the workflow subsystem can return this list of valid application functions for any folder at any time.

With an online system, this is useful as it allows the system to guide or navigate a user through the system by displaying the allowed functions that are valid. This reduces the workflow knowledge required by the users, speeds training, and allows lesser skilled users to operate the system.

Action Party Management

One problem that exists with inter-organizational workflow is determining, at any given time, which organization is responsible for taking the next action on the transaction. With each task, the actionParty field contains the party type of the party that is responsible for taking the next action on this task. In fact, since multiple tasks can exist within a folder, the workflow subsystem is capable of keeping track of the action party for multiple tasks.

Workflow Table Structure

The workflow table contains records that define the workflow for all business transactions within a given application system. The detailed attributes within this table contained in Diagram 3 below.

The records in the workflow table are organized into groups along the following dimensions: folder type; task type; stage; task party type; and party State.

These groupings essentially divide the table into multiple sets of workflow records along a given dimension.

Within these dimensions, each workflow record defines the workflow state transition that is to occur after the processing of a specific application function has been completed. Additionally, each workflow record implicitly defines the application functions that are "valid" (from a workflow standpoint) within any given workflow state (thereby allowing the system to support workflow navigation).

Workflow Operation Code

A given workflow record can be defined to control either workflow navigation, workflow state transitions, or both. The operationCode field is used to specify which of these workflow operations are to be performed.

Conditional Workflow

In most cases, workflow state transitions are simple and deterministic—the next workflow state is determined simply by the current workflow state and the application function that was completed. However, in some cases, the transition can only be determined by inspecting other data elements within the transactional folder. In this case, the workflow is conditional.

To support conditional workflow, the workflow table allows multiple workflow records to be defined for the same workflow state and same application function. These records are then further differentiated by the postConditionQualifier. Similar to a "WHERE" clause within an SQL statement, this field defines the data condition under which the state transition is to be performed. If this condition evaluates to "TRUE" the workflow engine will perform the state transition as defined on this record. If not, it will continue to evaluate the conditional qualifiers on the other workflow records (if all conditions return "FALSE", the workflow engine will return a workflow error to the calling subsystem).

This conditional workflow capability also applies to workflow navigation. In some cases, a given application may or may not be allowed within a given workflow state based on the values of other data elements within the transactional folder. To support this capability, a preConditionQualifier can be defined for each workflow record. When performing workflow navigation, the system will only return application functions for a given workflow state where this field is either null or where the qualifier evaluates to "TRUE".

Assigning Additional Task Parties to a Task

As part of the workflow state transition mechanism, additional task parties can be added to a specific task in response to an application function. This is controlled by the taskPartyArray field. Once a given workflow record is selected for workflow state transition, if the task party array contains a party type for a party that does not exist on that Task, then the new partyType is added to the currentPartyArray field for that task.

Action Party Management

As part of the workflow state transition mechanism, the actionParty for a given task can be modified in response to an application function. This is controlled by the nextActionParty field. Once a given workflow record is selected for workflow state transition and if the nextActionParty field contains a partyType, then the actionParty for this task will be updated. Additionally, if the nextActionParty field contains a "?", then this indicates that the nextActionParty type is application dependent, and in this case, the nextActionPartyType will have been provided from subsystem that invokes the workflow manager.

Workflow Processing

There are two distinct types of workflow processing that are performed by the workflow subsystem—workflow navigation and workflow state transitions. The following sections describe this processing in detail.

Workflow Navigation

The following describes the operation of the workflow navigation mechanism.

The calling subsystem will invoke the GetWorkflowFunctions( ) class method of the WorkflowManager Class. In doing so, the following parameters will be passed:

oFolder—reference to the folder being accessed;

sPartyType—the party type of the organization accessing the folder;

aFunctions—an empty array (that is to contain the valid workflow functions).

Within the GetWorkflowFunctions( ) method, the following will be performed:

Based on the folder reference, the current workflow state will be determined (e.g., stage, tasks, task party states, etc.).

Retrieve the Task records for this folder.

FOR EACH task within the folder (oTask),

Retrieve the task party records for this task.

FOR EACH task party record (oTaskParty),

Query the workflow table will be queried using the following:

```
SELECT * FROM SAWORKFLOW WHERE
    ((folderType = oFolder.folderType)
    AND
        (taskType = oTask.taskType)
        AND
        (stage = oFolder.stage) AND
        (taskPartyType =
        oTaskParty.partyType) AND
        (partyState =oTaskParty.partyState)
        AND
        (actionParty = sPartyType)
        AND
        ((operationCode = 'N') or
        (operationCode = 'B'))
    );
FOR EACH workflow record returned,
    IF the preConditionQualifier is null THEN
        Add the application function specified
        in this record to aFunctions.
    ELSE
        IF the preConditionQualifier evaluates to
        TRUE THEN
            Add the application function specified
            in this record to aFunctions.
        END IF
    END IF
END FOR (no more workflow records)
END FOR (no more task party records)
END FOR (no more task records)
```

At this point, the aFunctions array contains the list of application functions that are allowed for the current folder in its current state. The GetWorkflowFunctions( ) method will return to the caller.

Workflow State Transitions

The following describes the operation of the workflow state transition mechanism.

The calling subsystem will invoke the EvaluateWorkflow( ) class method of the WorkflowManager Class. In doing so, the following parameters will be passed:

oFolder—reference to the folder being processed;

oFunction—reference to the application function (whose processing has just been completed);

sPartyType—the party type of the organization accessing the folder; and sNextActionPartyType—if the nextActionParty for this application function is application dependent, then this field will contain the nextActionPartyType, otherwise it will be null.

Within the EvaluateWorkflow( ) method, the following will be performed. Based on the folder reference, the current workflow state will be determined (e.g., stage, tasks, task party states, etc.). The current stage is saved in sCurrentStage.

```
IF the application function (oFunction) indicates that a
    new task should be
created, THEN
    Create the new task for this folder
    END IF
    Retrieve the Task records for this folder.
        FOR EACH task within the folder (oTask),
            Retrieve the task party records for this task.
            FOR EACH task party record (oTaskParty),
                Query the workflow table will be queried
                using the
                following:
                    SELECT * FROM SAWORKFLOW
```

-continued

```
            WHERE
                ((folderType = oFolder.folderType)
                AND
                    (taskType = oTask.taskType)
                    AND
                    (stage = sCurrentStage) AND
                    (taskPartyType =
                    oTaskParty.partyType)
            AND
                    (partyState =
                    oTaskParty.partyState) AND
                    (actionParty = sPartyType)
                    AND
                    ((operationCode = 'S') or
                    (operationCode =
            'B'))
            );
            FOR EACH workflow record returned,
                IF the postConditionQualifier is null
                THEN
                    Perform the state transition
                    indicated
                by this workflow record (see
                below).
                ELSE
                    IF the postConditionQualifier
                    evaluates
                    to TRUE THEN
                        Perform the state
                        transition
                        indicated by this workflow
                        record (see
                        below).
                    END IF
                END IF
            END FOR (no more workflow records)
        END FOR (no more task party records)
    END FOR (no more task records)
```

When a state transition is to be performed, the following operations will occur using the values from the selected workflow record.

```
IF the nextStage is not null THEN
    Set the oFolder.stage = nextStage
END IF
IF the nextPartyState is not null THEN
    Set the oTaskParty.partyState = nextPartyState
END IF
IF the nextActionParty is not null THEN
    IF the nextActionParty = "?" THEN
        Set the oTask.action Party = sNextActionPartyType
    ELSE
        Set the oTask.actionParty = nextActionParty
    END IF
END IF
IF the taskPartyArray is not null THEN
    Add any new parties to oTask.currentPartyArray.
    FOR EACH new party added
        Create a new TaskParty record for this Task
        Add this new TaskParty record to the array of task
        parties currently being processed (so that the party state for
        this new task party record will be correctly initialized).
    END FOR
END IF
```

At this point, the workflow state transition has been completed and the EvaluateWorkflow( ) method will return to the caller.

NOTE: Within this processing, the evaluation of the workflow occurs, after the processing for the application function that modified the folder. This is necessary in order to allow the application to modify the application data elements within the folder. Once this is complete, any postConditionQualifiers (and resulting workflow) will be evaluated against the new application data.

Workflow Subsystem Processing Example

This section illustrates one example of the workflow subsystem within the context of the Insurance Subrogation application.

Subrogation Workflow Overview

A subrogation claim is a business transaction between two insurance companies—a demanding company and a responding company. This claim arises when an accident occurs between two insured vehicles—one insured by the demanding party and one insured by the responding party (where the responding party's driver was liable for the accident). In this case, the demanding company is entitled to seek reimbursement from responding company for the costs incurred to repair their insured's vehicle. The demanding company initiates the transaction by sending a subrogation demand to the responding company.

The applicant provides an ASP based application (electronic network), that allows insurance carriers to process and settle their subrogation claims using an automated system. This system can interface with an insurance carrier either electronically or manually (via a web based interface).

The workflow related to processing a subrogation claim is complex in that the transaction can follow many different paths during its life. As such, additional parties (beyond the Demander and Responder) can be involved in the transaction. FIG. 22 depicts the full set of parties that can participate in a given subrogation transaction.

Folders

The Subrogation application deals with the following transactional folders:

Demand Folder (SAFolder_Subro)
Demand File Upload Folder (SAFolder_DemandUpload)
Company Folder (SAFolder_Company)
Location Folder (SAFolder_Location)
Group Folder (SAFolder_Group)
Operator Folder (SAFolder_Operator)
System Folder (SAFolder_System)
System Alert Folder (SAFolder_SystemAlert)

Each of the above folders has its own workflow defined within the workflow table. For this example, we will only describe the workflow related to the Demand folder.

Parties

The Demand folder can have the following parties:

Demander (D)—the primary party (i.e., insurance carrier) who initiates the transaction.

Responder (R)—the counter-party (i.e., insurance carrier or uninsured motorist) responsible for the claim.

Arbitrator (A)—For demands being arbitrated, the arbitration organization.

Collection Agency (C)—If the responding party is an uninsured motorist, the collection agency handling the recovery.

Demander's Attorney (X)—For demands being litigated, the demanding party's attorney.

Responder's Attorney (Y)—For demands being litigated, the responding party's attorney.

Demander's Insured (E)—The demanding party's policyholder.

Responder's Insured (S)—The responding party's policyholder.

Demand Folder Tasks

The Demand folder can have the following tasks:

Demand—the primary task representing the subrogation claim.

Arbitration—a secondary task used to track arbitration activity.

Litigation—a secondary task used to track litigation activity.

Demand Folder Stages

The following stages are defined for the Demand Folder:

Init—Initial stage used when the Demand folder is initially created.

Preparation—Demand has been created, but not issued to a responding company.

Issued—Demand has been issued to a responding company.

Negotiation—Demand is being negotiated between the demanding party and responding party.

Arbitration—Demander has decided to pursue binding arbitration.

ArbFinal—Arbitration is complete and an award has been made.

Litigation—Demander has decided to pursue litigation.

LitFinal—Litigation is complete and a judgment has been made.

Closed—the Demand transaction has been settled.

Party States

For each of the tasks above, and for each party, specific party states are defined. Within the subrogation workflow, there are currently 60 valid combinations of party states and stages.

Application Functions

Within the subrogation application, there are currently 60 different editing functions that can be performed on a Demand folder.

Workflow Table Example

Within Diagram 4 (below) are some representative rows from the workflow table used within the Insurance Subrogation application. These sample rows all relate to the Demand folder and illustrate workflow for a Demander (partyType D) or Responder (partyType R).

Based on the number of workflow states (60) and application functions (60), the Demand folder has 3600 possible workflow conditions. However, since the workflow table only contains "valid" workflow conditions, the final table only contains 1000 rows (i.e., 2600 combinations are invalid). The following describes how these workflow rows are used to control the subrogation related workflow.

Creating a New Subrogation Demand Folder (Row 344)

This workflow row is used to control the workflow when a new subrogation transaction folder is initially created (from the application function DemandD_CreateElectronic).

Line(s) Description 1,2 This row applies to the Demand folder (SAFolder_Subro) and Demand task.

3,5 When a folder does not exist, its stage and all party state variables are defined as "Init".

Line(s) Description

4 Within the Demand task, this row applies to the Demander (D) task party.

8 This workflow row is used for BOTH workflow navigation and state transition processing.

6,7 Within the workflow state specified in this row, any state transition processing will be triggered when the Demander (partyType D) executes the application function DemandD_CreateElectronic.

9 No preConditionQualifier is specified. For workflow navigation, this function will be unconditionally included in the list of allowed functions for this workflow state.

10 A postConditionQualifer is specified for this workflow row. If this condition is true, then the workflow state transition will be performed using the other values for this row. If this condition is false, then the workflow transition will be performed using another workflow row in the table (not shown).

11 If the state transition is performed for this row, the stage of the new folder will be set to "Preparation"

12 If the state transition is performed for this row, the party state for the Demander's task party record will be set to "Pending Issuance".

13 If the state transition is performed for this row, the actionParty for this task will be set to the Demander (D) (i.e., the demanding party will be responsible for taking the next action on this task within this transactional folder).

14 Since this folder is being newly created, no parties have been assigned to the Demand task. If the state transition is performed for this row, the Demander (D) will be assigned to this task.

Workflow Navigation Control for Arbitration Function (Row 805)

This workflow row is only used to control workflow navigation for the Demander. By using a "preConditionQualifier", this row will allow the Demander to perform the application function DemandD_Arbitrate only if the responding party belongs is a member of the arbitration organization.

Line(s) Description 1,2 This row applies to the Demand folder (SAFolder_Subro) and Demand task.

3 This row applies to the Negotiation stage.

4 Within the Demand task, this row applies to the Demander (D) task party.

5 Within the Demand task, within the Demander's task party record, this row applies to the party state "Counter Offer Approved".

8 This workflow row will ONLY be used for workflow navigation.

9 A preConditionQualifier is specified for this workflow row. If this condition is true, then the application function will be included in the list of allowed functions for this workflow state.

6,7 The actionParty and application function for this workflow row.

Line(s) Description

11 Not applicable (since the operation code is N).

12 Not applicable (since the operation code is N).

13 Not applicable (since the operation code is N).

14 Not applicable (since the operation code is N).

Setting the Action Party with Assistance from the Application Function (Row 808)

This workflow row is used to control the workflow for an Inquiry function executed by the Demander within the stage "Negotiation" and the Demander's party state "Counter Offer Approved". Since an inquiry can be sent to one of many parties, this row illustrates the use of the "?" for setting the next action party for this task on the folder.

Line(s) Description 1,2 This row applies to the Demand folder (SAFolder_Subro) and Demand task.

3 This row applies to the Negotiation stage.

4 Within the Demand task, this row applies to the Demander (D) task party.

5 Within the Demand task, within the Demander's task party record, this row applies to the party state "Counter Offer Approved".

8 This workflow row is used for BOTH workflow navigation and state transition processing.

6,7 Within the workflow state specified in this row, any state transition processing will be triggered when the Demander (partyType D) executes the application function DemandD_Inquiry.

9 No preConditionQualifier is specified. For workflow navigation, this function will be unconditionally included in the list of allowed functions for this workflow state.

10 No postConditionQualifer is specified for this workflow row. If triggered, the state transition specified in this row will be unconditionally applied to the folder.

11 If the state transition is performed for this row, the stage of the folder will NOT be changed (since this field is null).

12 If the state transition is performed for this row, the party state for the Demander's task party record will NOT be changed (since this field is null).

13 If the state transition is performed for this row, the actionParty for this task will be changed. Since the value specified in this row is "?", the application function will have passed the actionPartyType to the calling subsystem. This value will have been passed on the EvaluateWorkflow( ) method. This value will be used to set the actionParty for this task. If no value is provided by the calling subsystem, a workflow error will be returned.

14 No new parties will be added to this task.

Workflow State Transition Processing only for Counter Offer Approval (Row 856)

This workflow row is only used to control the workflow state transition when a counter offer is approved by the demanding party. Since the ability to perform this function is based on the party state of the responding party, the workflow navigation for this function is defined within the responding party's task party section (described later in row 936).

Line(s) Description 1,2 This row applies to the Demand folder (SAFolder_Subro) and Demand task.

3 This row applies to the Negotiation stage.

4 Within the Demand task, this row applies to the Demander (D) task party.

5 Within the Demand task, within the Demander's task party record, this row applies to the party state "Demand Issued".

8 This workflow row is ONLY used for workflow state transition processing.

6,7 Within the workflow state specified in this row, any state transition processing will be triggered when the Demander (partyType D) executes the application function DemandD_Approve.

9 Not applicable (since the operation code is S).

10 No postConditionQualifer is specified for this workflow row. If triggered, the state transition specified in this row will be unconditionally applied to the folder.

11 If the state transition is performed for this row, the stage of the folder will NOT be changed (since this field is null).

12 If the state transition is performed for this row, the party state for the Demander's task party record will be changed to "Counter Offer Approved".

13 If the state transition is performed for this row, the actionParty for this task will be set to the Responder (R) (i.e., the responding party will be responsible for taking the next action on this task within this transactional folder).

14 No new parties will be added to this task.

Workflow Navigation Based on yhe Party State of Another Party (Row 936)

This workflow row is used to control the workflow navigation to ensure that a Demander can only approve a counter offer based on the party state of the responding party. Additionally, when if the demanding party performs this function, this row is also used to update the party state for the responding party.

Line(s) Description 1,2 This row applies to the Demand folder (SAFolder_Subro) and Demand task.

3 This row applies to the Negotiation stage.

4 Within the Demand task, this row applies to the Responder (R) task party.

5 Within the Demand task, within the Responder's task party record, this row applies to the party state "Counter Offer Issued".

8 This workflow row is used for BOTH workflow navigation and state transition processing.

6,7 Within the workflow state specified in this row, any state transition processing will be triggered when the Demander (partyType D) executes the application function DemandD_Approve.

9 No preConditionQualifier is specified. For workflow navigation, this function will be unconditionally included in the list of allowed functions for this workflow state.

10 No postConditionQualifer is specified for this workflow row. If triggered, the state transition specified in this row will be unconditionally applied to the folder.

11 If the state transition is performed for this row, the stage of the folder will NOT be changed (since this field is null).

12 If the state transition is performed for this row, the party state for the Responder's task party record will be changed to "Pending Response".

13 If the state transition is performed for this row, the actionParty for this task will be set to the Responder (R) (i.e., the responding party will be responsible for taking the next action on this task within this transactional folder).

14 No new parties will be added to this task.

Adding Parties to a New Task (Row 51)

When the demanding party performs the function DemandD_Arbitrate (indicating that they are pursuing arbitration for this demand), the workflow subsystem will create a new task for this folder—the Arbitration task (as indicated on the Function record for this application function). The workflow table contains distinct rows to manage the workflow state defined by each task within a folder. This workflow row is only used to control the workflow state transition for the newly created Arbitration task.

Line(s) Description 1,2 This row applies to the Demand folder (SAFolder_Subro) and Arbitration task.

3 This row applies to the Issued stage.

4 Within the Demand task, this row applies to the Demander's (D) task party.

5 Within the Demand task, within the Responder's task party record, this row applies to the party state "Init".

8 This workflow row is ONLY used for workflow state transition processing.

6,7 Within the workflow state specified in this row, any state transition processing Line(s) Description will be triggered when the Demander (partyType D) executes the application function DemandD_Arbitrate.

9 Not applicable (since the operation code is S).

10 No postConditionQualifer is specified for this workflow row. If triggered, the state transition specified in this row will be unconditionally applied to the folder.

11 If the state transition is performed for this row, the stage of the folder will be changed to "Arbitration".

12 If the state transition is performed for this row, the party state for the Demander's task party record (within the Arbitration task) will be changed to "Preparing For Arbitration".
13 If the state transition is performed for this row, the actionParty for this task will be set to the Demander (D) (i.e., the demanding party will be responsible for taking the next action on this task within this transactional folder).
14 Since this task is being newly created, no parties have been assigned. If the state transition is performed for this row, the Demander (D) and the Responder (R) will be assigned to this task.

Diagrams—Inter-Organizational Workflow Management

The following diagrams illustrate a number of features of the Inter-Organizational low Management subsystem described above.

Diagram 3—Workflow Data Model Schema—Workflow Table (SAWorkflow)

Diagram 4—Workflow Table Example—Insurance Subrogation

Diagram 3—Workflow Data Model Schema—Workflow Table (SAWorkflow)

This data model schema represents the entity used to control the community workflow that is defined for any given application. Whenever an "editing" function is performed on a folder, the workflow management methods use this table to control the stage, state, and actionParty fields within SATask and SATaskParty entities within that folder.

This table is used for two workflow purposes:

1) To determine the next workflow steps that are allowed, based on a given workflow condition (stage, partyType, state, substate, etc.).

2) To determine the next workflow state of the folder after performing a given function, based on the current workflow state of the folder.

The workflow records within this table are organized into the following hierarchy/groups:

```
folderType
  taskType
    stage
      taskPartyType
        partyState
```

Attributes

| Name | Data Type | Len | Dec Dgts | Nulls | Req | Description |
|---|---|---|---|---|---|---|
| actionPartyType | String | 1 | | N | R | The party type of the party performing the function. |
| folderType | String | 64 | | N | R | The type of folder. This field contains the entity name of the folder to which this workflow record applies (e.g., SASubroFolder, SADemandUploadFolder, etc.). |
| intrinsicFunctionId | String | 255 | | N | R | The Id of the intrinsicFunction (as specified in SAIntrinsicFunction) associated with the function being performed. |
| nextActionParty | String | 1 | | Y | O | Specifies the party type that is responsible for taking the next action for this task. If specified, this field can contain a valid party type code (e.g., D, R, or A), or a "?". The "?" value is a special value that indicates to the Workflow Manager that the nextActionParty will be determined dynamically by application function at execution. In doing so, the TPL must provide an API call that allows the application function to set the "nextActionParty" for a given task (during the Validate call). Since multiple tasks may exist, the application function may have to specify the action party for each task (if each task specifies a "?"). When the TPL calls the Workflow Manager to evaluate the workflow for a folder, it should pass the values for the action party that were set by the application function for each task. |
| nextPartyState | String | 64 | | Y | O | The next party specific state (within the specific SATaskParty entity) for this workflow entry. If this field is null, the current party specific state (for this party) is not affected. |
| nextStage | String | 64 | | Y | O | The next stage to be set (within the Folder entity) for this workflow entry. If this field is null, the current stage is not affected. |
| nextStateEventPathToRoot | String | 255 | | Y | O | If a "next state event" is to be generated (as indicated by a nextStateEventTemplateId), then this field is used to specify the key path to the root object for this event. The root object for this key path will be the folder whose workflow state is currently being processed. NOTE: If the root object for the event is the same as the root object for this workflow entry (i.e., the folder, then this field is null). |
| nextStateEventTemplateId | String | 255 | | Y | O | If a "next state event" is to be generated, this field is used to specify the event template Id for that event. |
| operationCode | String | 1 | | N | R | The workflow operation for this row as follows: S—State Change—indicates this row is only used to evaluate the next state of the folder after an editing function has been performed. N—Navigation—indicates that this row is only used to determine the valid set of editing functions that are allowed based on the current state of the folder. B—Both—indicates that this row is used for both State Change and Navigation operations. |

-continued

| | | | | | |
|---|---|---|---|---|---|
| partyState | String | 64 | N | R | Workflow state (party type specific). |
| postConditionQualifier | String | 4000 | Y | O | This qualifier is used to support "conditional" workflow. In this case, two or more rows within the table for the current workflow state will specify this qualifier. The system will evaluate the qualifier for each row and set the next work flow state based on the row whose qualifier that evaluates to "true".<br>NOTE: When this field is used, the qualifiers specified for a given set of rows must be MUTUALLY EXCLUSIVE in that only one and only one qualifier should evaluate to true at any given time.<br>If this field is null, then it is assumed that the next workflow state specified for this workflow entry can be unconditionally performed. |
| preConditionQualifier | String | 4000 | Y | O | A qualifier used to conditionally determine whether or not the function specified for this workflow entry can be performed.<br>If this field is null, then it is assumed that the function specified for this workflow entry can be unconditionally performed.<br>If this field is not null, then the system will evaluate the qualifier. If the qualifier evaluates to "True" then the function specified for this workflow entry is allowed, otherwise it is disallowed. |
| stage | String | 64 | N | R | Workflow stage. |
| status | String | 255 | Y | O | This field is used to set the status of the task for the specific party (SATaskParty).<br>The Workflow Manager will set the status for the appropriate party based on the value in this field as follows:<br>Null - the action party's state will be used as the status.<br>Non-null - the value of this field will be used as the status.<br>Non-null and first character is "&" - the value of this field will be appended to the current status and the "&" will be replaced with a ",". |
| stkeyNextStateEventTemplate | | | | | Relationship field (see Relationships below). |
| taskPartyArray | String | 16 | Y | O | Specifies the party types that should be given access to the task represented by this workflow entry. The syntax of this field is a Stringing of one or more party type codes where each distinct party type is represented by a single character (i.e., the party type code).<br>The following should be noted:<br>This field is additive in that it only specifies parties that can be added to a task.<br>If a given party specified within this field has already been given access to this task, then no additional action is taken.<br>If a party of the type specified in this field does not exist on the folder, then no action is taken.<br>If a party is to be given access to this task, the system will create an SATaskParty to link the party to the task.<br>For subrogation, the following party type codes are defined: D, R, and A. |
| taskPartyType | String | 1 | N | R | The party type of the party whose state variable (contained in SATaskParty) is being affected. |
| taskType | String | 32 | N | R | The type of task.<br>The valid task types for subrogation are:<br>Demand<br>Arbitration<br>Litigation |
| workflowBarRootClass | String | 64 | Y | O | Used for navigation control, if specified this field indicates that a button (for this function) should be displayed in the workflow bar (action bar) for any form whose root object class matches the class specified in this workflow entry. |

| Name | Rel Type | Relationship Fields (source/destination) | Req. | Description |
|---|---|---|---|---|
| toNextStateEventTemplate | 1-1 | SAEventTemplate | O | If specified, the SAEventTemplate that is to be used to create an application specific "event" representing the state change that is taking place. This field is typically used to create an event that will trigger a background function. For unconditional workflow entries, this can typically be performed using the "completion event" that is defined on the SAIntrinsicFunction. For conditional workflow (where a background function needs to be triggered conditionally), this relationship should be specified.<br>NOTE: The Workflow Manager will always create a "generic" event that records the workflow state of the folder both prior to, and after, the workflow is evaluated. This event is a "detail" event and can be used for debugging workflow problems (not for triggering background functions). |

Diagram 4—Workflow Table Example—Insurance Subrogation

The following is a small subset of rows from a Workflow Table used within the Siteras Insurance Subrogation application.

RowNumber - 344

| | | |
|---|---|---|
| 1. | FolderType: | SAFolder_Subro |
| 2. | TaskType: | Demand |
| 3. | Stage: | Init |
| 4. | TaskPartyType: | Demander(D) |
| 5. | PartyState: | Init |
| 6. | ActionParty: | D |
| 7. | Function: | DemandD_CreateElectronic |
| 8. | OperationCode: | B |
| 9. | PreConditionQualifier: | |
| 10. | PostConditionQualifier: | DataComplete |
| 11. | NextStage: | Preparation |
| 12. | NextPartyState: | Pending Issuance |
| 13. | NextActionParty: | D |
| 14. | TaskPartyArray: | D |

RowNumber - 805

| | | |
|---|---|---|
| 1. | FolderType: | SAFolder_Subro |
| 2. | TaskType: | Demand |
| 3. | Stage: | Negotiation |
| 4. | TaskPartyType: | Demander(D) |
| 5. | PartyState: | Counter Offer Approved |
| 6. | ActionParty: | D |
| 7. | Function: | DemandD_Arbitrate |
| 8. | OperationCode: | N |
| 9. | PreConditionQualifier: | ResponderIsArbitrationMember |
| 10. | PostConditionQualifier: | |
| 11. | NextStage: | |
| 12. | NextPartyState: | |
| 13. | NextActionParty: | |
| 14. | TaskPartyArray: | |

RowNumber - 808

| | | |
|---|---|---|
| 1. | FolderType: | SAFolder_Subro |
| 2. | TaskType: | Demand |
| 3. | Stage: | Negotiation |
| 4. | TaskPartyType: | Demander(D) |
| 5. | PartyState: | Counter Offer Approved |
| 6. | ActionParty: | D |
| 7. | Function: | DemandD_Inquiry |
| 8. | OperationCode: | B |
| 9. | PreConditionQualifier: | |
| 10. | PostConditionQualifier: | |
| 11. | NextStage: | |
| 12. | NextPartyState: | |
| 13. | NextActionParty: | ? |
| 14. | TaskPartyArray: | |

RowNumber - 856

| | | |
|---|---|---|
| 1. | FolderType: | SAFolder_Subro |
| 2. | TaskType: | Demand |
| 3. | Stage: | Negotiation |
| 4. | TaskPartyType: | Demander(D) |
| 5. | PartyState: | Demand Issued |
| 6. | ActionParty: | D |
| 7. | Function: | DemandD_Approve |
| 8. | OperationCode: | S |
| 9. | PreConditionQualifier: | |
| 10. | PostConditionQualifier: | |
| 11. | NextStage: | |
| 12. | NextPartyState: | Counter Offer Approved |
| 13. | NextActionParty: | R |
| 14. | TaskPartyArray: | |

RowNumber - 936

| | | |
|---|---|---|
| 1. | FolderType: | SAFolder_Subro |
| 2. | TaskType: | Demand |
| 3. | Stage: | Negotiation |
| 4. | TaskPartyType: | Responder(R) |
| 5. | PartyState: | Counter Offer Issued |
| 6. | ActionParty: | D |
| 7. | Function: | DemandD_Approve |
| 8. | OperationCode: | B |
| 9. | PreConditionQualifier: | |
| 10. | PostConditionQualifier: | |
| 11. | NextStage: | |
| 12. | NextPartyState: | Pending Response |
| 13. | NextActionParty: | R |
| 14. | TaskPartyArray: | |

RowNumber - 51

| | | |
|---|---|---|
| 1. | FolderType: | SAFolder_Subro |
| 2. | TaskType: | Arbitration |
| 3. | Stage: | Issued |
| 4. | TaskPartyType: | Demander(D) |
| 5. | PartyState: | Init |
| 6. | ActionParty: | D |
| 7. | Function: | DemandD_Arbitrate |
| 8. | OperationCode: | S |
| 9. | PreConditionQualifier: | |
| 10. | PostConditionQualifier: | |
| 11. | NextStage: | Arbitration |
| 12. | NextPartyState: | Preparing For Arbitration |
| 13. | NextActionParty: | D |
| 14. | TaskPartyArray: | DR |

Background—Inter-Organizational Transaction Processing

During the 80's and 90's, many business transaction processing systems were focused on integrating business processes and data that existed within an organization (i.e., intra-organization). These systems cover a wide array of business applications, of varying complexity, including production forecasting/scheduling, order processing, human resources management, financial accounting, sales management, etc. Commercial examples of such systems include offerings from SAP, Oracle, and PeopleSoft. Organizations that successfully implemented such systems achieved reduced costs, higher efficiency, and were more competitive. With the intra-organization systems in place, these organizations are now looking to integrate the business processes and data that exist between trading partner organizations (i.e., inter-organizational).

In 1999 and 2000, a number of web-based "B2B Exchanges" emerged. These virtual marketplaces demonstrated the tremendous value of integrating business processes and data across different organizations. Unfortunately, this technology movement failed due to a fundamental flaw in the concept of the exchange—namely, that while these exchanges were good for buyers (due to reduced prices for goods), the same exchanges were not good for suppliers because of the downward price pressure due to increased competition. The resulting marketplace had many buyers, but no suppliers—hence, the marketplace collapsed.

Even though this initial B2B movement failed, it clearly demonstrated that substantial cost reductions and greater efficiency could be achieved with systems that automate transaction processing between trading partners (i.e., Inter-Organization Transaction Processing).

Requirements and Challenges

This section provides an overview of the requirements of an inter-organizational transaction processing system.

Central Processing Network

Unlike intra-organization transaction processing (where the transaction processing system can be implemented directly within a given organization), inter-organizational transaction processing requires that information flow through a centralized hub or network (either explicitly or logically). For any given vertical market, this central network is best implemented by a single neutral third-party organization (e.g., a clearinghouse). This facilitates broad participation within a given vertical network by eliminating any data privacy/ownership concerns that would arise if the network were run by one of the dominant organizations within that vertical market.

In addition, by connecting to the trading community through a centralized network, the numbers of connections that need to be maintained are dramatically reduced when compared to a point-to-point network. With a centralized network, each member maintains only a single connection to the network (rather than maintaining one connection per trading partner).

Insulation of Member Organizations

The value of the central network lies in its ability to insulate the member organizations from the implementation details necessary to connect to the network. Rather than creating a single common set of standards that all member organizations must adhere to, the central network facilitates membership by allowing each member organization to communicate and integrate with the network in a manner that best suits the needs and capabilities of that organization. To do so, the network must insulate all member organizations along the following dimensions.

Connectivity Insulation

The network must support a wide array of interface capabilities. This allows member organizations with varying technical capabilities to interact with the network. Some organizations will want to interface with the network using fully automated interfaces (communicating message based transaction information), while other less sophisticated organizations will want to interact manually (using a web-based interface). This facilitates broad participation in the network and provides technical interface insulation.

Data Format and Content Insulation

Building on the connectivity insulation described above, the network must support a wide array of data formats while maintaining the meaning and content of the application data within the specific vertical market. This allows members to send/receive data elements associated with each business transaction in a format that is native to their local system. To support this requirement, the network will need to perform both format and semantic translations. This reduces the integration requirements further increasing member participation.

At the heart of this capability is the definition of a "unified data model" which is specific to the vertical market. This data model provides a single target database against which all translations are performed. Simply put, incoming data is transformed from its member specific inbound format to the format prescribed by the unified data model—the same process is performed in reverse for outbound information.

Business Process Insulation

The previous requirements allow the members to 1) connect, and 2) exchange data in a consistent manner. With this capability in place, the network must provide a common framework for conducting inter-organizational transactions (inter-organizational workflow) while also insulating each member from the specific business processes and workflows that are unique to their organizations (intra-organization workflow). The common transaction framework will be specific to a given vertical market and defines a common business process that allows all members to communicate consistently about the transactions being processed by the network. For more information on this capability, refer to the related section on "Inter-Organization Workflow Management".

In addition, this insulation also ensures for the consistent processing of each transaction. Rather than just passing information from one member to another, the network must provide the application specific processing that is required by a given vertical market. At a minimum, this processing must maintain all data related to the inter-organizational transaction as defined within the unified data model for that market.

Structured and Unstructured Information

Most automated business systems deal with structured information where the structure of the information is decomposed into related sets of data elements (attributes) that are grouped into data entities. In turn, the data entities are stored within a database management system.

While structured information is necessary, many inter-organizational transactions involved related information (supporting documents) that exists in unstructured format (e.g., pictures, images, audio, video, etc.). Since most inter-organizational transactions currently occur manually via mail and fax, this related information is usually passed along with any structured information.

The network must be able to provide storage and retrieval for both structured and unstructured information. And, with respect to unstructured information, it must provide a means of allowing all member organizations to access the unstructured information without substantially increasing technology required to perform such access (i.e., without requiring proprietary access mechanisms for specific types of unstructured information).

Multi-Party Transactions and Workflow

While most B2B transactions involve a primary and a counter-party (e.g., Buyer/Supplier, Manufacturer/Customer, Claimer/Claimant, etc.), real-life workflow consists of complex conditional workflow involving multiple parties. Unlike an intra-organization transaction processing system, this multi-party access requirement permeates all aspects of the network's transaction processing capabilities and must be supported.

Each of the following transaction processing subsystems must account for multi-party access to some extent: Business Rule Evaluation and Processing; Security Organization Structure (Locations); Workflow Management; Transaction Routing Non-Member Access; Pooled Operator Access; Transaction Audit Trail Locking and Reservation (within and between members); Reporting; Document Management; and External Notification.

Data Privacy and Security

Finally, since the network will be storing information about each member's transactions, it must provide comprehensive security to ensure that a given organization can only access the transactions and related data elements that it is allowed to access.

Inter-Organization Transaction Processing System

The Inter-Organization Transaction Processing System consists of an application framework designed to meet the requirements of inter-organizational transaction processing (outlined above). This framework is not dependent on a specific vertical business process or application and is unique in its ability to deal with multi-party transactions that span distinct organizations.

This framework operates within an overall system architecture consisting of a number of servers working in an integrated manner. This is depicted in FIG. 26, System Architecture.

The software system that represents this application framework resides within the application server. This system consists of four major areas—Interface Subsystems, Transaction Processing Layer (TPL), System Services, and Application Logic. This structure is depicted in FIG. 27, Application Framework Architecture. Each of these areas is described in more detail below.

Interface Subsystems

Transaction requests can originate from many different sources—e.g., manually via a web-based interface, electronically via a message-based interface, internally as a result of native processing, etc. The purpose of the interface subsystem is to support the unique interface requirements of any given source of transaction origination. As new/unique forms of transaction origination evolve (e.g., wireless networks), the system can quickly support new transactions through the creation of new interface subsystems.

The end result of each subsystem is the same, namely convert the transaction request into an internal object format (an Object Graph) and invoke the services of the TPL to process the transaction request. This centralized transaction processing structure provides the following major benefits. All transaction requests flow through a single common point within the system. Security validation is performed for all transaction requests at a single point (i.e., there is no way to execute a transaction within the system that bypasses security validation). All transaction processing is performed in a consistent manner. A set of common transaction processing services are performed by the TPL (thereby eliminating the need for these to be coded explicitly within the application logic for each transaction).

The following sections describe the interface subsystems that are provided to support the common methods of transaction origination.

Online Subsystem (OLS)

The Online Subsystem is used to support transactions that originate manually via a web-based, HTML-oriented interface. This subsystem can provide supports both a standard server-based web interface or the JView™ subsystem web interface.

Event Subsystem

The Event Subsystem is used to support transactions that originate as a result of internal processing by application transaction logic. These transaction requests are processed in the background. For more information, refer to the "Event Management" section.

Mail Subsystem

The Mail Subsystem is used to support transactions that originate as a result of the receipt of an incoming e-mail message. This subsystem validates that the incoming e-mail message contains a valid security descriptor, and will then create an event that triggers the transaction request to process the data associated with the incoming e-mail message.

Batch Subsystem

The Batch Subsystem is used to support transactions that originate as a result of a pre-defined schedule. This batch schedule is used to define "point in time" transaction requests. For example, this subsystem would be used to trigger a processing request that is to prepare a specific report each night.

Message Translation Subsystem

The Message Translation subsystem is designed to communicate with other external system using automated electronic interfaces. This subsystem can handle both incoming and outgoing electronic messages. Incoming messages result in transaction requests that are processed by the TPL. Outgoing messages are generated in response to a specific event processed by the Event Manager. In general, this subsystem supports asynchronous messages (rather than synchronous messages).

Transaction Processing Layer

The Transaction Processing Layer is responsible for processing all transaction requests. For each transaction request, this layer will utilize the system services to perform the following: perform transaction security validation; lock the folder (if necessary); perform input data validation (editing functions only); retrieve objects from database; invoke application data model related validation (editing functions only); invoke application transaction related validation (editing functions only); create audit trail events (editing functions only); invoke alert manager to evaluate application business rules and generate alerts (editing functions only); invoke workflow manager to evaluate and set workflow state (editing functions only); save any new or modified data to the database; and unlock the folder (if necessary). These services are described in more detail below in the section "System Services".

Application Logic

For any given vertical market the generic transaction processing capabilities of the system will be extended with the application logic and configuration that is specific to a given vertical market. These application extensions are what give the system its specific vertical market focus. As a result, the generic transaction processing system can service any number of vertical markets. The application logic consists of the following four main parts.

Unified Data Model

Mentioned previously, this is the data model that defines the entities and attributes that are specific to a given vertical market.

Application Logic—Model Related

For each application specific data entity, application logic can be defined related to validation and processing that is specific to this entity.

Application Logic—Transaction Related

For each application specific transaction, application logic can be defined related to validation and processing that is specific to this transaction.

Configuration

Many of the generic transaction processing services rely on the definition of external configuration information. This configuration is defined for any given vertical market (and allows the services of the generic transaction processing system to be customized to the specific needs of the vertical market).

System Services

The various subsystems and layers described above rely on a rich set of System Services. Some of the major services include: Locking and Reservation; Object Graph Services; Business Rule and Alert Management; Workflow Management; Security Management; Individual and Team Ownership; External Notifications; Snapshot Services; Reporting; and Document Management. These services are described in detail within the System Services Processing section below.

Prior Art—Acknowledged

This Application Framework relies on the services of the following technologies and acknowledges any prior art in these domains.

| Technology | Commercial Examples |
|---|---|
| Web Servers | IIS (Microsoft) |
| | Apache (Open Software Foundation) |
| Application Servers | .Net (Microsoft) |
| | WebLogic (BEA) |
| | WebSphere (IBM) |
| | Tomcat (Open Software Foundation) |
| | WebObjects (Apple) |
| B2B Integration Servers | WebMethods (WebMethods) |
| | BizTalk (Microsoft) |
| Database Servers | Oracle (Oracle) |
| | SQL/Sever (Microsoft) |
| Mail Servers | Exchange (Microsoft) |

This Application Framework builds on the capabilities established by these technologies and provides additional services and capabilities specifically target at inter-organizational transaction processing that are not addressed. This structure of a general web-based transaction processing system, and the role of the Application Framework within this structure, is illustrated in FIG. 28.

This framework is related closely to the above description of the JView™ Subsystem and Inter-Organization Workflow Management.

Commercial Example

The Electronic Subrogation Network is a commercial example of a fully operational system that embodies the concepts described herein specifically for the vertical market of Insurance Subrogation Claims Processing.

Terminology

This section contains terminology definitions that are useful in understanding the concepts described in this section.

Folder

Each distinct business transaction is represented by a folder. The folder is used to logically contain all information related to this transaction (e.g., parties, tasks, documents, contacts, alerts, attachments, events, etc.).

Party

A business transaction involves the interaction between two or more parties where, for the purpose of that transaction, each party takes on a specific relationship (described further below). With intra-organization workflow, parties are typically different business units (e.g., division, department, etc.) within the same organization. With inter-organizational workflow, parties are typically different organizations or individuals.

Relationship (Party Type)

For each specific type of business transaction (folder), one or more relationships are defined. Each relationship defines the role that a given party will play with respect to that transaction. For example, in a simple order management transaction (Order Folder), one party represents the "Buyer" and one party represents the "Supplier". As such, for each party defined on the folder, that party's relationship to the transaction is referred to as their party type.

Tasks

A task is used to represent an independent business activity (related to the transaction for this folder). Each folder must have at least one task (its primary task). With complex business processes, multiple tasks are used within the folder to manage and track multiple parallel activities related to a given business transaction. For example, for an order management transaction (Order Folder), one task is defined for the order itself, and additional tasks are defined for each distinct shipment/invoice.

Action Party

For each task on the folder, the party responsible for taking the next action related to that business activity is referred to as the action party. When the business transaction is concluded, no further business activity will occur. At this point, no action party will exist on any tasks within the folder.

Function

Each operation that can be performed on the folder, that affects the information or status of the folder, is referred to as a function. Based on the folder, certain functions can only be performed by a specific party type, while others can be performed by some or all party types. In a simple order management transaction some examples of functions include: issuing a purchase order (buyer), accepting an initial order (supplier), creating a shipment/invoice (supplier), etc.

Two main types of functions exist—editing functions and non-editing functions. Editing functions result in the modification of business data within the database; non-editing functions do not (i.e., essentially non-editing functions are only used to retrieve data).

Function definitions are contained within the system configuration tables. Each Function definition contains settings that control the processing of the transaction requests (e.g., editing type, party type, object graph specification, etc.). The collection of Function definitions within the system are specific to a given vertical market and essentially define the business processing capabilities of the system.

Organization

Two distinct legal entities (e.g., companies) as opposed to different business units (of arbitrary size) within a single legal entity.

Workflow

A defined set of business operations and/or processes, triggered by an initial business event (business transaction), that proceed in a specific sequence or order, and culminating in a conclusion or completion of the transaction. A simple workflow will follow a prescribed set of operations in sequence to conclusion (single path). A complex workflow will contain multiple conditional paths, only one of which will be taken based on the business conditions present in the transaction.

Inter-Organization Workflow

A workflow that exists between two organizations for the purpose of conducting/completing a business process/transaction specific to those organizations.

Object Graph Specification (OGS)

A set of configuration data that defines the set of data entities and attributes, and their object structure, used for a given transaction request (i.e., function). The TPL uses the OGS to ensure that a given party only can send or receive data elements allowed for their party type. Additionally, this mechanism can also be used to further constrain data access based on a specific user role (within a party type).

Role

A set of configuration data that defines a group of functions. The resulting set of functions can then be associated with an operator or automated system. The Security Management services will use the role definition to limit the functions that can be performed by a given operator or system.

Detailed Description—Inter-Organizational Transaction Processing

The Inter-Organization Transaction Processing System (henceforth referred to as the Application Framework or just A/F) consists of an application framework designed to meet the requirements of inter-organizational transaction processing (outlined above). This framework is not dependent on a specific vertical business process or application and is unique in its ability to deal with multi-party transactions that span distinct organizations.

This section contains detailed process and component descriptions related to the A/F. This discussion presumes familiarity with the following concepts and technologies:

general business-oriented transaction processing concepts
object-oriented design and programming
basic internet fundamentals The A/F described in this section has been validated against the following vertical business application contexts:

Insurance—Subrogation claims (Demands, Responses, Arbitration Filings, etc.);
Manufacturing—Order Processing (Purchase Orders, Shipping, Invoicing, Returns, etc.);
Retail—Store Management (Labor Scheduling, Employee Maintenance, Timecard Tracking, etc.); and General—Call Logging and Problem Management.
Overview
Core Object Model and Structures The A/F includes a core object model that provides a set of foundational classes and data entities used for constructing applications. The core objects within this model are typically used in most applications. Additional objects, specific to the A/F, allow the system to perform its control operations within the context of inter-organizational transaction processing. When constructing an application, these objects can be used as is, or subclassed to support application specific extensions.

The objects within the core object model can be grouped into three major categories—transactional objects, configuration objects, and system objects. The transactional objects represent the application or transaction control structures within the business transactions being processed by the system. The configuration objects represent the configuration structures, used by the A/F at runtime, that define the specific processing characteristics of each vertical application. The system objects represent internal system structures that are used to control the internal operation of the system.

Transactional Objects

| Class/Entity Name | Summary |
| --- | --- |
| SAFolder | Abstract. The generic container for all data related to a given transaction. |
| SAFolderData | Abstract. This class is used to support application specific extensions to a folder. |
| SAParty | The organization or individual involved in a given transaction. |
| SADocument | Abstract. A set of structured data elements related to a transaction. |
| SAAttachment | Abstract. A set of structured meta-data related about a set of unstructured data (see SAAttachmentData). |
| SAAttachmentData | A set of unstructured data related to a transaction (e.g., graphics, photos, etc.). |
| SAComment | A free-form comment related to a document within a transaction. |
| SAContact | A set of name and/or address information related to a contact within a transaction. |
| SADocContact | A relational object that connects a document with a contact. |
| SAAlert | A business condition that exists within a given transaction. |
| SAEvent | Audit information that provides a record of every modification to the folder contents. |
| SASnapshot | A blob of information that contains a complete set of folder information at a given point in time (i.e., a snapshot). This object is used to maintain a historical record of all data modifications to the folder. |
| SATask | A business activity that is occurring within the folder. |

Configuration Objects

| Class/Entity Name | Summary |
| --- | --- |
| SAFunction | An application function (transaction) that is supported by the system (external). |
| SAIntrinsicFunction | An application function (transaction) that is supported by the system (internal). |
| SAIntrinsic | A primitive (intrinsic) transaction processing function supported within the application software classes. |
| SACompany | An organization or individual that can participate in transactions within the vertical application. |
| SAGroup | Within a Company, a group or team of individuals at a Location. |
| SALocation | Within a Company, a physical office or location. |
| SAOperator | Within a Company, a person (or account) that can access the system. |
| SARole | Within a Company, a group of related application functions that are needed to perform a specific job or role within a Company. |
| SARoleFunction | Relates a specific Function to a specific Role. |
| SAAlertRuleTemplate | A template that defines a generic type of business rule that can be evaluated by the system |
| SAAlertRule | A business rule used to evaluate a specific business condition for a specific company. |
| SADocContactTemplate | A template that defines a generic type of document contact. |
| SADomain | A set of application specific values that define an application domain. |
| SAEventTemplate | A template that defines the processing characteristics for an Event. |
| SAMessageTemplate | A template that defines the processing characteristics for a Message. |
| SANotificationRule | A system rule that defines the processing characteristics used for generating an external notification based on the occurrence of an event. |
| SAObjectGraphSpec | In a transaction template the constrains, the data entities, and attributes that can be exchanged/processed within a given transaction. |
| SAWorkflow | A template used by the Workflow Manager to control the workflow of a transactional folder. |
| SAWorkflowRule | A company specific workflow rule used by the Workflow Manager to perform intra-company workflow. |
| SAWorkflowRuleTemplate | A template that defines a generic company specific workflow function that can be performed by the Workflow Manager. |

System Objects

| Class/Entity Name | Summary |
| --- | --- |
| SAKey | A control record used to assign unique object identifiers to new objects. |
| SALock | A control record used to control locking/reservation and lock expiration for a specific folder. |
| SAServerConfiguration | A control record used to track any background process instances that are running. |
| SASystemAlert | A set of related System Events. A system event records the occurrence of a software warning, error, or failure within the system. |
| SASystemStatistics | A record of response time or system availability data. |
| SAText | A generic object used to hold large amounts of textual data. |

Folders and Documents

Within the A/F, the folder is a key concept. An instance of a folder object exists for each distinct application transaction within the system. Different types of transactions are supported by different types of folders. A generic folder class (SAFolder) is provided by the application framework. This abstract class contains all the data elements and methods used by the framework to generically manage the transaction. Specific application folders are created by subclassing from this root class. In this way, any number of application specific folders can be created (one for each type of application transaction).

The folder is a logical container for the following collections of data related to the transaction:
  Parties—where a party is an organization or individual involved in the transaction;
  Documents—where a document is a set of structured data;
  Attachments—where an attachment is a set of unstructured data;
  Events—where an event is an audit record of any data modification to the transaction;
  Alerts—where an alert is a business condition that exists within the transaction;
  Contacts—where a contact is name and/or address information related to an individual or organization related to this document; and
  Tasks—where a task is a business activity that is occurring within the transaction;

For each folder, the A/F can provide a number of common services. The services that are supported by each folder are declared in the application specific subclass that defines the specific folder. The following folder services are generically supported by the A/F: Multi-Party Support, Workflow Support, Locking and Reservation, Alert Management, Event Management, External Notifications, Document Management (for both structured and unstructured documents), and Contact Management.

In addition to the folder, a document is another key concept within the A/F. Within a folder, a related set of business information is represented by a document (e.g., within a manufacturing context, an Order folder will contain the following documents—a Purchase Order, Shipping Notices, Invoices, and Credit Notices). A generic document class (SA-Document) is provided by the application framework. This abstract class contains all the data elements and methods used by the framework to generically manage a given document within a transaction. Specific application documents are created by subclassing from this root class. In this way, any number of application specific documents can be created.

The document is also a logical container for the following collections of data related to the document: DocContacts—where a doccontact connects this document with a specific contact within the folder, and Comments—where a comment is a free-form note related to this document.

Application Framework Architecture

The application framework is consists of a layered architecture (as depicted in FIG. 27). This architecture consists of the following layers: Interface Subsystem Layer, Transaction Processing Layer (TPL), Application Logic Layer, and System Services. The processing with each of these layers is distinct as describe below.

Interface Subsystem Processing

Within the A/F the Interface System layer is responsible for exchanging transaction requests and responses with the external environment (e.g., interactive users, other automated systems, electronic messaging networks, etc.). In doing so, it essentially performs a session control function within the architecture (i.e., managing a transaction processing session with each distinct external environment).

This layer consists of the following discrete subsystems: Online Subsystem (OLS), Event Subsystem, Mail Subsystem, and Message Translation Subsystem.

Online Subsystem

The Online Subsystem processes all requests/response from web-based interactive users. The OLS is designed to work with the JView™ subsystem (within the browser) but can also support standard server-based HTML generation via the HTTP subsystem. In either case, the Transaction Message (STM) is used as the request/response format for the OLS.

The OLS consists of one or more process instances (running on one or more Application Servers). Each process instance is capable of handling HTTP requests. When a given process instance creates a session for a given user, all requests for that session will be processed by that process instance. The following describes the major processing performed within this subsystem.

Establishing an OLS Session (Logon Processing)

Before any transactions can be processed, a user must first establish a session with the OLS. An initial logon request is sent to the system. The OLS will respond with a Logon form (HTML). The user will enter their companyId, userId, and password and submit this logon request to the system. If IP Subnet security is indicated, based on the companyId and the IP address of the incoming request, the system will validate the IP subnet for this request. If the IP subnet is valid, the system will validate the userId and password for this specific user within the specific Company. If the user is valid, an OLS session will be created. This session is used to maintain context about the current state of the user's interactions with the system. By default, a subsession is always created when a new session is created. The subsession represents a communication channel for performing a single transaction request at a time (multiple transaction requests can be performed in parallel using multiple subsessions).

After creating the session, the OLS will create an instance of the Transaction Manager (SCTranMgr). This object is used to globally control all transaction processing that occurs within the session. It is one of two major objects that represent the TPL. Within the subsession, a stack is created. The stack is used to keep track of related transaction requests that have occurred in a nested fashion. The operation of the stack is described later. Based on the user's profile, an initial (default) transaction is performed by creating a stack entry and invoking the Transaction Processing Layer (TPL). This process is described in more detail later. The results of this initial transaction are then sent back to the user in response to their logon request.

Processing a Transaction Request

Once an OLS session is established, transaction requests/responses can be processed. A transaction request is received by the OLS as a standard HTTP request (GET or POST). Within this HTTP request, a FORM or QUERY variable will contain the transaction request message in the form of a Transaction Message (STM). Like XML, the STM represents a flattened object stream (i.e., serial stream) that consists of a hierarchical structure of key:value pairs (where each node in the hierarchy represents an object). The STM consists of two major sections—the STM Header and Business Objects. The OLS converts the STM into object format using a generic object class (SCObjectGraph—referred to as the OG). If IP Subnet security is indicated, based on the companyId and the IP address of the incoming request, the system will validate the IP subnet for this request.

Once in object format, the OLS inspects the transaction request attributes contained in the Header. Transaction requests can either be OLS commands or application function requests. OLS commands are used to perform session and stack control operations for the current session. Application function requests are used to execute application functions. Within the request header, the chainType is used to control the stack within the session. For function requests, this chain type is either CHAIN_TOP (i.e., remove all stack entries and create a new initial stack entry) or CHAIN_NEXT (i.e., create a new stack entry on the stack). Based on the chainType, a new stack entry will be created. This data structure is used to anchor other objects related to this transaction request.

Based on the function (transaction request code) contained in the header, a transaction object (SCTran) is created by invoking the CreateTransaction( ) method of the TranMgr (created in the session). The function name is passed as a parameter to this request and is validated by the TranMgr (this validation process is described later). The instance of this object is anchored in the stack entry for this request. In creating the transaction object, an instance of an application specific transaction will be created. Each application transaction class is subclassed from SCTran. Each function is related to a specific application transaction class. As such, when a CreateTransaction( ) method is invoked, it will create the instance of the application specific transaction class based on the function passed in the method.

After creating the SCTran object, the OLS will set various attributes within this object that control the processing of this request (e.g., OG, query parms, transactionParms, etc.). The TPL processes two major types of functions (transactions)—editing and non-editing. Non-editing functions are read-only (i.e., inquiry) functions that merely return information. Editing functions result in the modification of data within the database. The execution of a given request is determined by the following subfunctions (passed to the TPL by the OLS)—prepare, validate, and commit. Non-editing functions only support the "prepare" subfunction. Editing functions support all three subfunctions. Within the stack, the OLS maintains the execution status of any given function (mostly for editing functions). A Finite State Machine is used to control the valid transitions of which subfunctions can be requested at any given time within the execution of a request.

For non-editing functions, the following will occur. The function will be executed by invoking the Execute( ) method of the transaction object specifying the "prepare" subfunction. Based on the prepare subfunction, the TPL will invoke the prepare( ) method of the application transaction object to process this request (i.e., retrieve the objects for this request). The TPL will return an output OG that contains the objects that have been retrieved for this request. The OLS will convert this OG into an STM. Using this STM, the OLS will generate an HTTP response to the initial HTTP request.

For editing functions, the following will occur (the complete processing of an editing function typically involves multiple interactions with a user). The function will be initially executed by invoking the Execute( ) method of the transaction object specifying the "prepare" subfunction. Based on the prepare subfunction, the TPL will invoke the prepare( ) method of the application transaction object to process this request. If this function requires user input, this method will initialize any business objects required for this transaction and the TPL will return an output OG that contains these initial objects for this request. If this function does not require user input, the processing will continue with step 8.g. The OLS will convert this OG into an STM. Using this STM, the OLS will generate an HTTP response to the initial HTTP request. Based on the response from the system, the user can make any modifications to the data (as allowed by the form), and submit this modified data to the server.

The OLS will receive this new request. Based on the chainType (CHAIN_CONTINUE) and the state information within the existing stack entry, it will continue the processing of this editing function. The processing of this function now continues by invoking the Execute( ) method of the transaction object specifying the "validate" subfunction. Based on the validate subfunction, the TPL will now invoke the validate( ) method of the application transaction object to process this request. This method will perform application specific data validation and processing related to the request. Upon completion of this processing, all the business objects will update in memory (and not yet written to the database). The TPL will return an output OG that contains the updated business objects.

If the validation is unsuccessful (i.e., errors were detected), the OLS will discard the new OG and return the previously received input OG (received in step 8.e) back to the user with the associated errors. At this point, the user will be allowed to make any data modifications/corrections (as allowed by the form). At this point, the processing will revert back to step 8.d. If the validation is successful (i.e., no errors), the OLS will convert this OG into an STM. Using this STM, the OLS will generate an HTTP response to the initial HTTP request. This response will allow the user to view, but not modify, any data and allow for the confirmation of this transaction. Based on the response from the system, the user can view the proposed transaction and submit their confirmation.

The OLS will receive this new request. Based on the chainType (CHAIN_CONTINUE) and the state information within the existing stack entry, it will continue the processing of this editing function. The processing of this function now continues by invoking the Execute( ) method of the transaction object specifying the "commit" subfunction. Based on the commit subfunction, the TPL will now commit any updated business objects to the database. In doing so a completion message will be generated. The TPL will return an output OG that contains the updated business objects. If the commit is successful, the OLS will save the completion message for the transaction. It will then discard the current stack entry (for the editing function that was just processed) and re-execute the function associated with the prior stack entry. The TPL will process this function and return an output OG that contains the business objects for this function. The OLS will convert this OG, along with the completion message from the prior editing function, into an STM. Using this STM, the OLS will generate an HTTP response to the initial HTTP request.

NOTE: For each application function request processed, and prior to generating any HTTP response, the OLS will invoke the TransactionStatistics( ) method of the TranManager. In calling this method, the OLS will pass the transaction statistics data for the previous application function (whose response time data was returned in the request header for the current request). This method causes the TranManager to update an in-memory statistics object (for the current session) with the new transaction data. This information will be updated within the database when the session is terminated.

Establishing a New Subsession Within a Session

Once an initial session is established (along with the default subsession), another subsession can be created for the purpose of executing another application function without disrupting the stack or application functions that exist within any other existing subsessions.

A transaction request (STM) is received by the OLS and is converted into object format. Within the header, the transaction request will be for an OLS command (OLS_NewSubsession). The OLS will verify the current session Id and a security code within the request header. If valid, a new subsession object will be created and added to the list of subsessions for the current session. Within the new subsession, a stack is created. Based on the user's profile, an initial (default) transaction is performed by creating a stack entry and invoking the Transaction Processing Layer (TPL) (as described above).

The results of this initial transaction are then sent back to the user in response to their logon request.

NOTE: Within the browser, each new subsession is represented by a new browser window.

Terminating an OLS Session (Logoff Processing)

Within the OLS, a session is terminated the last subsession is terminated. Subsessions can be terminated explicitly with a "logoff" request, or implicitly after a "timeout".

For Logoff requests, the following sequence will occur. A transaction request (STM) is received by the OLS and is converted into object format. Within the header, the transaction request will be for an OLS command (OLS_Logoff). Based on the subsession for this request, the OLS will: delete the stack for the subsession being terminated (individually deleting each stack entry within the stack); and delete the subsession object and remove it from the list of active subsessions for this session.

If no more active subsessions exist for this session, the OLS will:
Invoke the Logoff( ) method of the TranManager object associated within this session (created at session initiation). This method causes the TranManager to record any response time and session statistics, collected during this session, within the database. Delete the session object (thereby invalidating any further requests for this session). A "Logoff Successful" message will be sent back to the user in response to their logoff request.

For Timeouts, the following sequence will occur. When the timeout period for a given subsession expires, the Timeout( ) method of the session object will be invoked (specifying the Id of the relevant subsession). Based on the subsession, the OLS will: delete the stack for the subsession being terminated (individually deleting each stack entry within the stack); and delete the subsession object and remove it from the list of active subsessions for this session. If no more active subsessions exist for this session, the OLS will: invoke the Logoff( ) method of the TranManager object associated within this session (created at session initiation). This method causes the TranManager to record any response time and session statistics, collected during this session, within the database; and delete the session object (thereby invalidating any further requests for this session).

Event Subsystem

As each transaction request is processed by the system, events are written to the Event table within the database. The collection of events for a given folder forms the history of business activity for that folder. The Event Subsystem inspects every event that occurs within the system and allows for system or application specific post-processing occurring for each event.

Every event recorded in the system is subsequently processed by the Event Manager. For each event, this subsystem will perform the following. Determine whether any post processing is defined for this event, and if so, trigger the specific function to perform this processing. (NOTE: This processing occurs in the background.) Determine whether any external notifications are defined for this event, and if so, invoke the External Notification Manager to process the external notifications. For more information, refer to the section on "External Notifications". Determine whether any outgoing electronic messages are defined for this event, and if so, invoke the Outbound Message Translation Manager to generate the electronic messages. For more information, refer to the section on "Message Translation".

For each event, an Event Template definition is contained in the system configuration. This definition contains settings that control the processing of this event by the Event Manager. From a multi-party perspective, each event contains information that defines the party types that are allowed to access this event. This allows the system to expose and hide various events to specific parties within the folder based on the type of event.

Essentially, the Event Management services provide for a system maintained audit trail of all data modifications that occur within the system. By centralizing this service, every data modification that occurs within the system can be inspected, and if necessary, additional processing can be invoked. A unique aspect of this service is its multi-party handling capabilities.

The Event Subsystem consists of two major components—the SAEvent object (and related methods) and the Event Manager. An application transaction creates an event using the CreateEvent( ) class method of the SAEvent class. The Event Manager consists of one or more background processes (running on one or more Application Servers) that retrieve any unprocessed events from the Event table and process each event accordingly. When an event is created, the Create Event( ) method will use the event template (for this event) to determine whether or not any post-processing should occur for this event. If not, the "processed" attribute is set to true. This optimization prevents the Event Manager process from retrieving this event from the database (i.e.,—only to find that it doesn't need any processing). The following describes the major processing performed within this subsystem.

Event Manager—Initialization

Each Event Manager process performs the following initialization sequence. Read all configuration settings (e.g., number of seconds to sleep when no work to perform, etc.). Create an instance of the Transaction Manager object (SC-TranManager). This object is used to coordinate the processing of any application functions that are triggered by the occurrence of specific events. Create a java thread that continually "polls" the database looking for unprocessed events. Complete any initialization necessary for handling HTTP requests. This process supports the ability to received special management requests for controlling the process (e.g., shutdown). It does not support the ability to process application function requests (similar to the OLS above). Update the system log with an "Event Manager Initialization" log message.

Event Manager—Request Processing Loop

The request processing loop occurs continuously within the Event Manager (until terminated). During this processing loop, the following operations are performed. Check to see if the Event Manager is to be terminated—i.e., bTerminateEvMgr=true (as set by a management HTTP request). An SQL query is used to obtain a single folder from the database with the following conditions: the folder is not locked, and background processing is not halted for this folder, and the folder contains one or more unprocessed events. If no rows are returned, then the process will "sleep" for n seconds (as determined by the configuration. Upon wakeup, repeat step 1. If a folder row is returned, then continue below.

Lock the folder. If the lock operation is unsuccessful, then repeat step 1. Otherwise continue below. Query the database for all unprocessed events for this folder (sorted in ascending order by date/time of occurrence). Select the first row from the result set for further processing. If no rows are returned, continue below with step 10. Obtain the event template associated with this event. This template will indicate whether any or all of the following operations are to be performed—External Notification Processing, External Message Processing, Application Post-Processing.

If External Notifications processing is indicated, perform the following. Invoke the GenerateNotifications( ) method of the External Notification Manager (ExtNotifMgr) passing a reference to this event. The ExtNotifMgr will query the database to obtain all external notification rules for this type of event (based on the parties involved). If party specific rules exist, those rules will supercede all other rules; otherwise, generic rules will be used. If no rules exist for this type of event, then no external notifications will be performed. The ExtNotifMgr will process each external notification rule as necessary. Each such rule will reference a contact within the folder (based on generic contact type). If the specified contact does not exist within the folder, then no notification will be issued. If the contact exists within the folder, then the ExtNotifMgr will retrieve the contact information from this contact specific to the notification method specified on the notification rule (e.g., email, fax, pager, etc.). If such information does not exist, then no notification will be issued. If the information required to generate the notification exists, then the notification will be issued.

If External Message Processing is indicated, perform the following. Invoke the GenerateMessages( ) method of the Message Translation Manager (MTMgr) passing a reference to this event. The MTMgr will query the database to obtain all external message rules for this type of event (based on the parties involved). If party specific rules exist, those rules will supercede all other rules; otherwise, generic rules will be used. If no rules exist for this type of event, then no external messages will be generated.

For each external message rule, the following will be performed. The external message rule will invoke the outgoing message formatter to construct an XML structure that is to contain the outgoing message data. The XML message structure is written to the OutgoingMessage table within a separate database for the Integration Server. The Integration Server will retrieve the XML message structure from the OutgoingMessage table and convert it into the native format as indicated by the message header. This subsystem will then utilize the correct protocol (e.g., TCP/IP, FTP, HTTP, SMTP, etc.) to communicate this message to the external system that is to receive the message.

If Application Post-Processing is indicated, perform the following. Obtain the function to be executed from the event template for this event. Invoke the BGLogon( ) method of the TranMgr object to initialize the transaction processing context for the company that created the event. Based on the function (transaction request code), a transaction object (SCTran) is created by invoking the CreateTransaction( ) method of the TranMgr (created during Event Manager initialization). After creating the SCTran object, the EventMgr will set various attributes within this object that control the processing of this request. The application function will be executed by invoking the Execute( ) method of the transaction object specifying the "commit" subfunction.

Based on the commit subfunction, the TPL will perform the following. Invoke the prepare( ) method of the application transaction object. Invoke the validate( ) method of the application transaction object. Invoke a callback to the EventMgr to allow for the inclusion of any Event Manager specific data modifications (e.g., updating the processedFlag within the current event being processed). If no errors exist, invoke the commit( ) method of the application transaction object. This will cause all data processed during the function to be written to the database. If no errors occur during any of the above method calls, the TPL will return with a status of "SUCCESS". Otherwise an "ERROR" status will be returned (for any method where an error is detected).

If an error status is returned, the Event Manager will halt the background processing for this folder by setting the appropriate flag on the folder and committing this change to the database. If a success status is returned, the Event Manager will go back to step 5 and continue processing any remaining unprocessed events for this folder. When no more unprocessed events for this folder exist, unlock the folder. Continue the processing loop by going back to step 1.

NOTE: A unique characteristic of both the External Notification and External Message processing is the ability to send one or more messages to each party defined on the folder. This capability is based upon the inter-organizational architecture inherent within the system.

Event Manager—Termination

The Event Manager will continue in its request processing loop until terminated. The Event Manager can be terminated by terminating the process externally or by HTTP request. If an HTTP request is received to terminate the Event Manager, this request will set the variable bTerminateEvMgr to true. Upon return to the start of its normal processing loop, then Event Manager will check this variable and gracefully terminate itself (thereby allowing the completion of any processing for a given folder).

The Event Manager will perform the following operations during termination: delete the TranManager instance; update the system log with an "Event Manager Termination" log message; then perform the termination of the Event Manager process.

Mail Subsystem (Incoming Mail Processing)

The Mail subsystem is designed to process incoming mail messages. Each incoming mail message contains a special subject line and message body (in addition to one or more file attachments) to allow the system to determine the type of processing that is required.

The Mail Manager is the main component of the Mail subsystem. Typically, there are two Mail Manager process instances (running on different Application Servers within the network)—one process is active, and the other is dormant. The following describes the major processing performed within this subsystem.

Mail Manager—Initialization

Each Mail Manager process performs the following initialization sequence. Read all configuration settings (e.g., number of seconds to sleep when no work to perform, etc.). Create a java thread that continually "polls" the POP3 mail server(s) looking for incoming mail messages. Complete any initialization necessary for handling HTTP requests. This process supports the ability to received special management requests for controlling the process (e.g., shutdown). It does not support the ability to process application function requests (similar to the OLS above). Update the system log with an "Mail Manager Initialization" log message.

Mail Manager—Incoming Mail Processing Loop

The incoming mail processing loop occurs continuously within the Mail Manager (until terminated). During this processing loop, the following operations are performed. Check to see if the Mail Manager is to be terminated—i.e., bTerminateMailMgr=true (as set by a management HTTP request). Lock the "MailManager" resource (using the Lock Manager). If the lock operation is successful, then continue below with step 3. Otherwise, the process will "sleep" for n seconds (as determined by the configuration). Upon wakeup, restart again at step 1.

This serialization only allows one MailMgr process to be active (i.e., polling the mail server) at any given time and prevents a halt in mail message processing due to the active MailMgr being stalled or frozen for some reason. The other process will continue polling trying to acquire the lock (essentially remaining dormant until it acquires the lock). This process acts as a failover process that will become active whenever the active MailMgr process fails or stalls. NOTE: When this operation is performed by the active MailMgr process, it serves to "refresh" the lock.

Using the configuration settings obtained during initialization, logon to the first mail account for the specified POP3 mail server. GET the next mail message, if any, from the account. If no messages exist within this account, then continue below at step 7.

Each mail message will be processed as follows. Parse the mail message into its main sections (e.g., Subject, Body, Attachments). Scan the message body looking for the specially encoded section. This section will contain 1) the folder that is to contain this mail message, 2) a unique sequence number for this message, and 3) a reference to the event template to be used for this message. Any invalid messages will be temporarily stored for review, then later discarded.

For valid messages, the folder reference and the sequence number are used to query the database to see if this message (SAMailMessage) already exists within the system. If so, it has already been processed, continue with step 5j below. Lock the folder indicated by this mail message. If the lock operation is successful, then continue below with step 5e. Otherwise, skip this mail message by continuing back with step 4. (This message will be implicitly retried upon the next cycle). Create an instance of an SAMailMessage object containing all the data from the new mail message. Create an event (based on the event template decoded within the message) for this folder that references the newly created Mail Message object. Commit these objects to the database. Unlock the folder indicated by this mail message. Delete this mail message from the mail account on the POP3 mail server.

Return to step 4 to process any remaining mail messages in this account. Based on the configuration, obtain the next mail account from the configuration. Return to step 3 to process all messages from the new mail account. When no more mail accounts remain, then continue below. At this point, all mail messages in all accounts have been processed. The process will "sleep" for n seconds (as determined by the configuration). Upon wakeup, it will continue the processing loop by going back to step 1.

Mail Manager—Termination

The Mail Manager will continue in its request processing loop until terminated. The Mail Manager can be terminated by terminating the process externally or by HTTP request. If an HTTP request is received to terminate the Mail Manager, this request will set the variable bTerminateMailMgr to true. Upon return to the start of its normal processing loop, the Mail Manager will check this variable and gracefully terminate itself (thereby allowing the completion of any mail message processing currently in progress).

The Mail Manager will perform the following operations during termination: update the system log with an "Mail Manager Termination" log message, and perform the termination of the Mail Manager process.

Message Translation Subsystem

The Message Translation subsystem is designed to communicate with other external system using automated electronic interfaces. This subsystem can handle both incoming and outgoing electronic messages. Incoming messages result in transaction requests that are processed by the TPL. Outgoing messages are generated in response to a specific event processed by the Event Manager. In general, this subsystem supports asynchronous messages (rather than synchronous messages).

Essentially, the Message Translation system is used to process inbound and outbound electronic messages. This service allows a technologically sophisticated organization to process business transactions in a fully automated manner, even though their counterparty organizations are interacting on a manual basis (using web-based interfaces).

The Message Translation subsystem consists of the following major components—Integration Servers, Inbound Message Translation Processes, and Outbound Message Translation Services.

The Integration Server provides the direct interface with each external system handling the variety of communication protocols and data formats required by these systems. In doing so, it insulates the entire system from the interface details and provides a single common interface mechanism for all electronic messages. In order to maintain high availability, the Integration Server interfaces with the system by storing/retrieving all messages from the database server in XML format. In this way, other parts of the system can be halted without affecting the ability of the system to receive messages from other systems. Within the system, the Integration Server is a standard component that is commercially available (e.g., WebMethods, BizTalk).

The Inbound Message Translation (IMT) component handles all incoming electronic messages from the Integration Server (via the database). This component consists of one or more process instances (running on one or more Application Servers). Similar in structure to the Event Manager, these process instances continually poll the database looking for new incoming messages to process.

The Outbound Message Translation (OMT) component handles all outgoing electronic messages. Such messages are generated in response to an event (based on the specifications within the event template for that event). This component is a service that is invoked within the context of the event processing performed by an Event Manager process. The following describes the major processing performed within this subsystem.

Inbound Message Processing—Overview

The following operations are performed during inbound message processing. An external system establishes a connection with the Integration Server. This connection varies based on the protocol and the nature of the specific interface. In general, this connection can be used to transmit a file of transactions, a set of individual transactions, or just a single transaction. The Integration Server receives an electronic message from an external system over its established connection. Based on the message mapping rules contained within the Integration Server, this server will convert the incoming electronic message into an STM (Siteras Transaction Message) format in XML syntax. This message is stored as an object (SAInboundMessage) within the InboundMessage table within the database server (IntegrationServer Database). The IMT process will process any inbound messages that have been queued in the database. The detailed operation of the IMT process is described in the following sections.

IMT Process—Initialization

Each Inbound Message Translation process performs the following initialization sequence. Read all configuration settings (e.g., number of seconds to sleep when no work to perform, etc.). Create an instance of the Transaction Manager object (SCTranManager). This object is used to coordinate the processing of any application functions that are triggered by the occurrence of an incoming message. Create a java thread that continually "polls" the database (InboundMessage table within IntegrationServer Database) looking for incoming messages. Complete any initialization necessary for handling HTTP requests. This process supports the ability to received special management requests for controlling the process (e.g., shutdown). It does not support the ability to process application function requests (similar to the OLS above). Update the system log with an "Inbound Message Translation Initialization" log message.

IMT Process—Message Processing Loop

The message processing loop occurs continuously within the IMT (until terminated). During this processing loop, the following operations are performed. Check to see if the IMT is to be terminated—i.e., bTerminateIMT=true (as set by a management HTTP request). Poll the database and retrieve an available inbound message. If no messages are available, this process will "sleep" for n seconds (as determined by its configuration). Upon waking up, the process will restart at step 1 above. If a message is retrieved, processing will continue below. Based on the message Id generated from the Integration Server, this process will attempt to lock this message using the resource Id "IBMsg_<msgId>". This lock guarantees that only one IMT process instance will work on a given message at a time.

If the lock is unsuccessful (meaning that another IMT process is already processing this message), the process will restart at step 1 above. Otherwise, the lock was successful and the processing will continue as below. The IMT extracts this STM (XML message) from the SAInboundMessage object and converts it into object format using a generic object class (SCObjectGraph—referred to as the OG). Once in object format, the IMT extracts the function from the request attributes contained in the Header. Based on the function (transaction request code), a transaction object (SCTran) is created by invoking the CreateTransaction( ) method of the TranMgr (created during IMT initialization). After creating the SCTran object, the IMT will set various attributes within this object that control the processing of this request. The application function will be executed by invoking the Execute( ) method of the transaction object specifying the "commit" subfunction (for editing functions).

Based on the commit subfunction, the TPL will perform the following. Invoke the prepare( ) method of the application transaction object. Invoke the validate( ) method of the application transaction object. Invoke a callback to the IMT to allow for the inclusion of any IMT specific data modifications (e.g., updating the processedFlag within the current message being processed). If no errors exist, invoke the commit( ) method of the application transaction object. This will cause all data processed during the function to be written to the database. The TPL will return a return status (either "SUCCESS" or "ERROR"). If a response message is to be generated as a result of this transaction, then the outbound message can be triggered from the event that is record as a result of processing this transaction request (as described below in Outbound Message Processing).

If an error status is returned, the IMT will halt the processing for this message by setting the appropriate flag and committing this change to the database. If a success status is returned, the IMT will unlock the message and continue the processing loop by going back to step 1.

Outbound Message Processing

Outbound message processing occurs as a result of event processing by the event manager when the event template for this event specifies "external message processing". In this case, the following operations will occur. If "external message processing" is indicated by the event template for the current event, the Event Manager will invoke the Outbound Message Translation (OMT) service (passing a reference to the event). Using the Event Template Id from the event, the OMT will obtain the Outbound Message Processing rules for this event. Using these rules, the OMT will construct an output OG based on the content of the current Event object. The OMT will then invoke the ConvertToXML( ) method of the OG object to produce an XML stream. The OMT will create a new outbound message object (SAOutboundMessage) that contains the outbound STM (in XML format). The Integration Server continually polls the database for outgoing messages.

When an outgoing message is retrieved from the database, it will be converted into a native format (specific to the destination system) based on the message mapping rules contained within the Integration Server. If a connection with the external system does not already exist, the Integration Server will establish a connection with the external system. This connection varies based on the protocol and the nature of the specific interface. In general, this connection can be used to transmit a file of transactions, a set of individual transactions, or just a single transaction. The Integration Server will then transmit the native message to the external system. Once transmitted, the Integration Server will continue its outgoing message processing loop by continuing with step 6.

Transaction Processing Layer (TPL) Processing

The Transaction Processing Layer is the heart of the A/F and coordinates the processing of application transactions within the system. A key part of this processing is the inter-organizational validation that occurs for each transaction. In addition to the basic company and operator security validations performed by most systems, this complex validation ensures that the organization is authorized to perform this transaction along a number of dimensions (e.g., relationship, workflow state, etc.).

This layer consists of two main components—the Transaction Manager objects (SCTranMgr) and Transaction object (SCTran).

TPL Concepts

Specific concepts and objects are critical to the operation of the TPL. This section provides an overview of these concepts and objects.

Intrinsic

Each application function is defined by a related set of three objects. The Intrinsic object is defined first. This object represents a specific application function that is hard coded within a specific application transaction class (i.e., an intrinsic function). An application transaction class can support one, or multiple, intrinsics.

IntrinsicFunction

Once a set of Intrinsic objects are defined, a base set of application functions are defined using IntrinsicFunction objects. Each IntrinsicFunction object defines a distinct application function and references a specific Intrinsic object. This object establishes various parameters and settings that control the processing of the transaction. Some of these parameters can be overridden and/or further constrained by customer specific functions. Since the IntrinsicFunctions are inherent to the application, the community workflow engines references these objects when evaluating inter-organizational workflow state changes.

Function

Once the set of IntrinsicFunction objects are defined, a customized set of application functions are defined using Function objects. Each Function object references an IntrinsicFunction object. At a minimum, one Function object is defined, by default, for each IntrinsicFunction. Additionally, the Function object allows for the addition of organization specific functions, these functions can either override or extend the default set of functions. This allows organizations to further customize the operation of a given function to meet their organization specific needs (within the constraints established by the related IntrinsicFunction). For example, an organization specific function can be used to display a different form/view to a user (one in which data elements have been removed or defaulted—i.e., further constrained). Additionally, organization specific functions are often defined to control organization specific workflow (i.e., intra-organization workflow).

Each transaction processed by the TPL specifies a functionId. This Id uniquely identifies the Function object that contains the processing specifications for this transaction. Since each Function is related to an IntrinsicFunction, and each IntrinsicFunction is related to an Intrinsic, the attributes from all of these objects provide the complete vector of processing specifications for this transaction. Rather than referring to each of these objects individually, this set of information is simply referred to as the function vector, function, or application function.

Object Graph Specifications (OGS) and the Transaction Object Hierarchy

Business objects stored within the database are related with a network structure. However, within the context of a given application transaction a distinct transaction object hierarchy exists that establishes a hierarchical relationship among the business objects involved in the transaction. The business object at the top of this hierarchy is referred to as the root object.

Within the A/F, the Object Graph Specification (OGS) provides the definition of the object hierarchy for a given transaction. An OGS object is defined for each function within the system. Each function can have its own distinct OGS object or multiple functions can share the same OGS.

The OGS provides the structure and processing attributes for the transaction. A base OGS object is defined for each IntrinsicFunction. This OGS serves to constrain the Function object. Additionally, another OGS can be defined on the Function object, however, in doing so, this OGS can only constrain the OGS inherited from the related IntrinsicFunction object.

Transaction Manager Object (SCTranManager)

The Transaction Manager (TranMgr) represents a transaction processing context (or session) wherein one or more transactions can be executed. The Logon( ) method of this object is used to provide additional context information specific to a given company and operator. The following describes the major processing performed within this object.

Logon Processing

Logon processing occurs after instantiating a TranMgr object. The object instantiation performs very little initialization itself. The major initialization of the TranMgr occurs in response to the invocation of the Logon( ) method as follows. A calling subsystem will instantiate a TranMgr object (SCTranMgr class).

The Logon( ) method of the TranMgr object will be invoked. There are various flavors of this method (i.e., an Online Logon, a Background Logon, etc.), but they all pass the following key parameters to this method—companyId, operatorId, IP Address, and password. This method will perform the following. Using the companyId, retrieve the Company object (SACompany) from the database. If not found, return an error. Using the Company object and the operatorId, retrieve the Operator object (SAOperator) from the database. If not found, return an error. Using the Operator object and the password, validate the password using the MD5 algorithm (one-way encryption). If invalid, return an error. For Background Logons, a password is not provided since this is an internal logon process used by the Event Manager. Additionally, when any logon errors are detected additional processing is performed to track the type of error, its frequency, etc. Based on this information, the system may temporarily or permanently disable logon processing for specific Operator. Using the Operator object, the operator's role is obtained. The role defines the application functions that this operator can perform (as defined by this company). Using the role, the set of RoleFunction objects (SARoleFunction) will be retrieved from the database and cached within the TranMgr. Based on the objects returned from the database (e.g., Company, Operator, etc.), various attributes are set within the TranMgr representing a "logged on" state. Create a new Statistics object (SAStatistics) and anchor it within this TranMgr object. This object is used to collect session and transaction statistics that for any transactions associated with this TranMgr. Based on a successful logon, the calling subsystem will proceed with any post-logon processing necessary for the subsystem (as described in the Interface Subsystem section).

NOTE: The TranMgr object only represents a given Company/Operator at any given time. However, this object instance is reusable in the sense that the Logoff( ) method will reset this object in preparation for another logon.

Logoff Processing

Logoff processing resets a TranMgr object (that has been logged on). This processing is triggered by invoking the Logoff( ) method of the TranMgr object. In doing so, the following operations occur. Create a Session Statistics record (based on the current statistics object for this TranMgr). Create a Transaction Statistics record (based on the current statistics object for this TranMgr). Commit these records to the database. Reset any TranMgr attributes the represent the "logged on" state.

Creating a Transaction Object

Every application function executed within the system requires a Transaction object (SCTran). Rather than instantiating this object directly, this object is created by the TranMgr as a result of invoking the CreateTransaction( ) method. When invoking this method, the calling subsystem will pass the functionId of the application function (transaction) that is to be executed. Within this method, the following operations occur.

The functionId is validated against the cached list of RoleFunction objects (i.e., is this operator allowed to perform this function). If not valid, an error is returned. Based on the functionId, the Function object (SAFunction) and related objects (SAIntrinsicFunction and SAIntrinsic) are retrieved from the database. If the partyType defined in the Function object does not match the one of the types in the partyTypesAllowed array within the Company object, then an error is returned. Each function defined within the system is intended to be performed under a given "relationship" (i.e., partyType). This validation ensures that the organization performing the transaction is allowed to assume this relationship. Using the transactionClass defined in the Function object, the TranMgr will create an instance of the application specific transaction object. A reference to this object will be returned to the caller.

Transaction Object (SCTran)

Every application function executed within the system requires a Transaction object (SCTran). The SCTran class is an abstract class and is subclassed by each specific application transaction class. As such, in creating the transaction object, an instance of an application specific transaction will be created. A transaction object is created by invoking the CreateTransaction( ) method of the TranMgr object. The functionId is passed as a parameter to this request and is validated by the TranMgr (described above). Within each function object, the application specific transaction class is defined. As such, when a the CreateTransaction( ) method is invoked, it will create the an instance of the application specific transaction class based on the functionId.

Transaction Execution Overview

The overall execution of a transaction is a complex process that involves an orderly series of validations and subprocesses. Additionally, based on the nature of the transaction, this processing can occur across one or more interactions with an external system or interactive user. This section provides an overview of the processing that occurs during transaction execution. This overview is followed by additional sections that detail the operation of various subprocesses.

In general, the TPL processes two major types of functions (transactions)—editing and non-editing. Non-editing functions are read-only (i.e., inquiry) functions that merely return information. Non-editing functions can be further classified as view or form functions. View functions return an array of many complex business objects. Form functions only return a single complex business object. Editing functions result in the modification of data within the database. By definition, editing functions only operate on a single business object. Editing functions are further classified as one or the following—insert, update, or delete functions (based on the operation being performed on the root object for the transaction). For each transaction, the TPL defines the following major processing phases.

Preparation (Prepare)

During Preparation, any existing objects necessary to process this transaction are retrieved from the database, new objects are created and initialized, and any other application specific initialization or processing is performed. This phase results in an editing context that contains initialized application objects. These objects may be merely used to display information back to the requestor, or they may represent a set of information that is presented for further modification.

Validation (Validate)

During Validation, any input data is validated and applied to the objects within the editing context (returned at the completion of the Preparation phase). After the input data is applied, an ordered validation and processing sequence occurs using the object hierarchy for this transaction as defined within the OGS. This processing sequence performs any application specific validation or processing for the transaction. Upon completion of this sequence, the TPL will perform its final core services—Alert Generation, Workflow State Evaluation, Event Generation, and Completion Message Generation. If any errors are detected, the editing context containing the objects is returned to the state that existed at the end of the Preparation phase. Otherwise, this phase results in an editing context that contains application and system objects that reflect the results of the processing specific to this transaction (ready to be committed to the database).

Commit (Commit)

During Commit, the application and system objects within the editing context (that have been modified) are written to the database. For non-editing functions, only the Prepare phase is allowed. For editing functions, all phases are required.

A transaction is executed by invoking the Execute( ) method of the Tran object for this transaction. Prior to invoking this method, the following input attributes of the Tran object are set:

Root Object

A reference to an existing business object. If the function is an insert function, then this parameter will be null.

Root Object Class

The application class of the root objects.

Transaction Parameters (TranParms)

A set of application specific parameters used to further control the processing of the application function.

Input OG

A reference to an OG object that contains any input data for this transaction.

Query Parms

For non-editing functions, a reference to a Query Parm object. This object contains query parameters that are used to control the selection of business objects from the database (i.e., similar to the WHERE clause of an SQL query).

Subfunction

The execution phase to be performed—Prepare, Validate, Commit. Upon return from the Execute( ) method, the following output attributes of the Tran object are returned.

Output OG

A reference to an OG that contains the resulting business objects from this request (as controlled by the OGS for this transaction). For non-editing view functions, this OG will consist of an array of zero to many complex business objects. For all other functions, this OG will consist of a single complex business object.

Datastream

Rather than generating an output OG, some application transactions produce a binary datastream (the format and structure of which is defined within the function object).

TPL Return Code

A return code indicating the status of the transaction processing—SUCCESS, ERROR, RETRY, or FAILURE. The meaning of these codes is as follows. SUCCESS—indicates that the subfunction was performed successfully by the TPL and no application errors were detected. In this case, the Message Array may contain one or more informational or warning messages. ERROR—indicates that the subfunction was performed successfully by the TPL, but application errors were detected. In this case, the Message Array will contain one or more error messages in addition to any informational or warning messages. RETRY—only valid for Background Processing, indicates that the subfunction was not completed and that a retryable condition exists. The subsystem should retry this request at a later time. The retry mechanism is subsystem dependent. FAILURE—indicates the TPL encountered a configuration error or an unhandled exception during the processing of this request (that it recovered from) and recorded a System Event. This request cannot be processed.

Message Array

An array of message objects that contain one or more application messages. Each message contains a severity—informational, warning, or error.

Using this method and parameters, the following summarizes the operations that occur.

The subfunction is validated based on the current state of the transaction and the type of function. For non-editing functions, only "prepare" can be specified. For editing functions, all subfunctions can be specified. However, depending on the state of the transaction, certain subfunctions are invalid. For example, if the transaction completed its "validation" state, then it is invalid to specify the "prepare" subfunction. A finite state machine (FSM) is used to ensure that the specified subfunction is valid for the given transaction state. If the subfunction is invalid, an error is returned.

Based on the subfunction passed, one of the following internal SCTran methods is invoked—_prepare( ), _validate ( ), or _commit( ). Since the calling subsystem may initially execute a transaction with either "validate" or "commit", each of these internal functions will check the state of the transaction and invoke the method for a prior phase if necessary. As a result, the transaction phases will be executed in order—Prepare, Validate, Commit (except for non-editing functions in which only Prepare is valid). The phases performed will never exceed the phase indicated by the subfunction.

Once the phase or phases indicated by the subfunction is/are performed, the resulting editing context (managed by the Tran object) will contain one or more business objects. Using this editing context and the OGS for the transaction, an output OG will be created. The UpdateStatistics( ) method within the TranMgr object will be invoked to update transaction statistics for this request. The method will then return to the calling subsystem with the output parameters described above.

Prepare Processing

The processing performed during "prepare" varies based on the type of function being performed.

For view functions, the following operations are performed. If the state of the Tran is "Prepare" (i.e., a "prepare" was already performed), reset the Tran to "Init" state. The selection criteria used to select the business objects for the view is assembled as follows: the selection criteria are initialized to null; any query parms from the Intrinsic are AND'ed to the current selection criteria; any query parms from the IntrinsicFunction are AND'ed to the current selection criteria; any query parms from the Function are AND'ed to the current selection criteria; and any query parms passed in the current Tran object are AND'ed to the current selection criteria.

The following hard coded query parm is AND'ed to the current selection. This qualifier ensures that SQL query only returns business objects for which the current organization is authorized. This query parm is critical to providing inter-organizational data security. As such, it MUST be hard coded within the software and not modifiable via configuration. The following summarizes the key conditions of this qualifier. The organization performing this function must be a party to the folder containing this business object. The organization performing this function must have access to one or more tasks within the folder (i.e., its partyType must be included in the currentPartyArray for one or more tasks within the folder). The relationship of this organization for this transaction (i.e., its party type within the folder) must match the party type of the function being performed.

Using the selection criteria created above, the business objects are retrieved from the database (according to this selection criteria) into the editing context associated with this Tran object. An output OG is created using the OGS for the function and the business objects within the editing context. Set the state of the Tran to "Prepare", set the return code and any other output parameters, and return to the calling subsystem.

For form, update, and delete functions, the following operations are performed. If the state of the Tran is "Prepare" (i.e., a "prepare" was already performed), reset the Tran to "Init" state. If the function is an editing function OR if the function is a form function (with Lock=TRUE specified on the function), lock the folder containing this business object. If the lock is unsuccessful, return an ERROR.

If a root object parameter was passed, the following will be performed. The root object and any other related objects (as specified in the OGS) will be retrieved from the database. If the class of the returned root object does not match the Root Object Class parameter, then a FAILURE is returned. The folder associated with the root object, and the related parties for this folder, will be retrieved from the database. The partyType of the organization performing this function will be determined as follows. Obtain the companyId from the TranMgr associated with this Tran. Scan the Party objects from the folder and locate the Party object with the same companyId. If this company does not exist as a Party on this folder, then a FAILURE is returned. Obtain the partyType from this Party object. If the partyType for this function does not match this organization's party type for this business transaction (i.e., folder), then a FAILURE is returned. This check ensures that the organization performing this function is operating within their relationship defined for this specific business transaction.

For editing functions, the CheckWorkflow( ) method of the Workflow Manager is invoked to determine whether or not this function is valid based on the current workflow state of the folder. If the function is invalid, an error is returned. After completing the validations above, the prepare( ) method of the Tran object is invoked. A dummy implementation of this method is provided in the SCTran class (which merely returns). The purpose of this method is to pass control to the application specific version of this method in the application transaction class. If this method is implemented, it will perform any application specific initialization as required. Upon return from the prepare( ) method, an output OG is created using the OGS and the business objects within the editing context. Set the state of the Tran to "Prepare", set the return code and any other output parameters, and return to the calling subsystem.

For insert functions, the following operations are performed. If the state of the Tran is "Prepare" (i.e., a "prepare" was already performed), reset the Tran to "Init" state. Based on the root object class, a new business object of this class will be created. The CheckWorkflow( ) method of the Workflow Manager is invoked to determine whether or not this function is valid based on the current workflow state of the folder. If the function is invalid, an error is returned. The prepare( ) method of the Tran object is invoked. A dummy implementation of this method is provided in the SCTran class (which merely returns). The purpose of this method is to pass control to the application specific version of this method in the application transaction class. If this method is implemented, it will perform any application specific initialization as required. Upon return from the prepare( ) method, an output OG is created using the OGS and the business objects within the editing context. Set the state of the Tran to "Prepare", set the return code and any other output parameters, and return to the calling subsystem.

Validate Processing

During "validate" processing, the following operations will be performed. If the Tran is in "Init" state (i.e., "prepare" has not been performed), invoke the _prepare( ) method (see Prepare Processing above). If the Tran is in "Validate" state (i.e., "validate" has already been performed), reset the business objects within the editing context back to the state that existed immediately after "prepare" processing. If an input OG is provided, the data elements flagged as "input" elements (within the OGS) will be validated (syntactical validation). Using the object hierarchy defined within the OGS, the Validate( ) method of each business object will be invoked starting at the bottom of the hierarchy and working back to the top. This validation sequence provides for the orderly validation of all business objects within the transaction.

After completing the validations above, the Validate( ) method of the Tran object is invoked. A dummy implementation of this method is provided in the SCTran class (which merely returns). The purpose of this method is to pass control to the application specific version of this method in the application transaction class. If this method is implemented, it will perform any application specific validations and processing as required. NOTE: That this method is only invoked after all business objects within the transaction have been validated. If any application errors have been detected, reset the business objects within the editing context back to the state that existed immediately after "prepare" processing and return an ERROR. Upon return from the Validate( ) method, the GenerateAlerts( ) method of the Alert Manager will be invoked. This method evaluates any business rules for ALL parties involved in this transaction and generates the appropriate Alert objects (SAAlert) within the editing context.

After processing the alerts, the EvaluateWorkflow( ) method of the Workflow Manager will be invoked. Based on the application function being processed, this method will set the next workflow state for the folder. After evaluating the workflow, the GenerateHistoryEvents( ) method of the Tran object will be invoked. This method traverses the business object hierarchy for this transaction and generates any Event objects (SAEvent) based on any changes to business objects (derived from SADocument). After generating history events, the GenerateCompletionMessage( ) method of the Tran objects will be invoked. Using the completion message template defined on the function, this method will generate a completion message for this function and add it to the message array (for this transaction). An output OG is created using the OGS for the function and the business objects within the editing context. Set the state of the Tran to "Validate", set the return code and any other output parameters, and return to the calling subsystem.

Commit Processing

During "commit" processing, the following operations will be performed. If the Tran is in "Init" state (i.e., "prepare" has not been performed), invoke the _prepare( ) method (see Prepare Processing above). If the Tran is in "Prepare" state (i.e., "validate" has not been performed), invoke the _validate( ) method (see Validate Processing above). Invoke the CheckLock( ) method of the Lock Manager for this folder. If unsuccessful, return ERROR. Otherwise, this method will refresh the lock (thereby ensuring that no one else is attempting to modify the folder). Within the editing context for this Tran object, commit all business objects (that have been modified) to the database. Unlock the folder.

Application Logic Processing

Based on the structure discussed above, the application logic required for any applications constructed with the A/F is greatly simplified. The application logic is coded within two major sets of objects—Application Transaction Classes and Business Object Classes.

Application Transaction Classes

The application transaction class supports one or more intrinsics within the application. Within each class, the following methods are coded. Prepare Method: this method is used to perform any application specific initialization for the transaction. Validate Method: this method is used to perform any application specific validation and processing for the transaction.

Business Object Classes

Each transaction consists of one or more business objects. Business objects represent the data entities for the application system. Within each class, the following method is coded. Validate Method: this method is used to perform any application specific validation and processing for the business object. Due to the ordered sequence in which this method is invoked, all dependent (i.e., child) objects that are related to this object will have been validated prior to this method being invoked for this object. As such, this validation and processing can include any complex validations, cross-edits or manipulations of any dependent objects that are subordinate to this object.

System Service Processing

The various subsystems and objects described above rely on a rich set of System Services. These services are described further in this section.

Locking and Reservation

By centralizing the data associated the inter-organizational transactions in a common network/database, the system facilitates the ability of each organization to collaborate with each other. As such, when a given organization is performing a function with respect to a given business transaction, the system automatically provides for locking and reservation of the folder as follows. In general, anyone can access the information for a specific business transaction (read-only) at any time (even though the folder may be locked). Whenever an editing function is being performed, the folder will be locked until the editing function is completed. For team ownership, whenever a folder is returned to an operator from the pool, it will be locked until that operator retrieves another folder or logs off. This allows an operator within the team to perform multiple functions on the folder without being locked out by someone else accessing the folder.

When the folder is locked by one organization, if another organization attempts to lock it (e.g., by performing an editing function), the system will notify that operator that the folder is locked by the other organization.

In order to prevent a folder from being locked for an excessive amount of time, a timeout mechanism is provided. This mechanism will "unlock" the folder after the timeout period expires.

Object Graph Services

With multi-party transaction processing, each transaction request needs to be filtered to limit the input and output data elements for that specific party. This multi-party data filtering is performed by the TPL using an Object Graph Specification (OGS).

Each transaction request is associated with a Function (whose definition is contained within the system configuration). An OGS is associated with each function. The OGS defines the set of data entities and attributes, and their object structure, for a given transaction request (i.e., function).

Each interface subsystem will convert any incoming transaction request into an Object Graph (i.e., an object-oriented hierarchical structure of key:value pairs). The interface subsystem will then invoke the TPL to process the transaction.

Using the OGS associated with the Function for this transaction request, the TPL will validate any input data provided with the transaction request. In doing so, it will only receive and process input data elements that are specified in the OGS (thereby preventing the creation or modification of data elements that are not allowed for this party). After processing any input data, the TPL will then invoke the application logic to process the transaction. Once the application logic has completed its processing, the TPL will again use the OGS to prepare a new Object Graph that contains the results of the application processing. In so doing, the resulting OG will only contain those data elements that are defined within the OGS (hence only sending data elements that are allowed for this party).

After the TPL completes its processing, the interface subsystem will convert the new Object Graph (returned by the TPL) into an outgoing transaction response.

Essentially, the Object Graph Services ensure that a given party only can send or receive data elements allowed for their party type. Another unique aspect of this service is its ability to insulate the application logic from the details of the party type filtering. This greatly simplifies the resulting application code while also supporting a large number of related transactions that differ with respect to their data content.

Business Rule and Alert Management

In order to handle the unique processing requirements of each member organization, the system supports the definition of business rules that are specific to each organization. These business rule definitions are defined within the system configuration (and vary with each vertical application).

Each time the TPL processes an editing function, it will invoke the Alert Manager to perform business rule evaluation and alert generation. For each party defined on the folder (associated with this transaction), the Alert Manager will retrieve and evaluate all business rules that are applicable. In evaluating each business rule, if the business rule fails, an alert will be generated. These business rules are reevaluated any time a new editing function is performed on the folder (by any party).

Within each folder, a collection of alerts is maintained. This collection represents the current set of exceptional business conditions that exist within the folder. When an alert is generated, an alert rule definition within the system configuration is used to determine which party types should be allowed to access this alert. In this way, certain alerts may be private to a specific party while other alerts may be public to multiple parties.

Essentially, the Business Rule and Alert Management services provide for organization specific business rule processing. This service is unique in its multi-party processing capabilities.

Workflow Management

Each time the TPL processes an editing function, it will invoke the Workflow Manager to determine the next workflow state for the folder (i.e., workflow management). For more information on this capability, refer to the related section on "Inter-Organization Workflow Management".

Security Management

The Security Management service addresses the requirements of BOTH intra-organization and inter-organizational security. The following summarizes these security management capabilities.

The Security service will always validate the identity of any operator or automated system that is attempting to connect to the system and perform transactions (i.e., validate the requestor).

Once the identify of the requestor is verified, the following set of inter-organizational security constraints are verified. Ensure that a requestor can only access folders (business transactions), and related folder data, for which their organization is a valid party. Ensure that a requestor can only perform functions for which their organization is authorized (based on the valid set of party types defined for their organization). For a given folder (business transaction), ensure that a requestor can only perform functions that are allowed by the relationship (party type) of their organization to that folder. For a given folder (business transaction), ensure that a requestor can only perform the functions that are allowed for their party type based on the current workflow state for that folder. For a given folder (business transaction), ensure that a requestor can only send/receive data elements that are allowed by the relationship (party type) of their organization to that folder.

Within the constraints established by the inter-organizational security mechanism, the following intra-organization constraints are verified. Ensure that a requester can only access folders (business transactions) that are allowed by their role. Ensure that a requestor can only perform functions that are defined by their role. Ensure that a requester can only send/receive data elements that are allowed by their role.

Essentially, the Security Management service ensures and maintains the data privacy within the system. It is unique in its ability to handle intra-organization security constraints within the context of inter-organizational security constraints.

Individual vs. Team Ownership

For every folder in the system, an owner must be specified for each organization (party) that is defined on that folder. This allows the system to identify the specific individual or group that is responsible for handling the transaction within each organization. The system can support either individual or team ownership.

With individual ownership, the folder is owned by a specific individual within a given organization. With this method of ownership, the individual operator will manage their folders using a variety of views and filters. The ownership of this folder will remain with that individual until it is transferred to another individual or the transaction is completed.

With team ownership, the folder is owned by a group of operators (not an individual operator). This method of ownership is typically used by large organizations with high transaction volume (e.g., insurance claims, purchase order handling, etc.) and provides greater file handling efficiency and improved responsiveness. Using this method, a group of operators are assigned to process a pool of folders that share a common set of characteristics (e.g., workflow state, geography, amount, business condition, etc.).

The following additional services are provided to fully support team ownership. One or more "Get Work" functions can be defined that allow any operator in the group to retrieve a folder from the pool of folders. The selection criteria that define the folders that belong to a given pool can be simple or extremely complex. Special locking and reservation handling is provided (for more information, refer to the section on "Locking and Reservation".

External Notifications

In addition to the electronic message capabilities provided by the Message Translation service, the system also supports the ability to use external communication services to for the purpose of issuing notifications. This capability is referred to as the External Notification service.

This service is useful for sending notifications to people who are infrequent users of the system. This allows these users to be notified of business activity that occurred within the system (without having to logon and check the system on a regular basis).

For every event that is processed by the Event Manager, if an external notification is defined for that event, the Event Manager will invoke the External Notification Manager to generate the notification.

Examples of external communication networks that will typically be used for external notifications include e-mail, fax, pager, cell phone, pda, and other wireless devices.

Snapshot Services

For each folder, the Event Management subsystem maintains a rich business history of all modifications to the folder. Within each event, a complete collection of the business object hierarchy for the transaction is preserved. The snapshot mechanism was designed to avoid the overhead of maintaining history data within each distinct application table in the database.

Essentially, the snapshot is a data blob (in XML format) that contains the complete business object hierarchy that existed within a transaction when the transaction was committed to the database.

When creating an event within a transaction, the CreateEvent( ) method will use the root object for the event and generate a snapshot object (SASnapshot) for this event using the Snapshot OGS defined on the event template associated with this event. A reference to this object will then be stored in the Event object being created. These objects will be written to the database, along with all the other data for the transaction during "commit" processing.

To view the business objects within a snapshot, the snapshot object is first retrieved from the database. A special editing context is then created. Finally, the snapshot blob (XML stream) is parsed and each individual business object is reconstituted within the special editing context. The TPL will then prepare an output OG using the business objects contained in this editing context.

Reporting

Within any given application the transactions from various organizations will be contained within a single database. In order to protect the privacy of each organizations data, no organization can be given a direct link to the database for reporting purposes. The Reporting service was designed to provide a high-performance reporting facility for generating reports.

Essentially, the reporting service uses the same mechanisms used by view functions within the system. However, rather than retrieving objects from the database, this service uses "raw" query mechanisms and aggregations (e.g., raw SQL) to allow the database to perform data summarization and aggregation operations on the data. This greatly reduces the amount of data transferred between the database server and the application server. These raw rows are passed to the JView™ environment within the browser for rendering.

Document Management

While many of the facilities within the system are oriented around the management of structured documents, a rich set of Document Management services are provided for managing unstructured documents.

Essentially, an unstructured document is treated as a binary blob and can support virtually any type of document (e.g., word processing documents, spreadsheets, graphics, images/photos, animations, audio, video, etc.).

The Document Management service provides a variety of methods for importing these documents into the system. These mechanisms include HTTP, FTP, E-Mail, and URL pull.

When a new unstructured document is attached to a folder, an Attachment object (SAAttachment) is created. This object contains meta-data related to this document. In addition, the actual document itself is stored within an AttachmentData object (SAAttachmentData). Within this object, the binary data representing the document is stored as a blob. In fact, based on the primary type of the attachment, two blobs are actually stored within the AttachmentData object—a native blob and a generic blob. The native blob contains the actual binary data for the original document. The generic blob contains a version of the original document converted into a common format (e.g., PDF for documents, MP3 for audio, MPEG for video, etc.).

When a new revision of a given attachment is received, a new AttachmentData object is created. The Attachment object maintains a list of all the revisions for a given document (thereby providing a complete revision history for the document).

Within each Attachment object, the currentPartyArray attribute is used to define the parties within the folder that can access the attachment.

Illustrative embodiments of the present invention have been disclosed. A person of ordinary skill in the art would realize, however, that certain modifications would come within the teachings of this invention.

What is claimed is:

1. A method for issuing and negotiating and settling, using a first computer, insurance subrogation claims between at least two parties through an electronic subrogation network, said method comprising:

providing at least one electronic subrogation file associated with party-specific rules with subrogation information from the first computer, the electronic subrogation file containing structured claim information and unstructured supporting documents in a form that can be accessed by multiple on-network and off-network parties using at least one second computer, wherein the supporting documents are converted from an original format into a format for universal viewing, the party-specific rules including rules for the multiple on-network and off-network parties;

permitting entry according to the party-specific rules, through electronic communication means, by one or more of said multiple on-network and off-network parties using the at least one second computer, of one or both of claim information and supporting documents to said subrogation file;

permitting access according to the party-specific rules, through electronic communication means, by one or more of said multiple on-network and off-network parties using the at least one second computer, to one or both of said structured claim information and said unstructured supporting documents; and issuing subrogation demands through electronic communication means, using the first computer, to both on-network and off-network parties.

2. The method of claim 1, wherein said permitting entry includes automatically entering paper documents received by fax or high-speed scanner into the electronic file.

3. The method of claim 1, wherein said electronic communication means comprises a network.

4. The method of claim 1, and further including establishing audit and business rule functions that permit said at least one electronic subrogation file to be electronically audited based on said party-specific rules.

5. The method of claim 1, wherein said multiple parties include a demanding party, a responding party, and one or more supporting/facilitating parties, and further including routing a demand to an appropriate responding party based on a responding party's routing rules.

6. The method of claim 5, wherein said routing includes using a routing algorithm that combines a demanding party specific index and a heuristic algorithm to correctly determine an appropriate responding party and further a specific individual or group within said responding party that is to initially handle the demand.

7. The method of claim 1, and further including using a state-based model to manage inter-party subrogation workflow.

8. The method of claim 1, and further including permitting intra-party subrogation workflow functions, including follow-up action plans and party-specific workflow.

9. The method of claim 1, and further including providing collaboration functions that allow selected parties to exchange information and negotiate using said electronic communication means.

10. The method of claim 1, and further including providing a document management function that allows said multiple parties to update attachments and manage document versions.

11. The method of claim 1, wherein said electronic communication means includes a network, and further including automatically generating alerts to on-network parties for exception conditions or violations of said party-specific rules.

12. The method of claim 1, and further including selectively assigning selected files and providing online access to third parties including arbitrators, litigators and outside service providers.

13. The method of claim 1, wherein said electronic communication means includes a network, and further including generating customizable online management reports.

14. The method of claim 1, and further including settling subrogation claims between parties automatically based on the parties' business rules.

15. The method of claim 1, and further including automatically generating counterclaim demands based on liability percentage and comparative negligence rules of a responding party.

16. The method of claim 1, and further including triggering an automatic funds transfer based on a response of a responding party.

17. The method of claim 1, and further including netting payments between parties involved in a subrogation claim, including:
    tracking payments owed and payments due over a given period of time for a member;
    netting payments either bilaterally between parties or multilaterally between a party and an electronic subrogation network representing all other parties participating in a netting process;
    configuring netting periods; and
    managing information to allocate netted payments to each claim file.

18. The method of claim 1, and further including allowing members to benchmark parameters of their subrogation and/or claims operation against an aggregate based on information contained in said electronic subrogation files.

19. The method of claim 1, and further including assessing a best course of action within a subrogation process, including performing a cost-benefits analysis of pursuing a particular course of action.

20. The method of claim 1, and further including assessing the validity of a subrogation demand including performing an electronic audit for selected conditions based upon configurable parameters of a demanding party, and one or more responding parties, said configurable parameters including, but not limited to, required data or documents, claim liability and damages, and vehicle valuation conditions.

21. The method of claim 1, and further including routing subrogation demand to one or more responding parties using a routing algorithm, which combines a heuristic algorithm to correctly determine the identity of the responding party and routing rules defined by the responding party.

22. A system for issuing and negotiating and settling insurance subrogation claims between at least two parties through an electronic subrogation network, said system comprising:
    at least one electronic subrogation file associated with party-specific rules with subrogation information from the first computer, the electronic subrogation file containing structured claim information and unstructured supporting documents in a form that can be accessed by multiple on-network and off-network parties wherein the supporting documents are converted from an original format into a format for universal viewing, the party-specific rules including rules for the multiple on-network and off-network parties;
    means for permitting entry according to the party-specific rules, through electronic communication means, by one or more of said multiple on-network and off-network parties of one or both of said structured claim information and unstructured supporting documents to said subrogation file;
    means for permitting access according to the party-specific rules, through electronic communication means, by one or more of said multiple on-network and off-network parties to one or both of said structured claim information and said supporting documents; and
    means for issuing subrogation demands through electronic communication means to both on-network and off-network parties.

23. The system of claim 22, wherein said means for permitting entry includes means for automatically entering paper documents received by fax or high speed scanner into the electronic file.

24. The system of claim 22, wherein said electronic communication means comprises a network.

25. The system of claim 22, and further including means for establishing audit and business rule functions that permit said at least one electronic subrogation file to be electronically audited based on said party-specific rules.

26. The system of claim 22, wherein said multiple parties include a demanding, a responding party, and one or more supporting/facilitating parties, and further including means for routing a demand to an appropriate responding party based on a responding party's routing rules.

27. The system of claim of 26, wherein said means for routing includes a routing algorithm that combines a demanding party specific index and a heuristic algorithm to correctly determine an appropriate responding party and further a specific individual or group within said responding party that is to initially handle the demand.

28. The system of claim 22, and further including a state-based model for managing inter-party subrogation workflow.

29. The system of claim 22, and further including means for permitting intra-party subrogation workflow functions, including follow-up action plans and party-specific workflow.

30. The system of claim 22, and further including means for providing collaboration functions that allow selected parties to exchange information and negotiate using said electronic communication means.

31. The system of claim 22, and further including means for providing a document management function that allows said multiple parties to update attachments and manage document versions.

32. The system of claim 22, wherein said electronic communication means includes a network, and further including means for automatically generating alerts to on-network parties for exception conditions or violations of said party-specific rules.

33. The system of claim 22, and further including means for selectively assigning selected files and providing online access to third parties including arbitrators, litigators and outside service providers.

34. The system of claim 22, wherein said electronic communication means includes a network, and further including means for generating customizable online management reports.

35. The system of claim 22, and further including means for settling subrogation claims between parties automatically based on the parties' business rules.

36. The system of claim 22, and further including means for automatically generating counterclaim demands based on liability percentage and comparative negligence rules of a responding party.

37. The system of claim 22, and further including means for triggering an automatic funds transfer based on a response of a responding party.

38. The system of claim 22, and further including means for netting payments between parties involved in a subrogation claim, including:
- means for tracking payments owed and payments due over a given period of time for a member;
- means for netting payments either bilaterally between parties or multilaterally between a party and the ESN representing all other parties participating in the netting process;
- means for configuring netting periods; and
- means for managing information to allocate netted payments to each claim file.

39. The system of claim 22, and further including means for allowing members to benchmark parameters of their subrogation and/or claims operation against an aggregate based on information contained in said electronic subrogation files.

40. The system of claim 22, and further including means for assessing a best course of action within a subrogation process, including means for performing a cost-benefits analysis of pursuing a particular course of action.

41. The system of claim 22, and further including means for assessing the validity of a subrogation demand including means for performing an electronic audit for selected conditions based upon configurable parameters of a demanding party, and of one or more responding parties, said configurable parameters including, but not limited to, required data or documents, claim liability and damages, and vehicle valuation conditions.

42. The system of claim 22, and further including means for routing subrogation demand to one or more responding parties using a routing algorithm, which combines a heuristic algorithm to correctly determine the identity of the responding party and routing rules defined by the responding party.

* * * * *